(12) United States Patent
Tsubota et al.

(10) Patent No.: US 12,165,095 B2
(45) Date of Patent: Dec. 10, 2024

(54) SHIPPING ASSISTANCE DEVICE AND SHIPPING ASSISTANCE SYSTEM

(71) Applicant: PANASONIC INTELLECTUAL PROPERTY MANAGEMENT CO., LTD., Osaka (JP)

(72) Inventors: Kazuhiro Tsubota, Kanagawa (JP); Yota Toguchi, Kanagawa (JP); Yasuki Yamakawa, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/797,955

(22) PCT Filed: Jan. 15, 2021

(86) PCT No.: PCT/JP2021/001343
§ 371 (c)(1),
(2) Date: Aug. 5, 2022

(87) PCT Pub. No.: WO2021/157325
PCT Pub. Date: Aug. 12, 2021

(65) Prior Publication Data
US 2023/0038449 A1   Feb. 9, 2023

(30) Foreign Application Priority Data

Feb. 6, 2020  (JP) ................. 2020-018958
Jul. 20, 2020 (JP) ................. 2020-124002

(51) Int. Cl.
*G06Q 10/083* (2024.01)
*G06F 3/12* (2006.01)

(52) U.S. Cl.
CPC ......... *G06Q 10/083* (2013.01); *G06F 3/1208* (2013.01); *G06F 3/1256* (2013.01)

(58) Field of Classification Search
CPC ........ G07B 17/00185; G07B 17/00193; G07F 17/26; G01G 19/00
See application file for complete search history.

(56) References Cited

U.S. PATENT DOCUMENTS

| | | | |
|---|---|---|---|
| 10,740,862 B1 * | 8/2020 | Cui | G06F 30/20 |
| 2002/0007281 A1 * | 1/2002 | Gil | G07B 17/00362 705/407 |

(Continued)

FOREIGN PATENT DOCUMENTS

| | | |
|---|---|---|
| JP | 10-091678 | 4/1998 |
| JP | 2001-076262 | 3/2001 |

(Continued)

OTHER PUBLICATIONS

"Save Time by Visiting a USPS Self-Service Kiosk"; Published Nov. 3, 2017; USPSBlog; pp. 1-5; https://uspsblog.com/usps-self-service-kiosk/ (Year: 2017).*

(Continued)

*Primary Examiner* — Emmett K. Walsh
*Assistant Examiner* — Michael C Moroney
(74) *Attorney, Agent, or Firm* — GREENBLUM & BERNSTEIN, P.L.C.

(57) ABSTRACT

A shipping assistance device which enables a delivery service operator to quickly confirm that the size of an item has been properly measured and there is no need to re-measure the size, and proceed to operations for transportation, comprises a table to place items, upper and side shooting devices for shooting images of an item on the table, a storage chamber for storing items, front-facing and upward-facing displays a printer for printing a shipping label, and a processing controller configured to measure the size of the item on the table based on shot images, determine if the item is acceptable to be put in the storage chamber based on the measured size, display a determination result (Continued)

on the displays, and when the item is determined acceptable, instruct the printer to print a shipping label with an acceptance signature for the item.

9 Claims, 29 Drawing Sheets

(56) References Cited

U.S. PATENT DOCUMENTS

| | | | | |
|---|---|---|---|---|
| 2009/0089159 | A1* | 4/2009 | Ren | G06Q 10/08 715/764 |
| 2012/0123970 | A1* | 5/2012 | Lorello | G07B 17/00661 705/410 |
| 2012/0194043 | A1* | 8/2012 | Turner | G07F 7/00 312/109 |
| 2015/0081580 | A1* | 3/2015 | Fry | G06Q 50/28 705/330 |
| 2016/0176562 | A1* | 6/2016 | Pettersson | B65B 43/08 53/51 |
| 2017/0004384 | A1* | 1/2017 | Audo | G06Q 10/0833 |
| 2017/0116571 | A1* | 4/2017 | Tammattabattula | G06Q 10/0836 |
| 2018/0032923 | A1* | 2/2018 | Sanderson | B64F 1/366 |
| 2018/0114256 | A1 | 4/2018 | Lee | |
| 2018/0121873 | A1* | 5/2018 | Walsh | G06Q 10/0836 |
| 2019/0258995 | A1* | 8/2019 | Crane | G06Q 10/0838 |
| 2019/0287334 | A1* | 9/2019 | Rossi | G07F 9/023 |
| 2021/0158272 | A1* | 5/2021 | Barr | G06Q 10/087 |
| 2021/0158285 | A1* | 5/2021 | Ager | G06Q 10/08 |

FOREIGN PATENT DOCUMENTS

| | | | | |
|---|---|---|---|---|
| JP | 2013022151 A | * | 2/2013 | |
| JP | 5891394 | | 3/2016 | |
| JP | 2017120535 A | * | 7/2017 | |
| JP | 6490282 | | 3/2019 | |
| JP | 6524601 | | 6/2019 | |
| JP | 6664601 | | 3/2020 | |
| WO | WO-2015089570 A1 | * | 6/2015 | G06Q 10/08 |

OTHER PUBLICATIONS

English translation of JP-2013022151-A (Year: 2013).*
English translation of JP-2017120535-A (Year: 2017).*
International Search Report issued in International Patent Application No. PCT/JP2021/001343, dated Apr. 13, 2021, along with an English translation thereof.

* cited by examiner

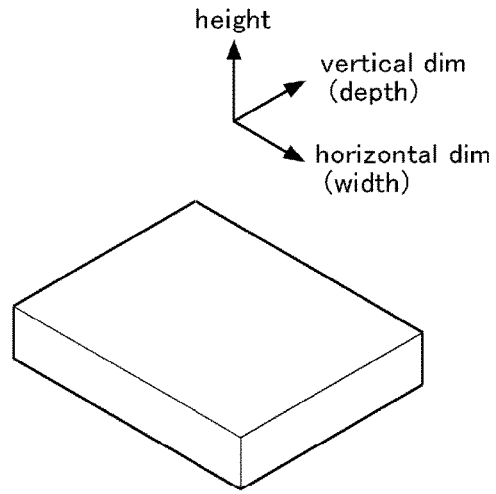
Fig. 8(A) std packing material of first size-related class
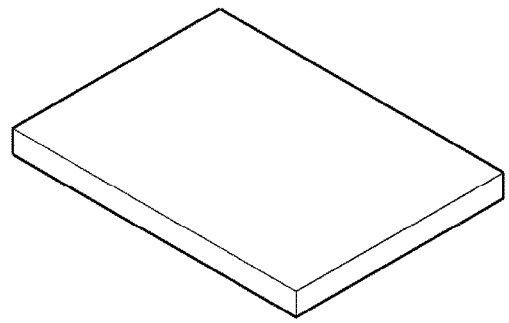
Fig. 8(B) std packing material of second size-related class
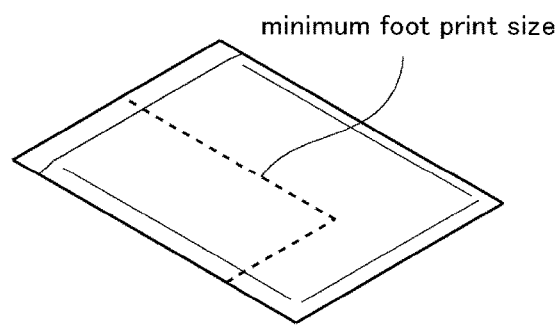
Fig. 8(C) compliant packing material of second size-related class

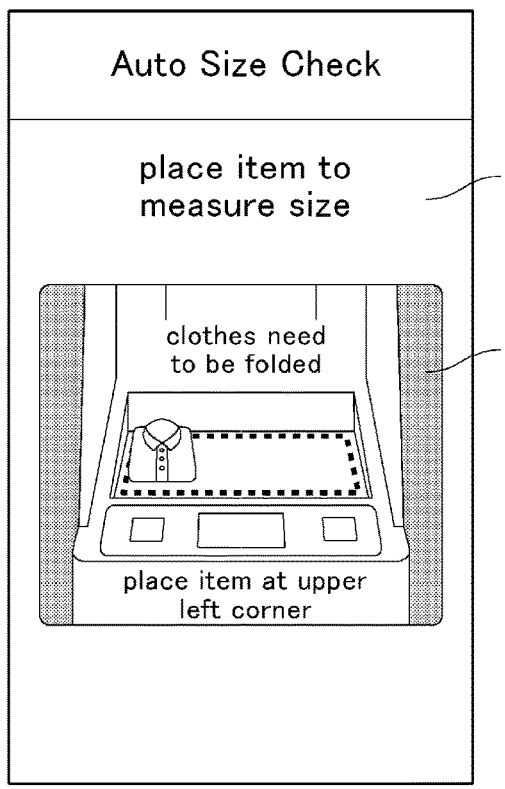
*Fig. 14* (A－1)
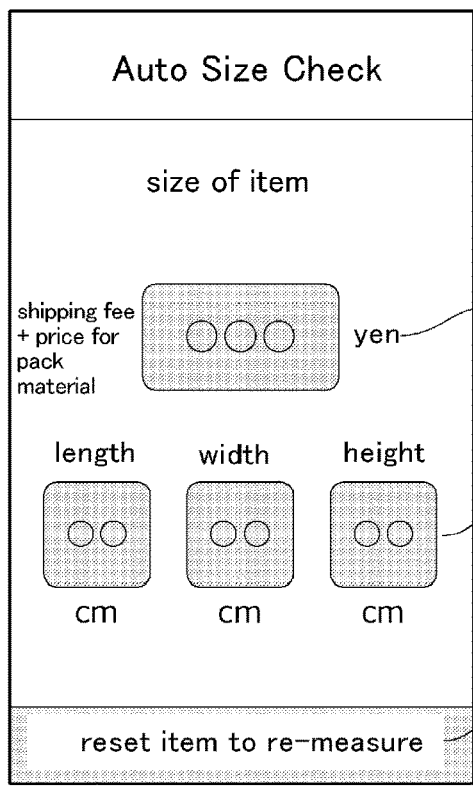
*Fig. 14* (A－2)
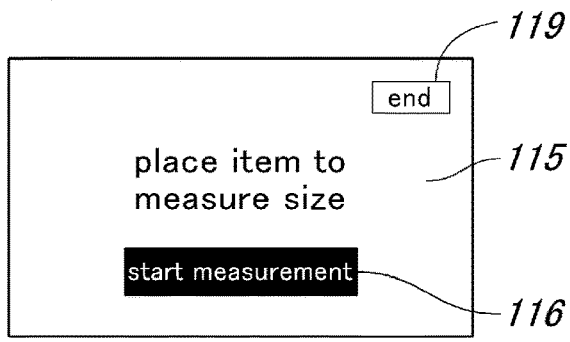
*Fig. 14* (B－1)
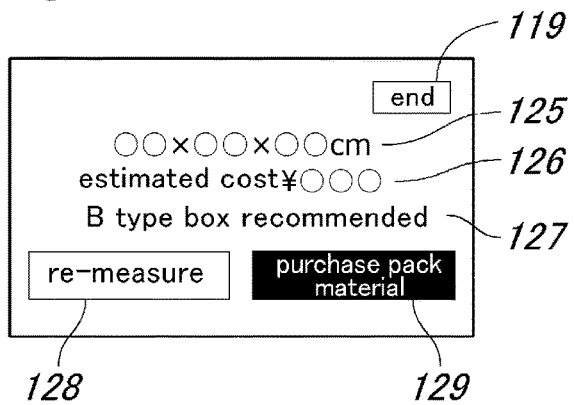
*Fig. 14* (B - 2)
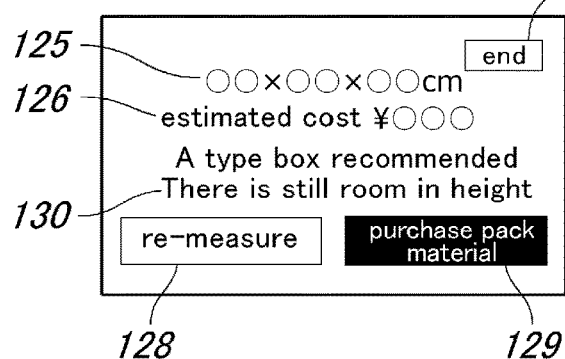
*Fig. 14* (B - 3)

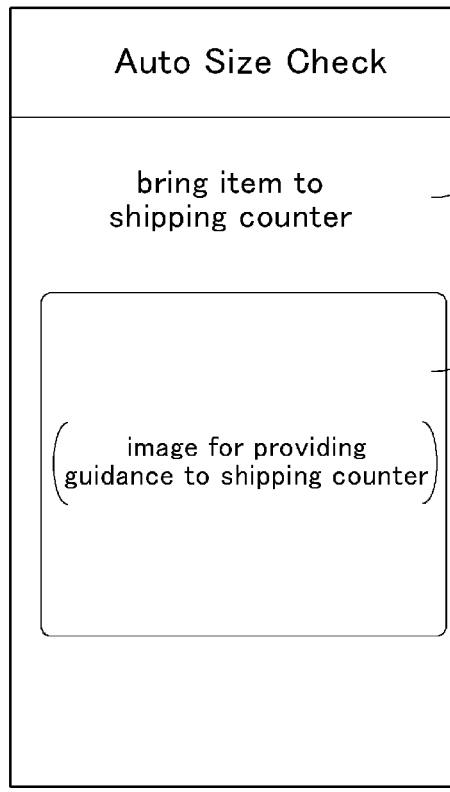
Fig. 15(A－1)
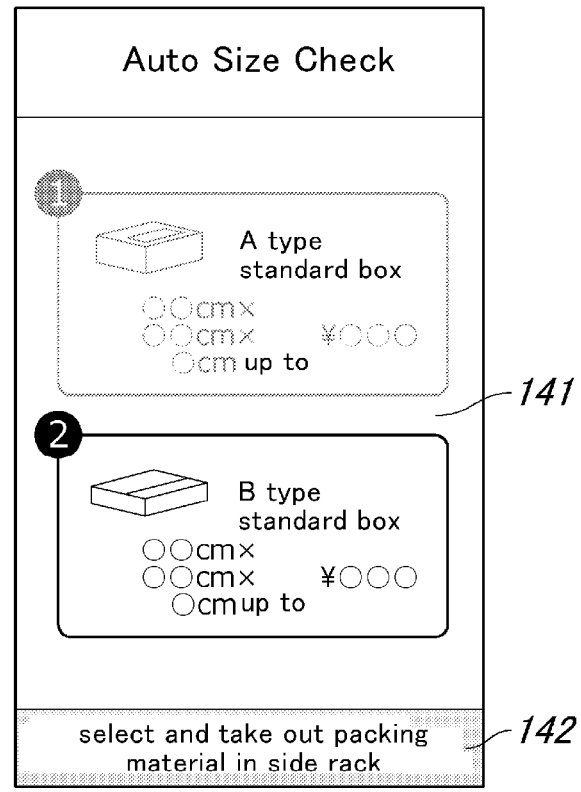
Fig. 15(A－2)
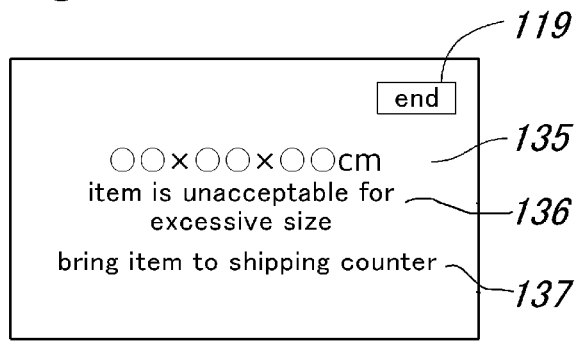
Fig. 15(B－1)
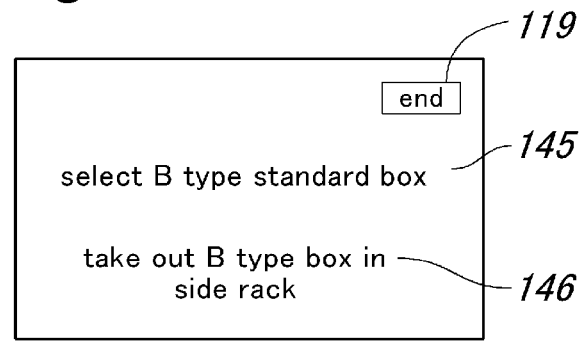
Fig. 15(B－2)

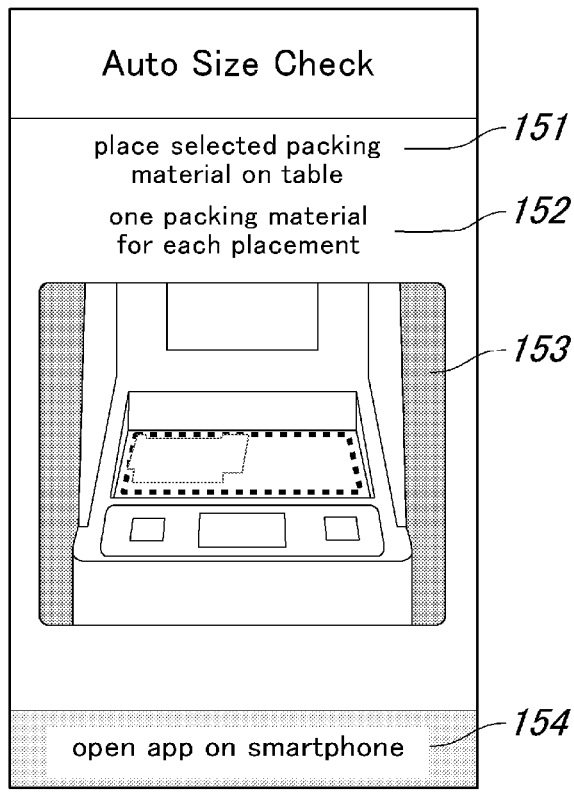
Fig. 16(A－1)
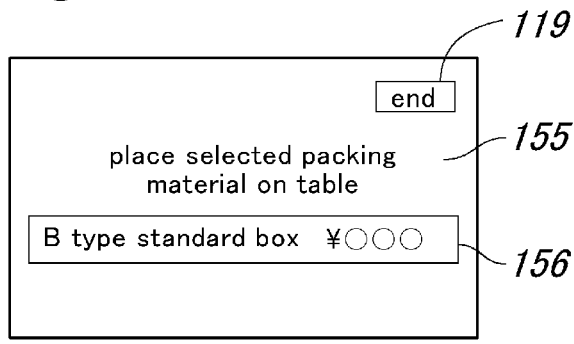
Fig. 16(B－1)
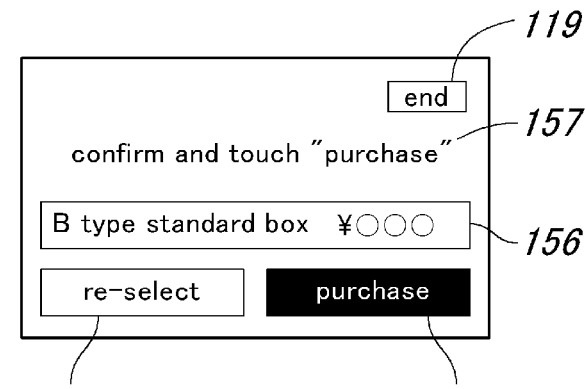
Fig. 16 (B - 2)
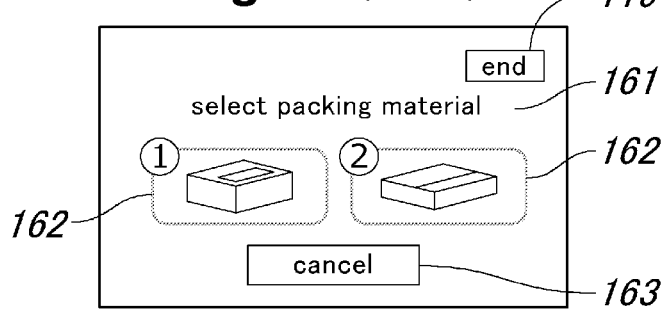
Fig. 16(B－3)

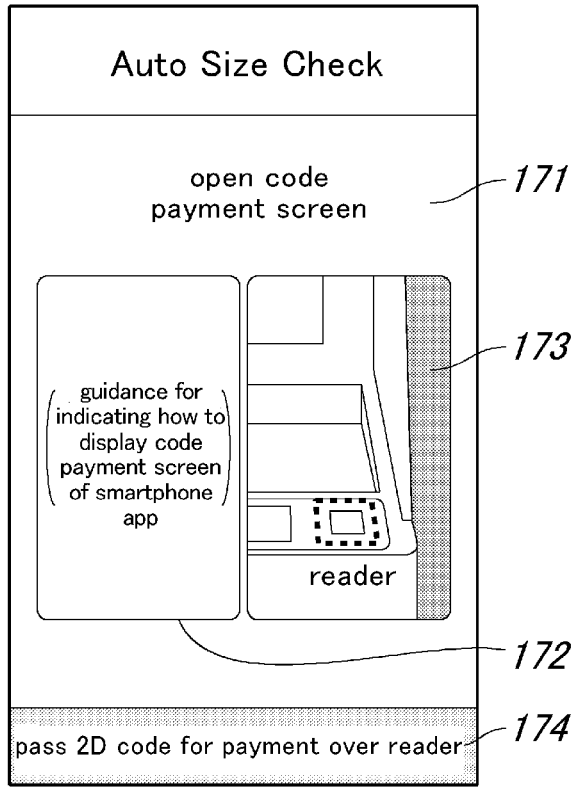
Fig. 17(A-1)
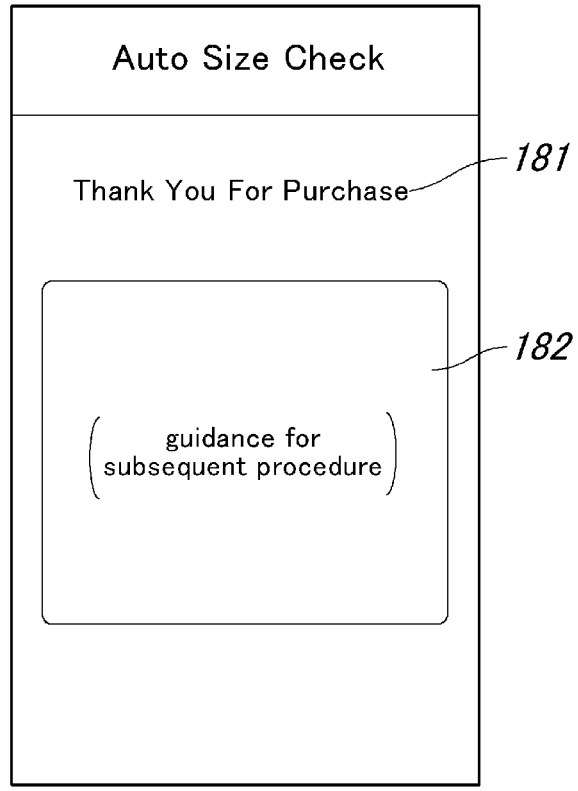
Fig. 17(A-2)
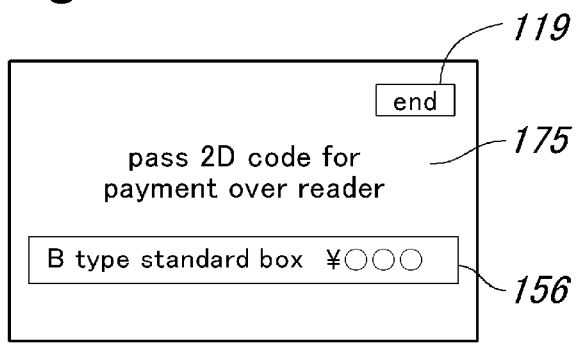
Fig. 17(B-1)
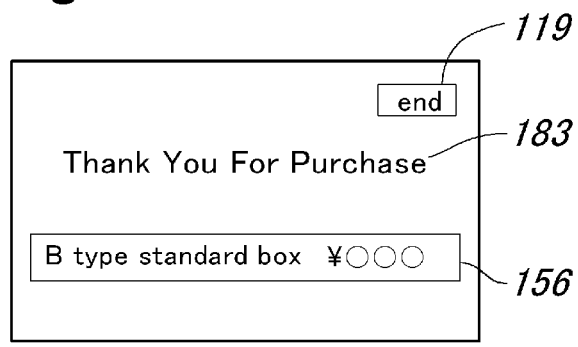
Fig. 17(B-2)

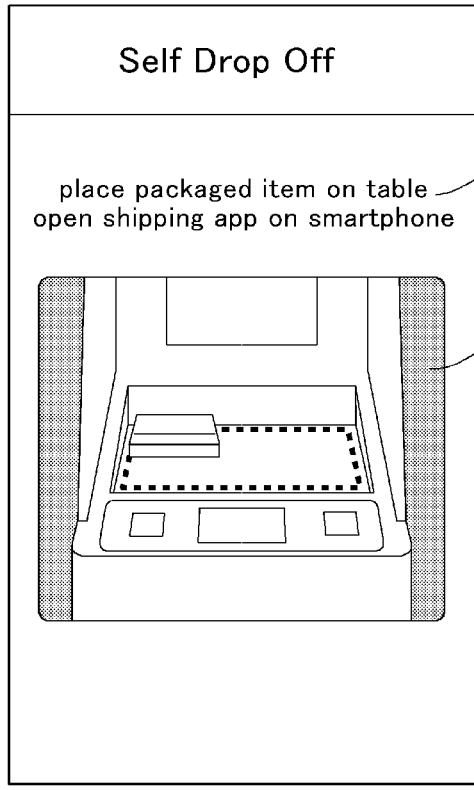
Fig. 18(A-1)
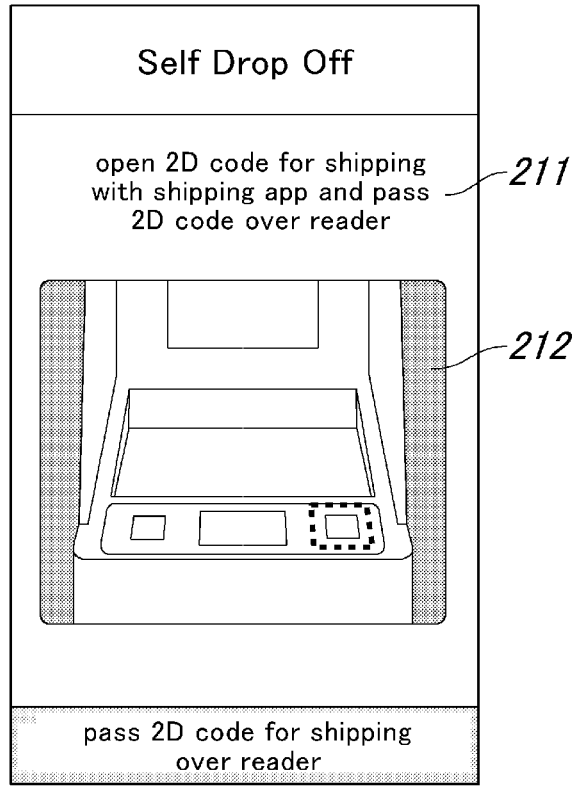
Fig. 18(A-2)
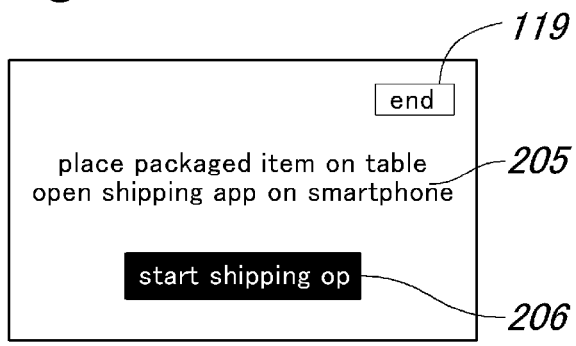
Fig. 18(B-1)
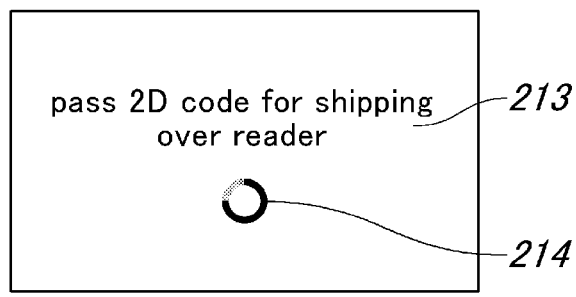
Fig. 18(B-2)

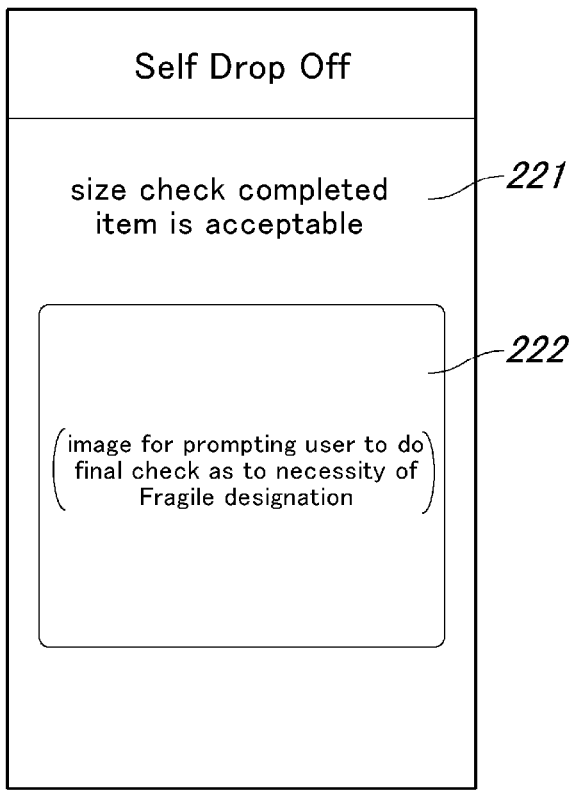
Fig. 19(A-1)
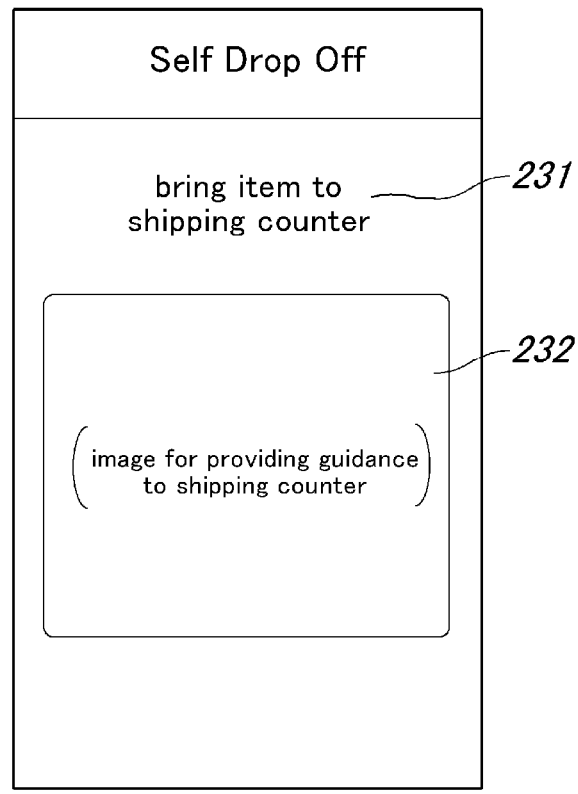
Fig. 19(A-2)
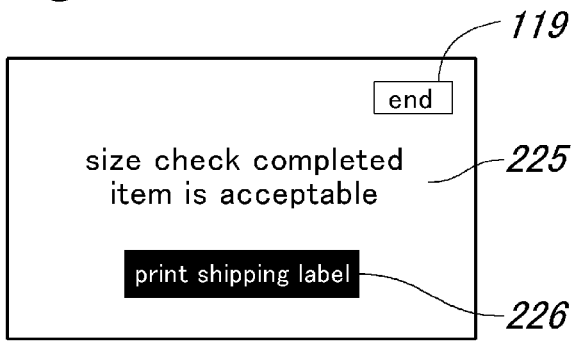
Fig. 19(B-1)
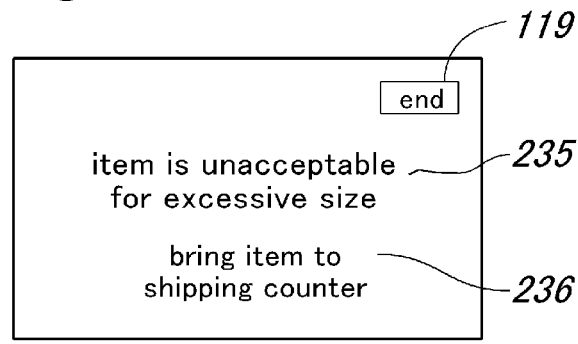
Fig. 19(B-2)
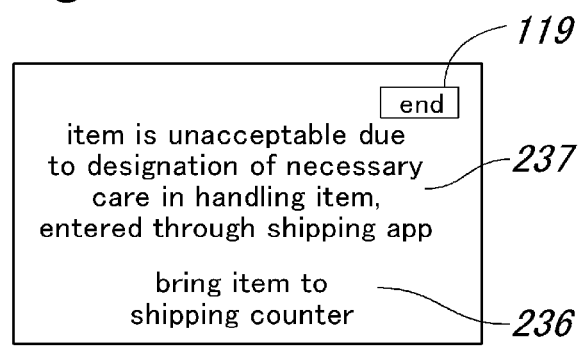
Fig. 19(B-3)

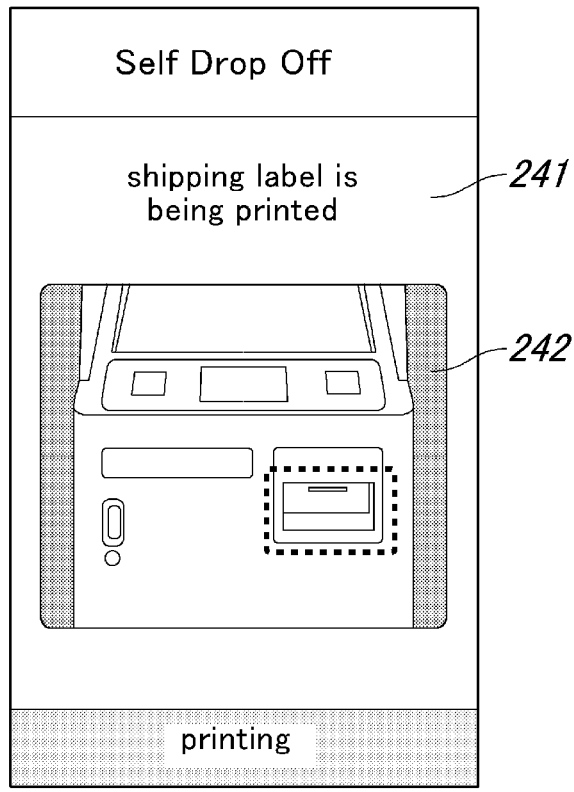
Fig. 20 (A-1)
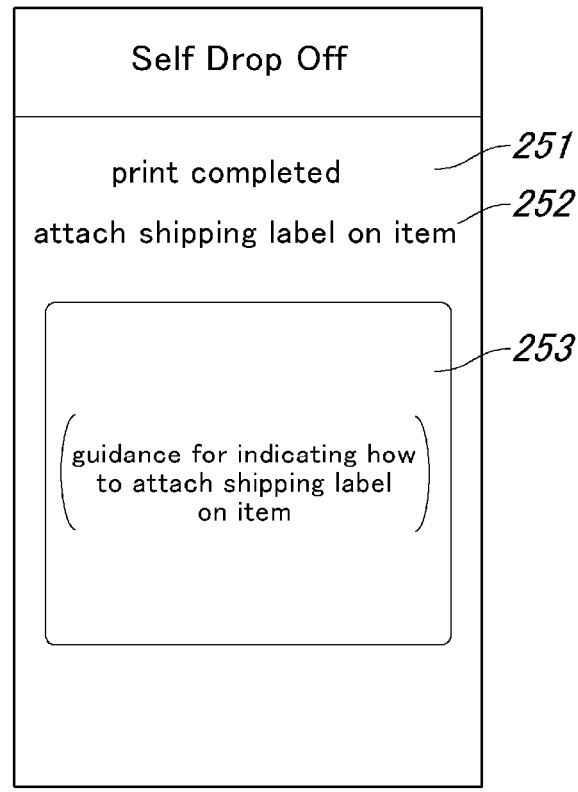
Fig. 20 (A-2)
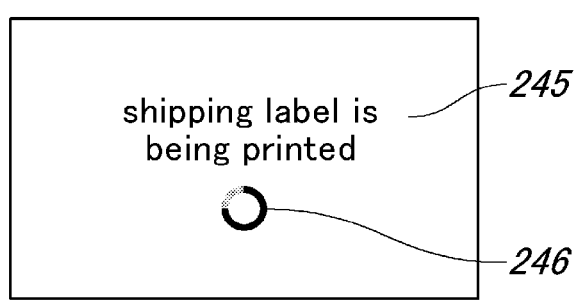
Fig. 20 (B-1)
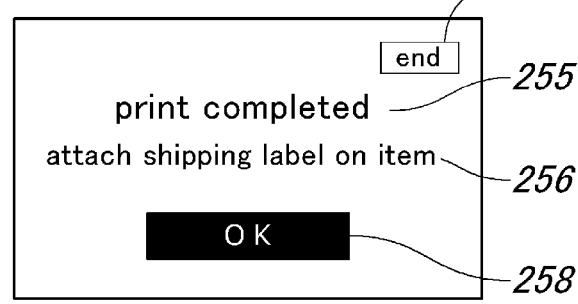
Fig. 20 (B-2)

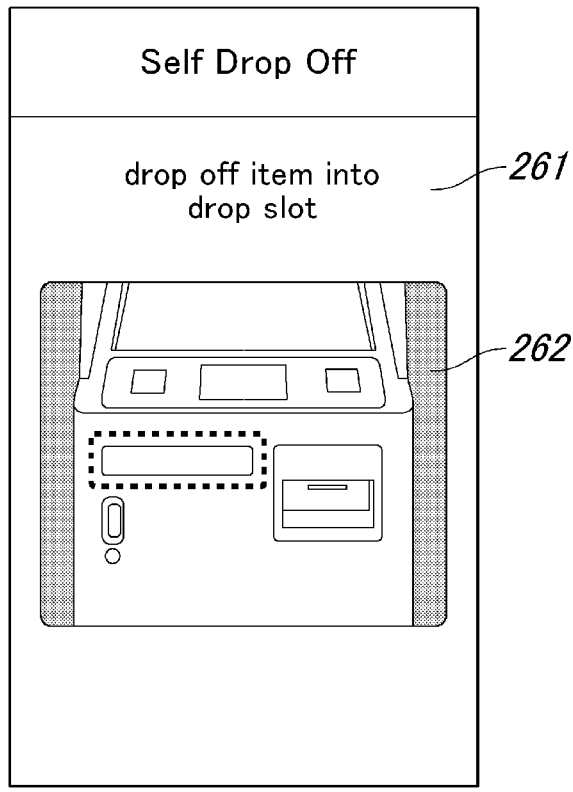
Fig. 21(A-1)
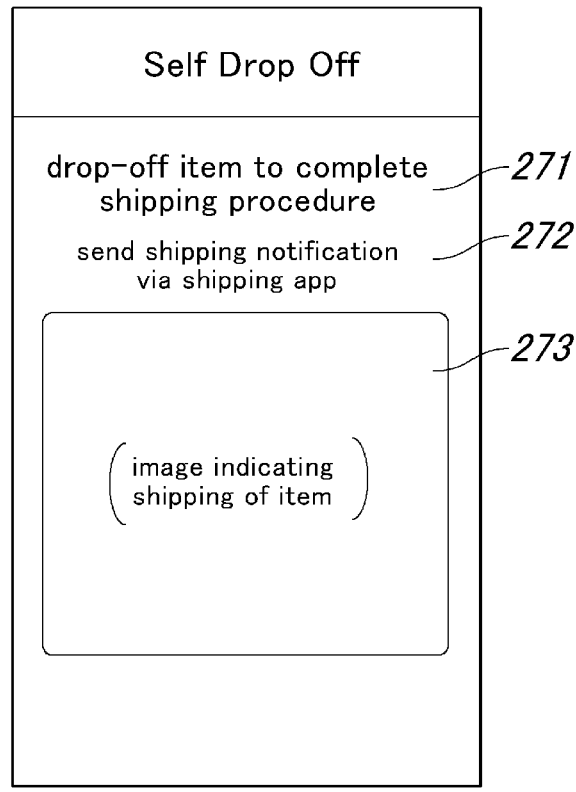
Fig. 21(A-2)
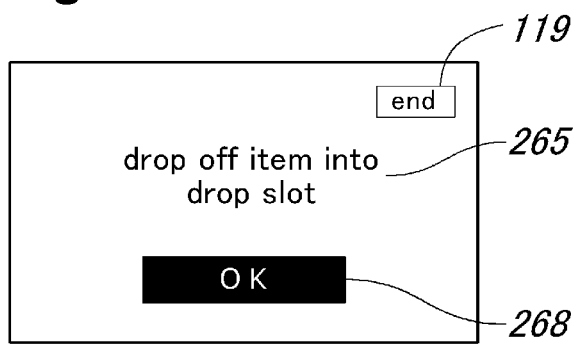
Fig. 21(B-1)
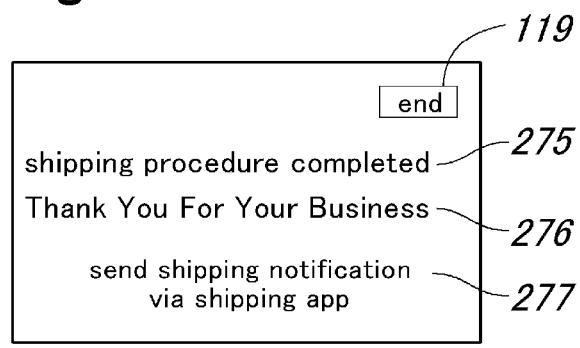
Fig. 21(B-2)

Fig. 23
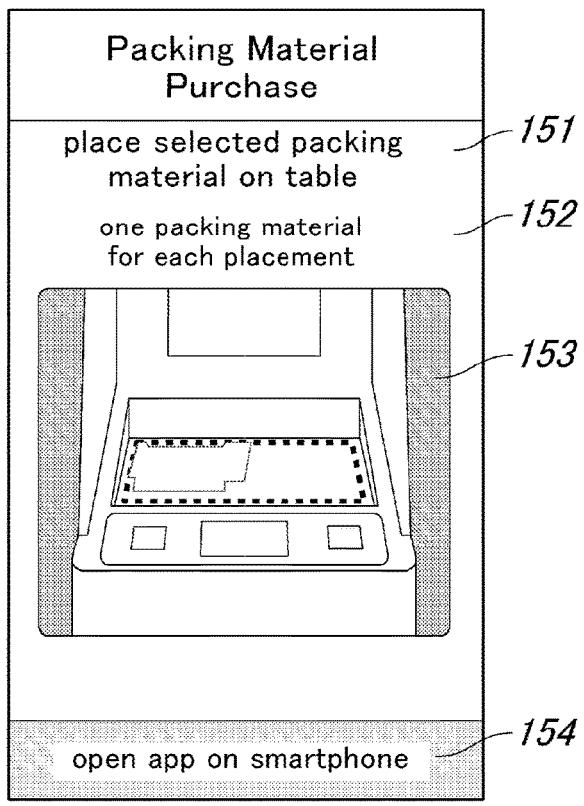
(A-1)
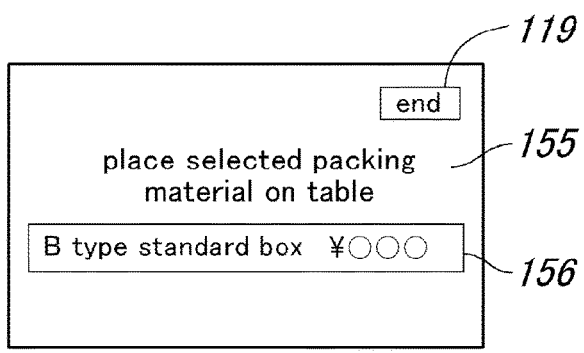
(B-1)
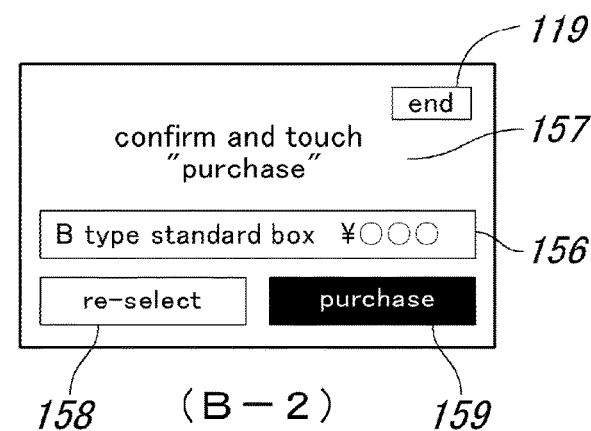
(B-2)
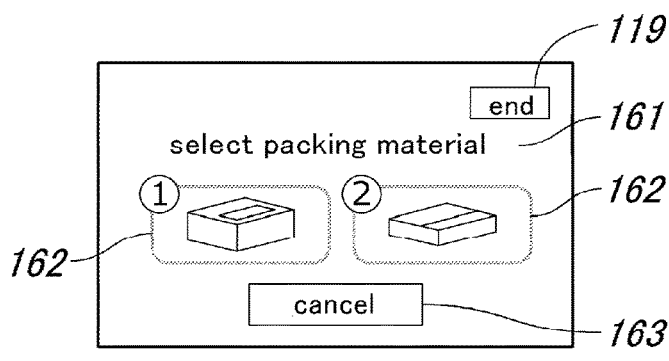
(B-3)

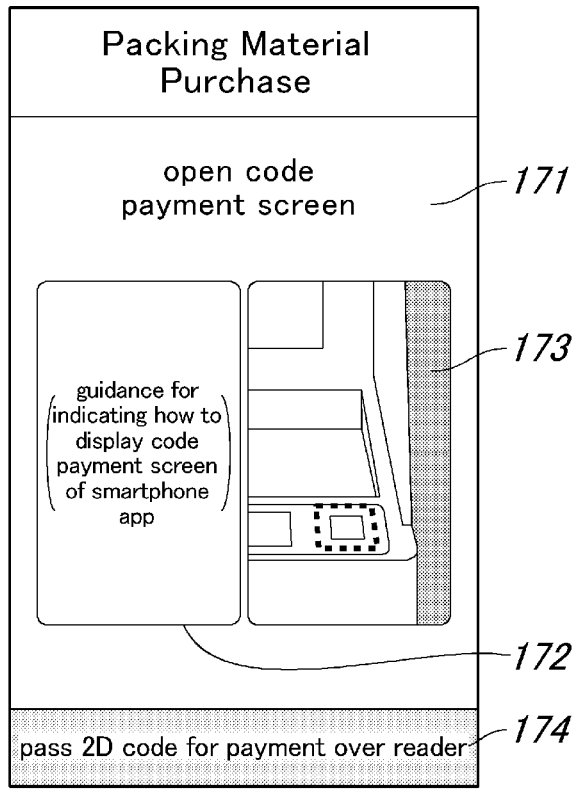
Fig. 24(A-1)
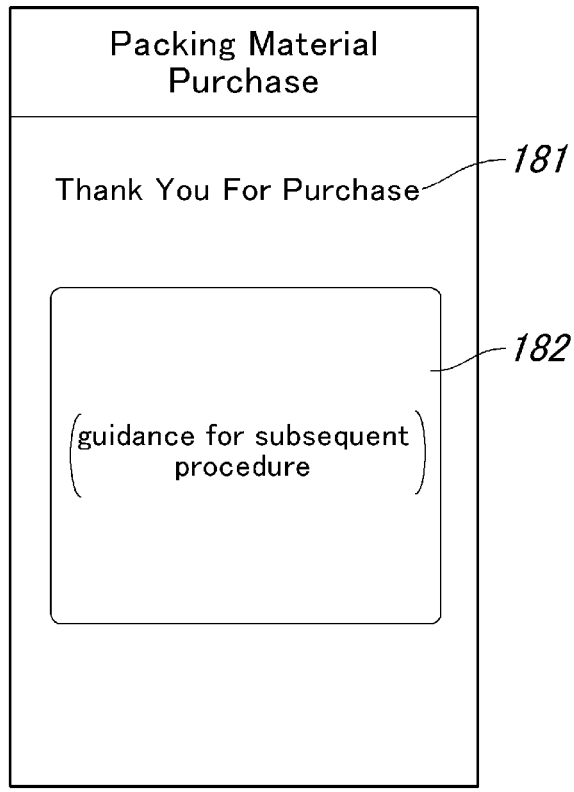
Fig. 24(A-2)
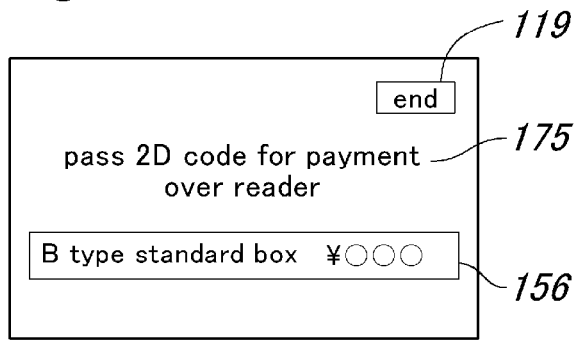
Fig. 24(B-1)
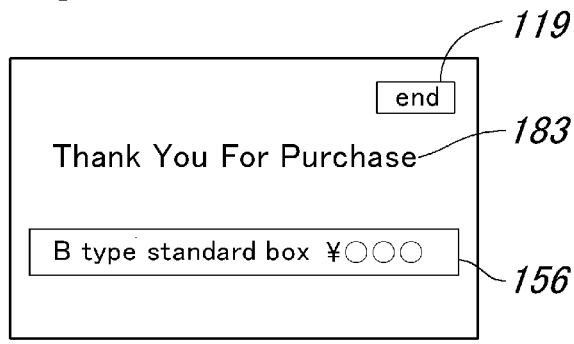
Fig. 24(B-2)

SHIPPING ASSISTANCE DEVICE AND SHIPPING ASSISTANCE SYSTEM

TECHNICAL FIELD

The present invention relates to a shipping assistance device and a shipping assistance system for assisting a user to do a shipping procedure when the user hands off an item to a delivery service operator.

BACKGROUND ART

In recent years, use of person-to-person e-commerce (EC) sites such as online flea market sites and online auction sites is in rapid expansion. In particular, e-commerce site operators often provide users with dedicated applications to be installed on user terminals (such as smartphones), to facilitate person-to-person transactions via their e-commerce sites. For example, when shipping an item sold via a person-to-person e-commerce site, a sender (seller) can easily do a shipping procedure by entering delivery information (such as information on a sender and a delivery destination) through interactions with the dedicated application, and then going to a nearby store (operator store) such as a convenience store. In such a case, use of a shipping assistance device, which enables a user to easily do a shipping procedure without interaction with store staff, can provide an improvement in convenience for the user.

Known technologies for assisting a user to do a shipping procedure include a method in which a user terminal measures the size of an item using a sensor such as a camera, and presents a size-related class or type of delivery service for the item to a user, so that, when the item is classified to a size-related class or type which is acceptable to be dropped in a post box or drop box, the user can drop the item into a post box (Patent Document 1).

The known technologies also include a system using a database to manage shipping, delivery and receipt of a package based on ID information contained in a two-dimensional code printed on a label attached to a packing material, so that a user can register a package to be shipped in the system by reading a two-dimensional code on the package with a user terminal, and then drop the package into a post box or a drop box at a convenience store (Patent Document 2).

The known technologies also include a shipping assistance method which includes the steps of: entering delivery information; that is, information on a sender of an item and a destination of the delivery (mailing address information) through a user terminal, measuring the size of the item with a shipping assistance device (an unmanned reception device); calculating a shipping fee based on the measured size of the item and making a payment with the user terminal; and printing a shipping label containing the delivery information with the shipping assistance device, so that a user can attach the printed shipping label to the item and drop the item into a drop box of the shipping assistance device (Patent Document 3).

The known technologies also include a shipping assistance device (item pick-up terminal device) configured to receive delivery information, i.e., information on delivery of an item (such as a destination of delivery) entered by a user, make payment of a delivery fee based on the received information, and print a shipping label containing the delivery information so that the user can attach the printed shipping label on the item and drop the item into a drop box of the shipping assistance device (Patent Document 4).

The known technologies also include a shipping assistance device (automatic parcel pick-up device) configured such that, when an item or parcel is dropped into the device, the device measures the size of the item, determines whether or not the size of the item is compliant with predetermined standards, presents a determination result to the user, and stores or returns the item in response to a user's selection operation (Patent Document 5). In particular, this shipping assistance device can count the number of items dropped off in the device and record the number.

The known technologies also include a shipping assistance device (drop box device) configured to measure the size of an item to be shipped, make payment of delivery fees based on the measured size of the item, and allow a user to drop the item into the device to thereby complete the shipping procedure (Patent Document 6). In particular, this shipping assistance device supports not only the shipping of a packaged item but also the shipping of an unpackaged item. Specifically, the shipping assistance device can measure the size of an unpackaged item, and present a packing material suitable for the item to a user so that the user can pack the item with the packing material and then drop the packaged item into the device.

PRIOR ART DOCUMENT(S)

Patent Document(s)

Patent Document 1: JP6490282B1
Patent Document 2: JP6664601B2
Patent Document 3: JP6524601B2
Patent Document 4: JPH10-91678A
Patent Document 5: JP2001-076262A
Patent Document 6: JP5891394B2

SUMMARY OF THE INVENTION

Task to be Accomplished by the Invention

Generally, a delivery service operator (e.g., courier company) picks up an item to be shipped and, immediately after that, measures the size of the item in order to confirm whether or not the package size (or size-related class) declared by a sender is correct. In the prior art, a shipping assistance device measures the size of an item to be shipped. When such a measurement is made with sufficient accuracy, a delivery service operator would not need to re-measure the size of the item after the pick-up of the item. However, there is a problem that a delivery service operator cannot quickly confirm whether or not a size measurement has been made with sufficient accuracy to the extent which would eliminate the need to re-measure the size, which means that a delivery service operator cannot proceed to operations for transportation of an item immediately after the collection of the item.

The present invention was made in view of such a problem of the prior art, and has a primary object to provide a shipping assistance device and a shipping assistance system which enable a delivery service operator to quickly confirm that the size of an item has been properly measured and there is no need to re-measure the size, so that the delivery service operator can proceed to operations for transportation immediately after the pick-up of the item.

Means to Accomplish the Task

An aspect of the present invention provides a shipping assistance device for assisting a user to do a shipping procedure when the user hands off an item to a delivery service operator, the shipping assistance device comprising: a table portion on which a user can place an item; at least one detection device for detecting the item on the table portion; a storage chamber for storing the item put therein by the user; a display device for presenting information to the user; and a processing controller for performing controls related to shipping assistance, wherein the processing controller is configured to: measure a size of the item on the table portion based on a detection result provided from the at least one detection device; determine whether or not the item is acceptable to the shipping assistance device; that is, whether or not the item is acceptable to be put in the storage chamber based on a size measurement result; display information on a determination result on the display device; and when the item is determined to be acceptable to the shipping assistance device, give an acceptance signature to the item.

Another aspect of the present invention provides a shipping assistance system for assisting a user to do a shipping procedure when the user hands off a package to a delivery service operator, the system comprising: a shipping assistance device; and a server device connected to the shipping assistance device via a network, wherein the shipping assistance device includes: a table portion on which a user can place an item; at least one detection device for detecting the item on the table portion; a storage chamber for storing the item put therein by the user; and a display device for presenting information to the user, wherein the shipping assistance device is configured to transmit a detection result provided from the at least one detection device to the server device, the detection result indicating the detection of the item on the table portion, wherein the server device is configured to: measure a size of the item on the table portion based on the detection result received from the shipping assistance device; determine whether or not the item is acceptable to the shipping assistance device; that is, whether or not the item is acceptable to be put in the storage chamber based on a size measurement result; and when the item is determined to be acceptable to the shipping assistance device, give an acceptance signature to the item, and wherein the shipping assistance device is configured to display information on a determination result received from the server device on the display device.

Effect of the Invention

According to the present invention, a shipping assistance device is configured to present an acceptance signature for an item to be shipped to a delivery service operator, which enables the delivery service operator to quickly confirm that the size of the item has been properly measured and there is no need to re-measure the size, so that the delivery service operator can proceed to operations for transportation immediately after the pick-up of the item.

BRIEF DESCRIPTION OF THE DRAWINGS

FIGS. 8(A)-(C) are explanatory diagrams showing an outline of operations performed by the shipping assistance device 1 when an item to be shipped is a packaged item;

FIGS. 14(A-1), 14(A-2), 14(B-1), 14(B-2), and 14(B-3) are explanatory diagrams showing screens displayed on the displays when the shipping assistance device 1 is in an automatic measurement mode;

FIGS. 15(A-1), 15(A-2), 15(B-1), and 15(B-2) are explanatory diagrams showing screens displayed on the displays when the shipping assistance device 1 is in the automatic measurement mode;

FIGS. 16(A-1), 16(B-1), 16(B-2), and 16(B-3) are explanatory diagrams showing screens displayed on the displays when the shipping assistance device 1 is in the automatic measurement mode;

FIGS. 17(A-1), 17(A-2), 17(B-1), and 17(B-2) are explanatory diagrams showing screens displayed on the displays when the shipping assistance device 1 is in the automatic measurement mode;

FIGS. 18(A-1), 18(A-2), 18(B-1), and 18(B-2) are explanatory diagrams showing screens displayed on the displays when the shipping assistance device 1 is in a self-drop-off mode;

FIGS. 19(A-1), 19(A-2), 19(B-1), 19(B-2), and 19(B-3) are explanatory diagrams showing screens displayed on the displays when the shipping assistance device 1 is in the self-drop-off mode;

FIGS. 20(A-1), 20(A-2), 20(B-1), and 20(B-2) are explanatory diagrams showing screens displayed on the displays when the shipping assistance device 1 is in the self-drop-off mode;

FIGS. 21(A-1), 21(A-2), 21(B-1), and 21(B-2) are explanatory diagrams showing screens displayed on the displays when the shipping assistance device 1 is in the self-drop-off mode;

FIGS. 23(A-1), 23(B-1), 23(B-2), and 23(B-3) are explanatory diagrams showing screens displayed on the displays when the shipping assistance device 1 is in the packing material purchase mode;

FIGS. 24(A-1), 24(A-2), 24(B-1), and 24(B-2) are explanatory diagrams showing screens displayed on the displays when the shipping assistance device 1 is in the packing material purchase mode;

DESCRIPTION OF THE PREFERRED EMBODIMENT(S)

Figure 1:
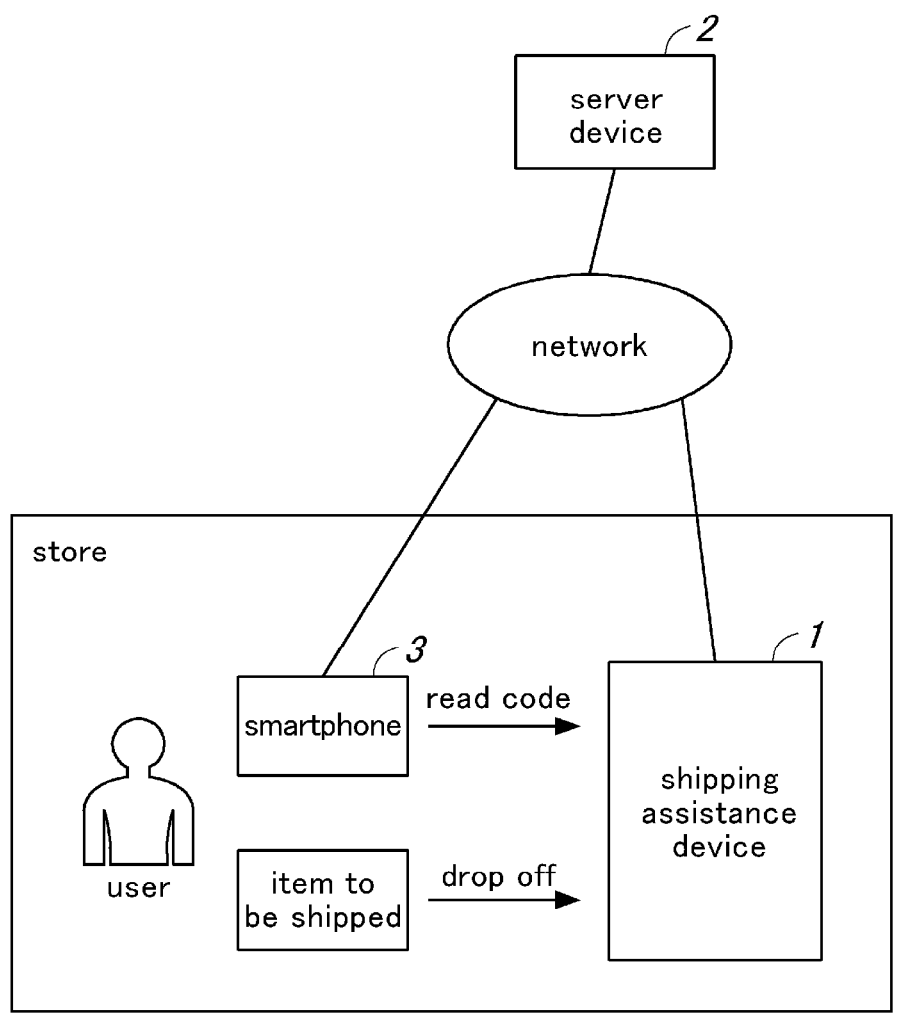
FIG. 1 is a diagram showing a general configuration of a shipping assistance system according to a first embodiment of the present invention.

A first aspect of the present invention made to achieve the above-described object is a shipping assistance device for assisting a user to do a shipping procedure when the user hands off an item to a delivery service operator, the shipping assistance device comprising: a table portion on which a user can place an item; at least one detection device for detecting the item on the table portion; a storage chamber for storing the item put therein by the user; a display device for presenting information to the user; and a processing controller for performing controls related to shipping assistance, wherein the processing controller is configured to: measure a size of the item on the table portion based on a detection result provided from the at least one detection device; determine whether or not the item is acceptable to the shipping assistance device; that is, whether or not the item is acceptable to be put in the storage chamber based on a size measurement result; display information on a determination result on the display device; and when the item is determined to be acceptable to the shipping assistance device, give an acceptance signature to the item.

In this configuration, the shipping assistance device is configured to present an acceptance signature for an item to be shipped to the delivery service operator, enabling the delivery service operator to quickly confirm that the size of the item has been properly measured and there is no need to re-measure the size, so that the delivery service operator can proceed to operations for transportation immediately after the pick-up of the item.

A second aspect of the present invention is the shipping assistance device of the first aspect, further comprising a housing, wherein the table portion, the at least one detection device, the storage chamber, and the display device are provided integrally with the housing.

In this configuration, as the device is made more compact, it becomes easier to install the device in a store such as a convenience store.

A third aspect of the present invention is the shipping assistance device of the first aspect, wherein the at least one detection device comprises a first detection device for detecting the item on the table portion from above, and a second detection device for detecting the item on the table portion from a side.

This configuration allows for more accurate measurement of the size of an item.

A fourth aspect of the present invention is the shipping assistance device of the first aspect, wherein the processing controller is configured such that, when the item on the table portion is unpackaged and determined to be acceptable to the shipping assistance device, the processing controller displays information on at least one of the size of the item and a shipping cost for the item on the display device.

This configuration enables a user to confirm the size of an item to be shipped and a shipping cost for the item.

A fifth aspect of the present invention is the shipping assistance device of the first aspect, wherein the processing controller is configured such that, when the item on the table portion is unpackaged and determined to be acceptable to the shipping assistance device, the processing controller displays information on a packing material suitable for the item on the display device.

This configuration enables a user to quickly recognize a packing material necessary for an item to be shipped.

A sixth aspect of the present invention is the shipping assistance device of the first aspect, wherein the processing controller is configured such that, when the item on the table portion is packaged and determined to be acceptable to the shipping assistance device, the processing controller displays a notification that the item is acceptable to the shipping assistance device on the display device.

This configuration enables a user to quickly recognize that an item to be shipped is acceptable to the shipping assistance device, so that the user can immediately put it in the device.

A seventh aspect of the present invention is the shipping assistance device of the first aspect, further comprising a printing device for printing a shipping label or document, wherein the processing controller is configured such that, when the item on the table portion is packaged and the determination result indicates that the item is acceptable to the shipping assistance device, the processing controller instructs the printing device to print a shipping label or document for the item, the shipping label or document including an indication of the acceptance signature given to the item.

This configuration enables a user to quickly obtain a necessary shipping label or document for the item, so that the user can immediately put it in the device. Furthermore, as this configuration visualizes an acceptance signature given to the item on the shipping label, a shipping service operator worker can quickly confirm that the size of the item has been properly measured and there is no need to re-measure the size with the shipping assistance device only by looking at the shipping label.

An eighth aspect of the present invention is a shipping assistance system for assisting a user to do a shipping procedure when the user hands off a package to a delivery service operator, the system comprising: a shipping assistance device; and a server device connected to the shipping assistance device via a network, wherein the shipping assistance device includes: a table portion on which a user can place an item; at least one detection device for detecting the item on the table portion; a storage chamber for storing the item put therein by the user; and a display device for presenting information to the user, wherein the shipping assistance device is configured to transmit a detection result provided form the at least one detection device to the server device, the detection result indicating the detection of the item on the table portion, wherein the server device is configured to: measure a size of the item on the table portion based on the detection result received from the shipping assistance device; determine whether or not the item is acceptable to the shipping assistance device; that is, whether or not the item is acceptable to be put in the storage chamber based on a size measurement result; and when the item is determined to be acceptable to the shipping assistance device, give an acceptance signature to the item, and wherein the shipping assistance device is configured to display information on a determination result received from the server device on the display device.

In this configuration, the delivery service operator can quickly confirm that the size of an item to be shipped has been properly measured and there is no need to re-measure the size, so that the delivery service operator can proceed to operations for transportation immediately after the pick-up of the item in the same manner as the first aspect.

Embodiments of the present invention will be described below with reference to the drawings.

First Embodiment

FIG. 1 is a diagram showing a general configuration of a shipping assistance system according to a first embodiment of the present invention.

The shipping assistance system is configured to assist a user (sender) to do a shipping procedure when the user hands off an item to a delivery service operator, and includes a shipping assistance device 1, a server device 2, and a smartphone 3 (user device). The shipping assistance device 1 is connected to the server device 2 via a network. The smartphone 3 is connected to the server device 2 are connected via a network. It should be noted that this hipping assistance system can also be used by shipping items traded on person-to-person e-commerce sites such as online flea market sites and online auction sites.

The shipping assistance device 1 is installed in a store such as a convenience store. The shipping assistance device 1 has a function of measuring the size of an item brought by a user and presenting the shipping fee for the item to the user. Furthermore, the shipping assistance device 1 has a function as drop box in which an item to be shipped can be put. The shipping assistance device 1 also has a function as a self-serve vending machine for selling packing materials (or packing boxes). The shipping assistance device 1 has a function of printing a shipping label or document containing prescribed form of information based on the information that a user has entered previously using the smartphone 3. A user can attach a printed shipping label to an item to be shipped and drop it in the shipping assistance device 1.

The smartphone 3 is operated by a user as a sender, who needs to request a delivery service operator to deliver an item through the shipping assistance device 1. A shipping application and a payment application need to be installed on the smartphone 3. Using the shipping application, a user can enter sender-entered information (information on item (s) to be shipped, sender, destination, necessary care in handling item (indication such as Fragile, Precision Instrument, Keep Refrigerated)). The system may be configured such that a user can enter sender-entered information by using any user terminal other than the smartphone 3, such as a personal computer or a tablet terminal. The payment application enables a user to make online payment through the smartphone 3 using a payment service such as electronic money and a credit card. Using the payment application, a user can make purchase and payment for a packing material using a designated payment service.

The server device 2 has a function of managing the shipment of items. Specifically, when an item is shipped, the server device 2 stores and manages information as sender-entered information that a user has entered previously using the smartphone 3 or any other device, and, in response to a request from the shipping assistance device 1, the server device 2 provides the sender-entered information to the shipping assistance device 1. Moreover, the server device 2 has a payment-related function. Specifically, in response to a request from the shipping assistance device 1, the server device 2 performs a payment processing operation for a packing material purchased by a user. The server device 2 may be installed in a remote place (for example, a management center) that is different from the store, or in an appropriate place in the store (for example, a backyard or a management room).

In the present embodiment, the server device 2 has the function of managing the shipment of items and the payment-related function. However, the function of managing the shipment of items and the payment-related function may be provided by respective server devices.

Figure 2:
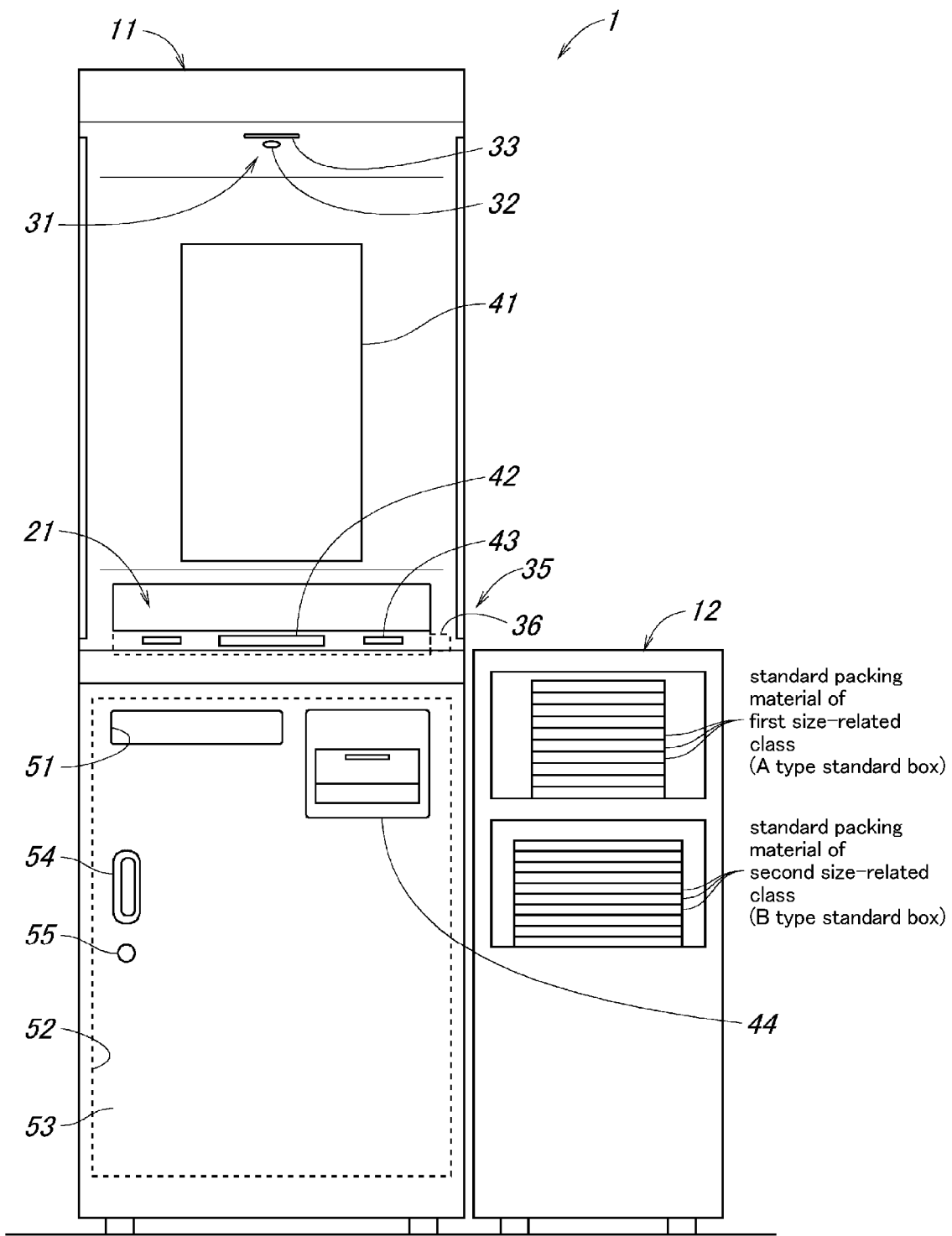
FIG. 2 is a schematic front view of the shipping assistance device 1.
Figure 3:
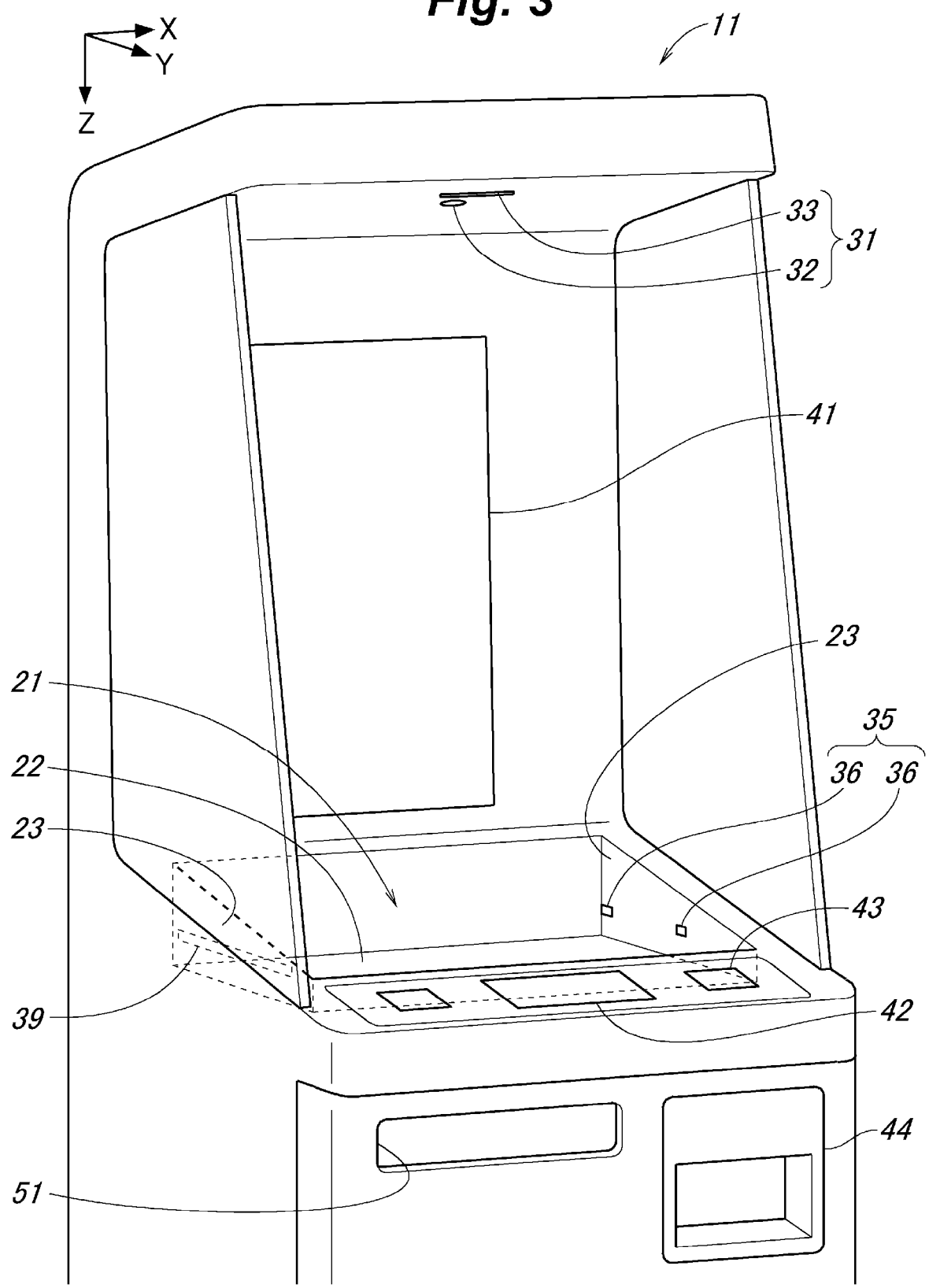
FIG. 3 is a perspective view showing the shipping assistance device 1.
Figure 4:
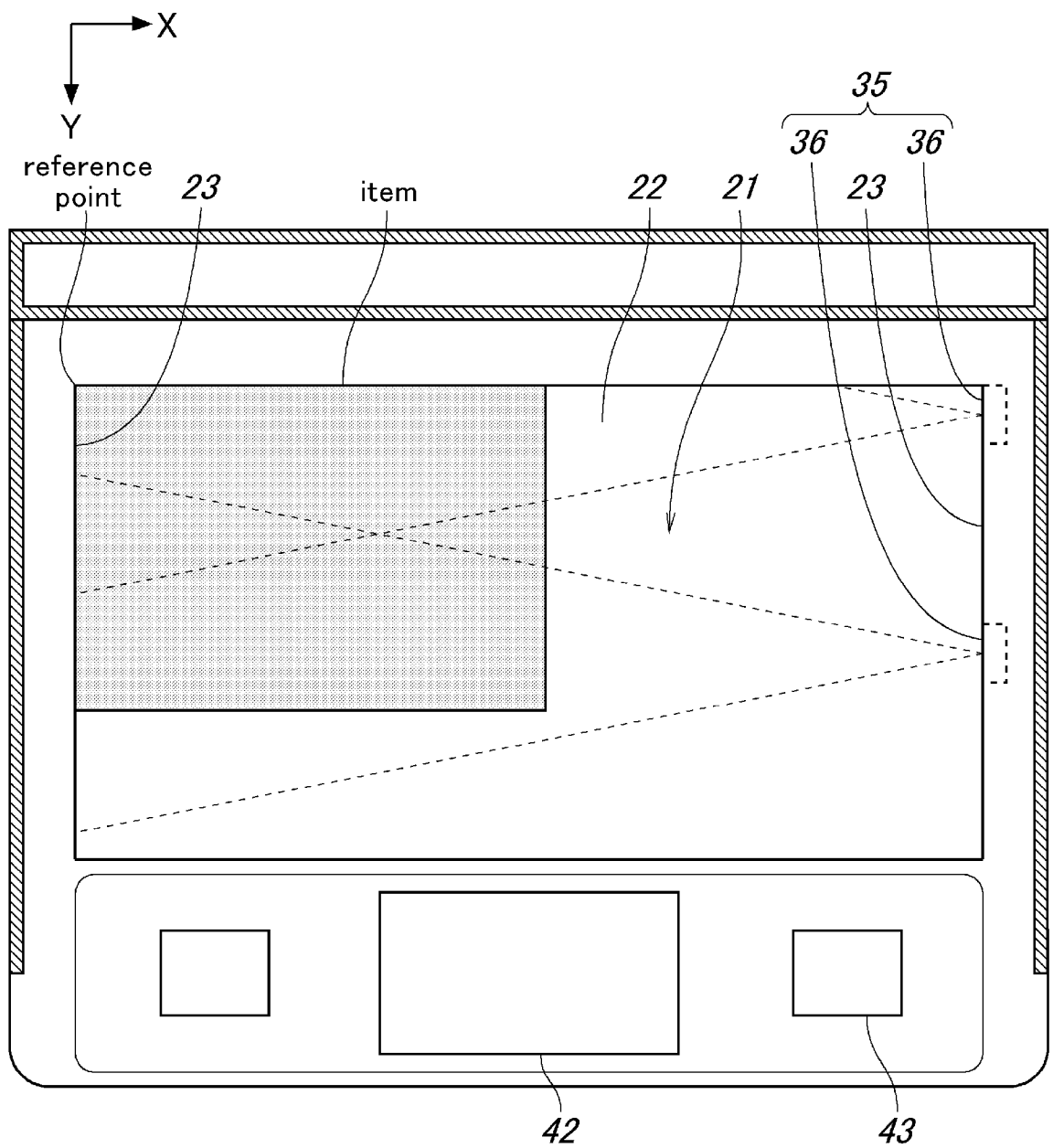
FIG. 4 is a cross-sectional view of the shipping assistance device 1 showing a table 21 viewed from above.
Figure 5:
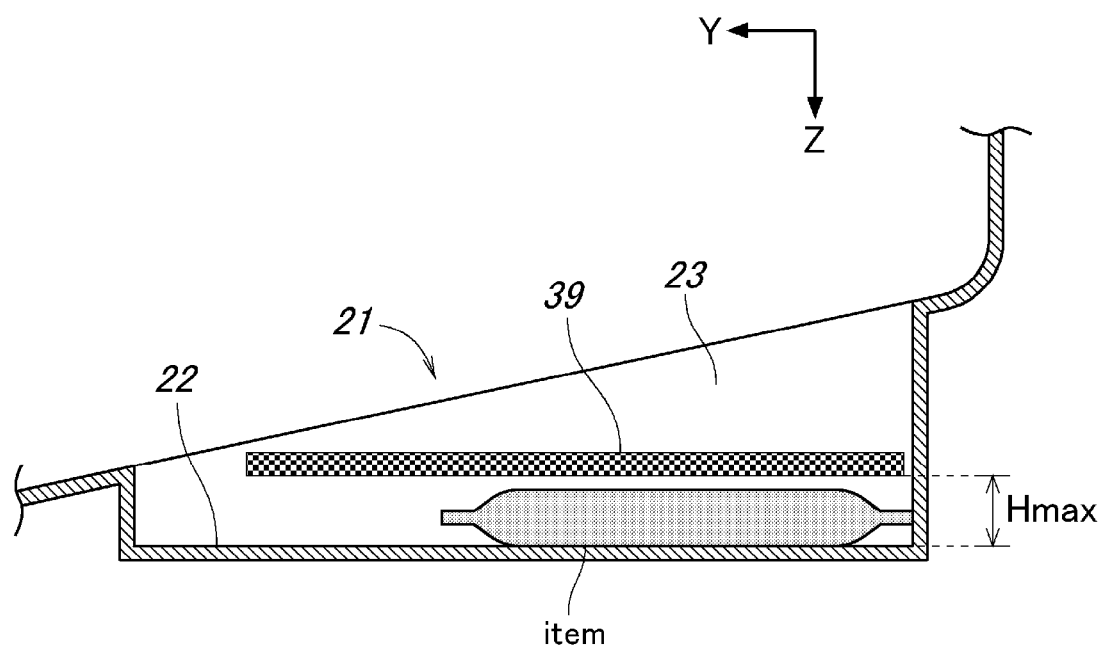
FIG. 5 is a cross-sectional view of the shipping assistance device 1 showing the table 21 viewed from the right side.
Figure 6:
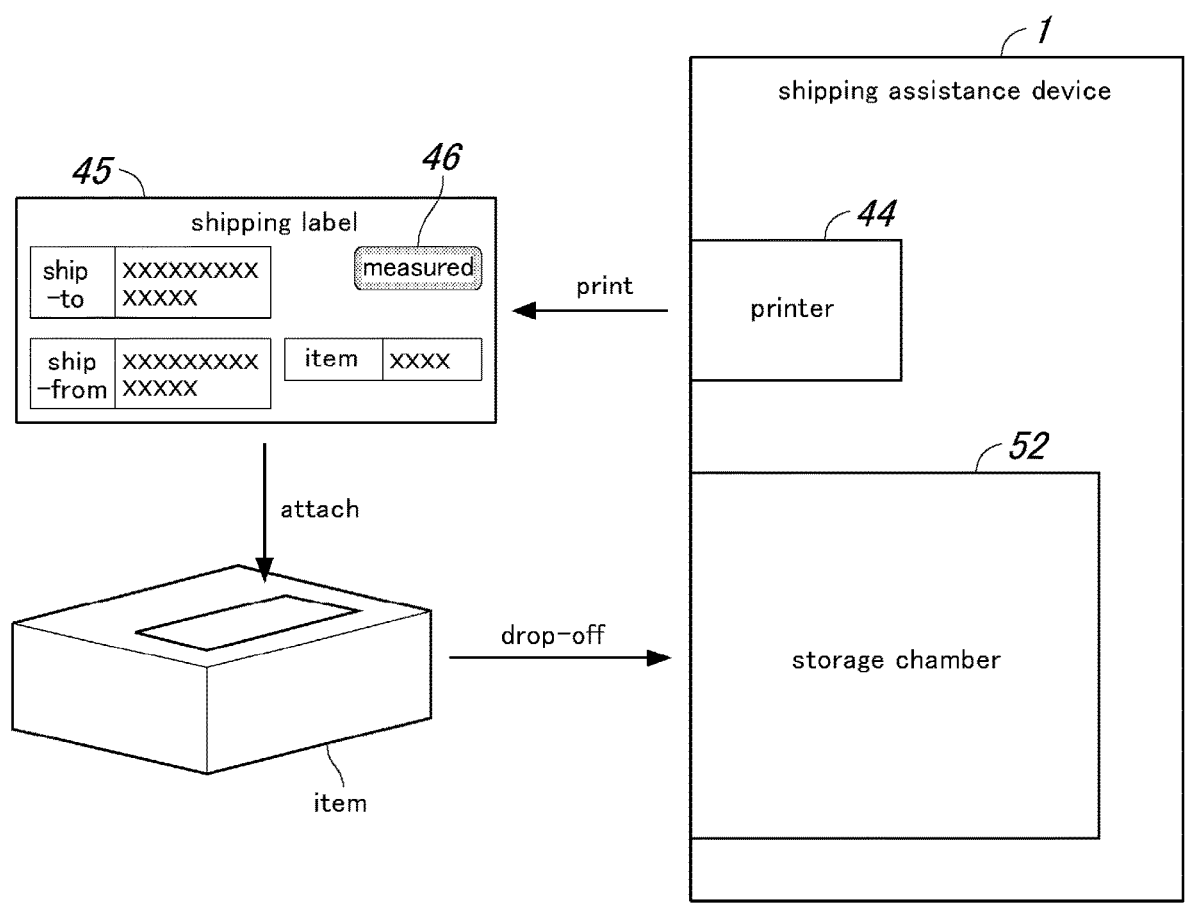
FIG. 6 is an explanatory diagram showing a shipping label printed by the shipping assistance device 1.

Next, a schematic configuration of the shipping assistance device 1 will be described. FIG. 2 is a schematic front view of the shipping assistance device 1. FIG. 3 is a perspective view showing the shipping assistance device 1. FIG. 4 is a cross-sectional view of the shipping assistance device 1 showing a table 21 viewed from above. FIG. 5 is a cross-sectional view of the shipping assistance device 1 showing the table 21 viewed from the right side. FIG. 6 is an explanatory diagram showing a shipping label printed by the shipping assistance device 1.

As shown in FIG. 2, the shipping assistance device 1 includes a main body 11 and a rack 12.

The rack 12 (stocker) accommodates packing materials (standard packing materials, compliant packing materials) that can contain an item and then be dropped in this device. In the present embodiment, the rack 12 accommodates two types of packing materials, a standard packing material for the first size-related class (A type standard box) and a standard packing material for the second size-related class (B type standard box). A user can purchase a packing material in the rack 12 by using the shipping assistance device 1. Packing materials are stored in the rack 12 in an unfolded state or in a folded state, and a user generally needs to assemble a packing material when packaging an item with it.

As shown in FIG. 3, the main body 11 includes a table 21 (table portion) to place items. An item brought by a user can be placed on the table 21. In the present embodiment, the shipping assistance device 1 measures the size of a packaged item or an unpackaged item placed on the table 21, and determines the size-related class which the item falls under. When a packing material is taken out from the rack 12 and placed on the table 21, the shipping assistance device 1 can recognize the type of the packing material on the table 21.

The table 21 is formed in a tray shape, and includes: a rectangular mounting surface 22 on which an object(s) (packaged item, unpackaged item, packing materials to be purchased) is placed; and front, rear, left and right side wall surfaces 23 surrounding the mounting surface 22. In the present embodiment, an X direction and a Y direction are defined as the horizontal direction (left-right direction) and the vertical direction (front-rear direction) of the mounting surface 22, respectively, and a Z direction is defined as the direction normal to the mounting surface 22 (height direction) as shown in FIG. 4.

An upper shooting device 31 (first detection device) is provided above the table 21 so as to face the mounting surface 22. The upper shooting device 31 includes a color camera 32 (two-dimensional camera) and a depth camera 33 (three-dimensional camera). The color camera 32 and the depth camera 33 shoot an object (packaged item, unpackaged item, packing material to be purchased) on the mounting surface 22 from above. The color camera 32 outputs a color image (detection result), and the depth camera 33 outputs a depth image (three-dimensional position data of the object) (detection result). The depth camera 33 may include multiple sub-cameras, some of which are used as the color camera 32. In this case, due to a decrease in the number of cameras, the total cost of manufacturing the device can be reduced.

The depth camera 33 is a three-dimensional camera that outputs three-dimensional position data of a subject, and may be a stereo camera or a TOF (Time of Flight) camera or any other suitable type of camera. A depth image is a distance image including data of the distance along the Z coordinate (the distance from the depth camera 33) for each pixel defined by the X coordinate and the Y coordinate.

A side shooting device 35 (second detection device) is provided on the side wall surface 23 on one side (the right side) of the table 21. The side shooting device 35 includes two color cameras 36 (two-dimensional cameras). The two color cameras 36 are arranged so as to be offset to each other in the front-rear direction (depth direction). The color cameras 36 shoot an object (packaged item) on the mounting surface 22 from the side. Each color camera 36 outputs a color image (detection result). The side shooting device 35 may be provided with three or more color cameras 36.

As shown in FIG. 5, a reference marker 39 is provided on the side wall surface 23 on one side (left side), so as to face the color cameras 36 of the side shooting device 35 provided on the side wall surface 23 on the opposite side (right side). The reference marker 39 contains a predetermined pattern (for example, a checker pattern).

The color cameras 36 of the side shooting device 35 shoot the reference marker 39 on the opposite side of the color cameras 36 along with an item on the table 21, which is located on the table 21 between the color cameras 36 and the reference marker 39. As a result, a color image acquired by each color camera 36 includes an image of the reference marker 39 that may be partially shielded by an item to the extent according to the height of the item. Thus, the shipping assistance device 1 can determine whether or not the height of the item exceeds the upper limit value based on how the image of the reference marker 39 is shielded in each color image.

In the present embodiment, the shipping assistance device 1 determines that the height of an item exceeds the upper limit value when the image of the reference marker 39 is partially missing in a color image. Specifically, the reference marker 39 is provided such that the height of the lowest part of the reference marker 39 from the mounting surface 22 matches the upper limit value Hmax. Thus, when the height of an item on the mounting surface 22 exceeds the upper limit value Hmax, the reference marker 39 is partially shielded by the item, the image of the reference marker 39 in a color image includes a partially missing part. As a result, the shipping assistance device 1 can accurately determine whether or not the height of an item exceeds the upper limit value Hmax. In addition, as shown in FIG. 4, since the two color cameras 36 of the side shooting device 35 are provided at different positions along the front-read direction, the shipping assistance device 1 can detect the height of item at every point on the mounting surface 22.

As shown in FIG. 3, a front-facing display 41 is provided above the table 21 so as to face the user. The front-facing display 41 mainly displays various guidance screens, e.g., guidance screens for indicating a shipping assistance service operation procedure.

An upward-facing display 42 is provided on the near (front) side of the table 21. The upward-facing display 42 is composed of a touch panel display. The upward-facing display 42 displays various operation screens.

A reader 43 is provided on one side of the upward-facing display 42. The reader 43 reads the two-dimensional code displayed on the screen of the smartphone 3. In the present embodiment, when a user purchases a packing material, the payment application of the smartphone 3 displays a certain two-dimensional code used for payment on the screen of the smartphone. When a user drops off an item into the shipping assistance device 1, the shipping application displays a certain two-dimensional code for shipping on the screen of the smartphone 3.

A printer 44 is provided on the front surface of the main body 11. The printer 44 is configured to print a shipping label 45 with a prescribed format (see FIG. 6) based on sender-entered information (including e.g., item (name of item) to be shipped, sender, destination, necessary care in handling the item (indication such as Fragile, Precision Instrument, Keep Refrigerated)) entered by a user using the smartphone 3. After packaging an item, the user can attached the printed shipping label 45 to the packaged item. From the viewpoint of personal information protection, it is also possible to print a shipping label in a confidential format in which information on sender and destination can be reproduced only by the delivery service operator. Furthermore, it is also possible to print ID information (a two-dimensional code) at a readable position(s) on a surface of a packing material itself, and associate the ID information with sender-entered information, thereby eliminating the need for printing shipping labels (as taught in Patent Document 2).

As shown in FIG. 6, in addition to the sender-entered information (including item to be shipped, sender, and destination) for the item to be shipped, the shipping label 45 contains an acceptance mark 46 drawn (printed) on a surface as an acceptance signature given to the item based on the measured size of the item (i.e., indicating a proper measurement of the size of the item). The acceptance mark 46 indicates that the shipping assistance device 1 has confirmed that the size of an item was properly measured.

In the present embodiment, in the case of an packaged item, the shipping assistance device 1 determines that the item is acceptable to the shipping assistance device; that is, the item is acceptable to be put into the device when the measured item falls under a size-related class which is acceptable to the device and there is no designation of necessary care in handling the item, which designation makes the item unsuitable to be put into the device; that is, the sender-entered information includes no designation of necessary care in handling the item. Furthermore, the shipping assistance device 1 prints a shipping label 45 including an acceptance mark 46. It should be noted that any acceptance mark 46 is not indicated (printed) on a standard shipping label which is not generated by the shipping assistance device 1.

In the example shown in FIG. 6, the word "measured" are printed on the shipping label 45 as an acceptance mark 46. In some cases, a predetermined symbol, a figure (icon), or any other mark may be indicated on the shipping label 45 as the acceptance mark 46. In other cases, the acceptance mark 46 on the shipping label 45 may be characters indicating the size-related class to which the item belongs determined based on the measurement result.

In the present embodiment, the shipping assistance device 1 prints a shipping label including an acceptance mark 46 as an acceptance signature which indicates a proper measurement of the size of an item. However, whether an item is acceptable or not may be expressed by a certain format of a shipping label in place of an acceptance mark 46. Specifically, when the shipping assistance device 1 has confirmed a proper measurement of the size of an item, the shipping assistance device 1 may print a shipping label having a special format which is different from the format of standard shipping labels.

When a user designates a necessary care in handling item (such as Fragile, Precision Instrument, Keep Refrigerated), the shipping assistance device 1 may print a shipping label including information on the designation of necessary care, in addition to information on the sender and destination and an acceptance mark (acceptance signature).

In this way, in the present embodiment, a visualized acceptance signature enables a shipping service operator worker to quickly confirm that the size of an item has been properly measured and there is no need to re-measure the size with the shipping assistance device 1 only by looking at the shipping label attached to the item. As a result, the delivery service operator can proceed to operations for transportation immediately after the pick-up of the item.

In addition to such a visualized acceptance signature, an electronic acceptance signature may be used to enable the shipping assistance device 1 to indicate to a delivery service operator that the size of an item has been properly measured. In this case, a delivery service operator worker cannot confirm whether or not the size of an item has been properly measured only by looking at the item. Thus, the server device 2 may be configured to associate an item with, in addition to information on sender and destination, an acceptance signature for managing the item, and transmit an acceptance signature for a corresponding item to a worker's terminal in response to a request from the terminal. In this case, as only a delivery service operator worker needs to confirm an acceptance signature, the server device 2 may be configured such that the server device 2 does not transmit any acceptance signature to the shipping assistance device 1.

In order to facilitate transmission of a request for acceptance signature from a terminal of the delivery service operator worker, a two-dimensional code containing the ID of an item may be given to the item in any of various forms such as a two-dimensional code indicated on a shipping label and a two-dimensional code printed on a packing material. In this case, a terminal of the delivery service operator worker may be configured to read the two-dimensional code from an item, thereby acquiring the item ID, generate a request for an acceptance signature for the item based on the item ID, and transmit the request to the server device 2. A terminal of the delivery service operator worker may enable the worker to confirm whether or not the measured size of an item is acceptable to the device through a screen display or voice/audio output.

Potential problems for this feature include a fraud in which the item subjected to measurement is changed to a different item when it is put in the device; that is, a shipping label printed for a small item, to which size measurement has been made, is attached to another large item, which is put in the device. In order to prevent such a fraud, the shipping assistance device 1 may have a checking function; that is, the shipping assistance device 1 may be configured to shoot an image of an item with a shipping label before it is dropped in the device, re-measure the size of the item, acquire the size-related class indicated on the shipping label by performing an image recognition process on the shot image, and check whether or not the size-related class indicated on the shipping label matches the actual size-related class.

As shown in FIG. 2, the main body 11 includes a drop slot 51 through which users can drop items in the device, and a storage chamber 52 for receiving and storing dropped items. A delivery service operator worker can take out the items stored in the storage chamber 52, thereby carrying out the pick-up of items. In the present embodiment, since the shipping assistance device 1 measures the size of each item and accepts only items having acceptable sizes that belong to certain size-related classes, the delivery service operator does not need to re-check the size-related class of each item after the pick-up of items, which means that the delivery service operator can immediately proceed to the subsequent operations after the pick-up of items, without any operation for size measurement that has been required in the prior art.

A door 53 is provided at the front side of the storage chamber 52, and the door 53 includes a handle 54 and a lock 55. The lock 55 can be unlocked by delivery service operator workers in charge of pick-up of items, which prevents persons other than those workers from taking out items stored in the storage chamber 52.

Thus, in the present embodiment, the shipping assistance device 1 includes the table 21 (table portion), the upper shooting device 31 (detection device), the side shooting device 35 (detection device), the front-facing display 41 (display device), the upward-facing display 42 (display device, user interface) and the storage chamber 52, where all these components are integrally provided in a single housing of the main body 11. As a result, the shipping assistance device 1 can be made more compact and it becomes easier to install the device in a store such as a convenience store.

The drop slot 51 is formed in a shape and size suitable for items having acceptable sizes. Specifically, the drop slot 51 is formed as an opening having such a size (width, height) as to be capable of accepting only small items that fall under the certain size-related classes.

In the present embodiment, the shipping assistance device 1 is configured to use the color cameras 36 in the side shooting device 35 and measure the height of an item based on how the image of the reference marker 39 is shielded in each color image, thereby achieving highly accurate measurement. However, the shipping assistance device 1 may use sensors other than cameras. For example, the shipping assistance device 1 may include a sensor device (such as a photoelectric sensor) configured to measure the height of an item based on how the light emitted from a light emitter and then received at a light receiver is shielded by the item placed therebetween. In other cases, the upper shooting device 31 may be provided with a sensor(s) other than cameras (such as a measurement device using a multi-laser to generate three-dimensional data), and measurement may be made based on detection result of such a sensor.

In the present embodiment, the shipping assistance device 1 includes the table 21, the upper shooting device 31, the side shooting device 35, the front-facing display 41, the upward-facing display 42 and the storage chamber 52, and all these components are integrally provided in the main body 11. However, the table 21, the upper shooting device 31, and the side shooting device 35 for shooting an object may be configured separately from the storage chamber 52. In other cases, the front-facing display 41 and the upward-facing display 42, which are used to provide guidance to users and provide a user interface, respectively, may be configured separately from the storage chamber 52. In this case, when only the table 21 is located between the front-facing display 41 and the upward-facing display 42, whether the displays are provided separately from, or integrally with the main body is of no matter to users. This arrangement of the table and the displays enables the shipping assistance device 1 to be made compact and more easy to use.

Figure 7:
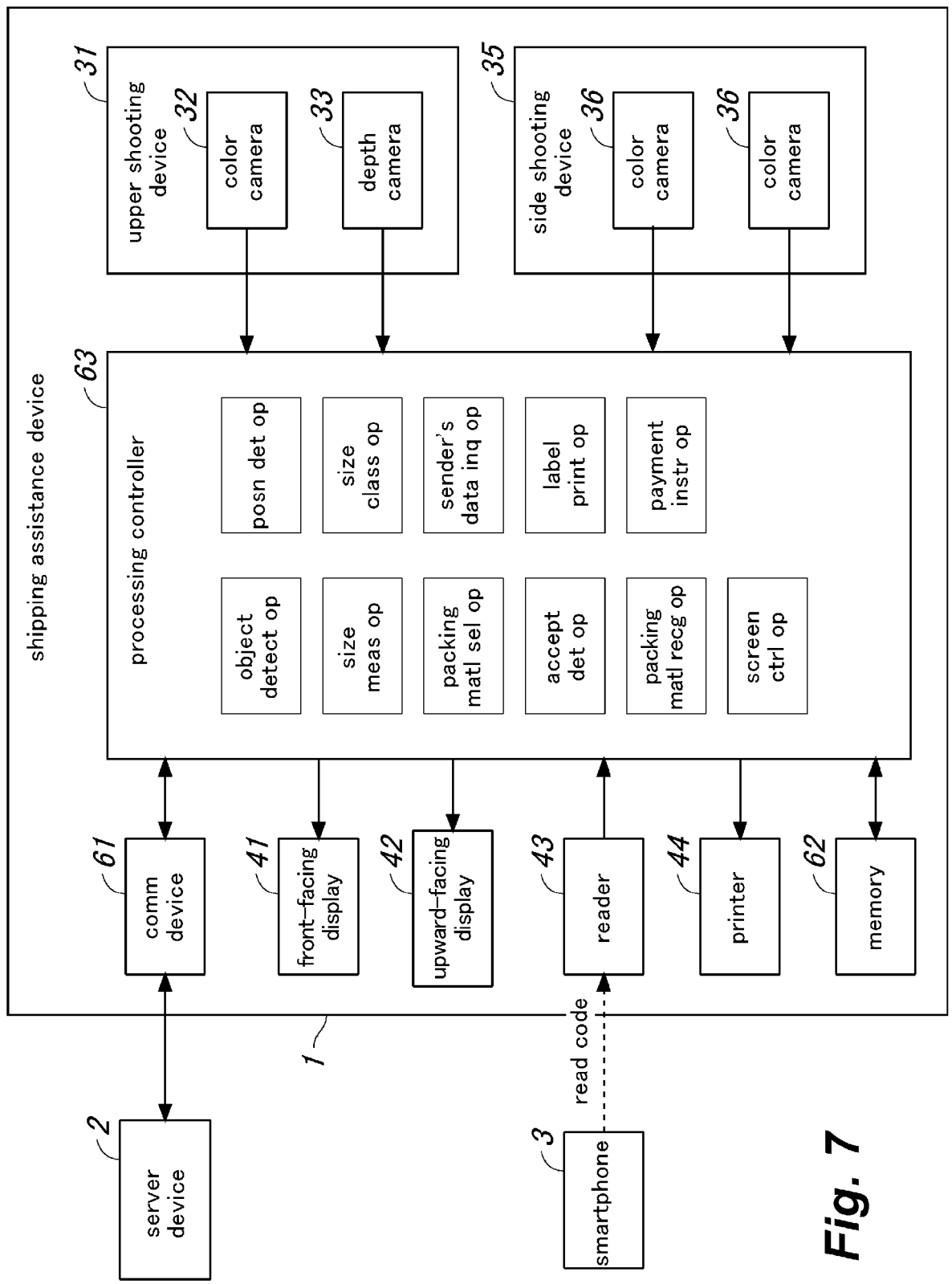
FIG. 7 is a block diagram showing a schematic configuration of the shipping assistance device 1.

Next, a schematic configuration of the shipping assistance device 1 will be described. FIG. 7 is a block diagram showing the schematic configuration of the shipping assistance device 1.

As described above, the shipping assistance device 1 includes the upper shooting device 31 with the color camera 32 and the depth camera 33, the side shooting device 35 with the two color cameras 36, the front-facing display 41, the upward-facing display 42, the reader 43, and the printer 44.

The shipping assistance device 1 further includes a communication device 61, a memory 62, and a processing controller 63.

The communication device 61 is configured to communicate with the server device 2 via a network.

The memory 62 stores programs that can be executed by the processing controller 63, and other data.

The processing controller 63 executes programs stored in the memory 62 to perform various processing operations related to shipping assistance. In the present embodiment, the processing controller 63 performs an object detection operation, an object positioning operation, a size measurement operation, a size classification operation, a packing material selection operation, a sender-entered data inquiry operation, an acceptability determining operation, a shipping label printing operation, a packing material recognition operation, a payment instruction operation, a screen control operation, and other operations. Functional units including the communication device 61, the memory 62, and the processing controller 63 are implemented by a general-purpose PC or tablet (information processing device), for example.

In the object detection operation, the processing controller 63 detects an object (unpackaged item, packaged item, or packing material to be purchased) on the table 21 based on a color image acquired from the color camera 32 of the upper shooting device 31.

In the object positioning operation, the processing controller 63 determines whether or not an object is placed at a reference position based on a color image acquired from the color camera 32 of the upper shooting device 31. In the present embodiment, the left-back corner of the mounting surface 22 is a reference point, and a reference position of an item is defined such that the item is located at the reference position when the left-back corner of the item is aligned with the reference point (see FIG. 4).

In the size measurement operation, the processing controller 63 measures the size (vertical dimension, horizontal dimension, and height) of a subject item (packaged item, or unpackaged item) on the table 21, based on a color image captured by the color camera 32 of the upper shooting device 31, a depth image captured by the depth camera 33 of the upper shooting device 31, and color images captured by the color cameras 36 of the side shooting device 35. The size measurement based on the color images captured by the color cameras 36 of the side shooting device 35 is not necessarily done when the accuracy of depth-image-based size measurement permits.

In the size classification operation, the processing controller 63 determines the size-related class to which the subject item on the table 21 belongs, based on the measurement result of the size measurement operation. Furthermore, in the size classification operation, the processing controller 63 determines whether or not the size-related class for the subject item is likely to be changed from the current class determined based on the measurement result of the size measurement operation. In order to determine the changeability of the class, the processing controller 63 compares the measurement result; that is, the dimensions (vertical dimension, horizontal dimension, and height) of the item, with standard values for the size-related class of the item, and also with standard values for another size-related class where a shipping cost is lower than that for the current size-related class of the item. Specifically, the processing controller 63 determines whether or not the dimensions of the item slightly exceeds the standard values for the size-related class for the item; that is, determines whether or not the size-related class is likely to be changed when a user changes the way the item is placed on the table (for example, when a user arranges the shape of the item, or when a user moves the item towards the reference point).

In the packing material selection operation, which is performed when the subject item is an unpackaged item, the processing controller 63 selects the most recommendable packing material for the subject unpackaged item; that is, selects the packing material for the size-related class of the subject item, based on the measurement result of the size measurement operation.

In the sender-entered data inquiry operation, the processing controller 63 makes an inquiry to the server device 2 regarding the subject item, and acquires the sender-entered information from the server device 2. The sender-entered information has been previously entered (declared) by a user using the smartphone 3 or any of other terminals, and includes information on the item (name) to be shipped, sender, destination, and necessary care in handling item for the subject item. The information on necessary care in handling item indicates that the item is unsuitable to be put into the device, and is included in the sender-entered information when there is a designation of necessary care in handling the item such as Fragile, Precision Instrument, or Keep Refrigerated. The shipping assistance device 1 can acquire sender-entered information from the server device 2 by accessing the server device 2 based on the user's registered data, which is acquired by reading a two-dimensional code for shipping displayed on the screen of the smartphone 3 with the reader 43.

In the acceptability determining operation, the processing controller 63 determines whether or not the subject item is allowed to be put into the device based on the results of the size classification operation and the sender-entered data inquiry operation. Specifically, in the case of an unpackaged item, when the size-related class determined bases on the measured actual size of the item is a size-related class for items that are acceptable to be put into the device, the processing controller 63 determines that the item is acceptable to be put into the device. In the case of a packaged item, when the size-related class determined based on the measured actual size of the item is a size-related class for items that are acceptable to be put into the device and there is no designation of necessary care in handling the item (i.e., the sender-entered information includes no designation of necessary care in handling the item), which makes the item unsuitable to be put into the device, the processing controller 63 determines that the item is acceptable to be put into the device. In this operation, when the item is determined to be acceptable to be put into the device, the processing controller 63 continues operations of the shipping procedure for the item, and when the item is determined to be unacceptable to be put into the device, the processing controller 63 interrupts the shipping procedure.

In the shipping label printing operation, the processing controller 63 instructs the printer 44 to print a shipping label to be attached to the item based on the sender-entered information (including item (name) to be shipped sender, and destination) acquired from the server device 2. The printed shipping label contains, in addition to sender and destination information, an acceptance signature indicating that the size of the item has been properly measured in the shipping assistance device 1.

In the packing material recognition operation to be performed when a user places a packing material on the table 21 for purchase, the processing controller 63 recognizes the type of the packing material on the table 21, by performing an image recognition process on the color image captured by the color camera 32 of the upper shooting device 31.

In the payment instruction operation, the processing controller 63 accesses and instructs the server device 2 to perform a payment processing operation for the packing material purchased by the user, based on the user's payment information, which is acquired with the reader 43 by reading a two-dimensional code for payment displayed on the screen of the smartphone 3.

In the screen control operation, the processing controller 63 displays a guidance screen for assisting a user to do a shipping procedure on the front-facing display 41 and the upward-facing display 42, in response to the user's operation on the upward-facing display 42. In the present embodiment, the processing controller 63 displays, for example, a screen for presenting measurement result of the size measurement operation to the user (measurement result presentation operation). Specifically, the measurement result indicated on the screen includes the size of an item (vertical dimension, horizontal dimension, and height) and a shipping cost (including a shipping fee and a price of packing material) for the item. In the present embodiment, in the case of an unpackaged item, the processing controller 63 displays a screen for presenting a packing material suitable for the item to the user (packing material presentation operation).

Next, operations performed by the shipping assistance device 1 when a subject item is a packaged item will be described. FIG. 8 is an explanatory diagram showing an outline of operations for a packaged item.

The shipping assistance device 1 accepts only items that fall under designated size-related classes, as items that are acceptable to be put in the device. In the present embodiment, only items that fall under two size-related classes consisting of a first size-related class and a second size-related class are acceptable to be put in the shipping assistance device 1.

In the case of items of the first size-related class, as shown in FIG. 8A, the only type of an item that can be put into the shipping assistance device 1 is an item packed with a standard packing material having a prescribed size. Examples of standard packing materials for the first size-related class include a cardboard box.

In the case of items of the second size-related class, as shown in FIG. 8B, the only type of an item that can be put into the shipping assistance device 1 is an item packed with a compliant packing material having a size that belongs to the second size-related class. Examples of compliant packing materials for the second size-related class include a cardboard box. Compliant packing materials are non-standard packing materials such as buffered envelopes.

In the operations (size measurement operation and size classification operation) for a packaged item, the shipping assistance device 1 determines which one of the following types a subject item is, (i) a type of a subject item is, an item packed with a standard packing material of the first size-related class as shown in FIG. 8A; (ii) an item packed with a standard packing material of the second size-related class as shown in FIG. 8B; (iii) an item packed with a compliant packing material of the second size-related class as shown in FIG. 8C; and (iv) an item packed with a packing material of other type, where the determination is made based on a color image captured by the color camera 32 of the upper shooting device 31, a depth image captured by the depth camera 33 of the upper shooting device 31, and color images captured by the color cameras 36 of the side shooting device 35.

Particularly, in the operations to determine that an item is packed with a standard packing material of the first size-related class as shown in FIG. 8A and those to determine an item packed with a standard packing material of the second size-related class as shown in FIG. 8B, the determinations are made based on a color image captured by the color camera 32 of the upper shooting device 31 and a depth image captured by the depth camera 33 of the upper shooting device 31. More specifically, the shipping assistance device 1 acquires three-dimensional size data (vertical dimension, horizontal dimension, and height) of an object based on the depth image (three-dimensional position data of the subject) from the upper shooting device 31, and then determines whether or not the packing material is a standard packing material based on the acquired three-dimensional size data. Furthermore, the shipping assistance device 1 detects an image (service mark or unique pattern) printed on the surface of a standard packing material by performing an image recognition process on the color image from the upper shooting device 31, and then determines whether or not the packing material is a standard packing material.

In the operations to determine that an item is packed with a compliant packing material of the second size-related class as shown in FIG. 8C, the determination is made based on a color image captured by the color camera 32 of the upper shooting device 31 and color images captured by the color cameras 36 of the side shooting device 35. More specifically, the shipping assistance device 1 acquires two-dimensional size data (vertical dimension, and horizontal dimension) of an object based on the color image from the upper shooting device 31, and then determines whether or not the packing material is a compliant packing material based on the acquired two-dimensional size data. Moreover, the shipping assistance device 1 acquires the height of an object based on how the image of the reference marker 39 is shielded in the color images from the side shooting device 35, and then determines whether or not the packing material is a compliant packing material based on the acquired height. In other embodiments, in the operations to determine that an item is packed with a compliant packing material of the second size-related class as shown in FIG. 8C, the determination may be made based on a color image captured by the color camera 32 of the upper shooting device 31 and a depth image captured by the depth camera 33 of the upper shooting device 31, without any change in processing operations.

Then, in the operations to determine that an item is packed with a standard packing material of the first size-related class, the shipping assistance device 1 determines whether or not the measured vertical dimension, horizontal dimension and height match the size (vertical dimension, horizontal dimension, and height) of a standard packing material. In the operations to determine that an item is packed with a standard packing material of the second size-related class, the shipping assistance device 1 determines whether or not the measured vertical dimension, horizontal dimension and height match the size (vertical dimension, horizontal dimension, and height) of a standard packing material, in the same manner as the case of a packing material of the first size-related class.

In the operations to determine that an item is packed with a standard packing material of the second size-related class, the size (vertical dimension, horizontal dimension, and height) of a standard packing material of the second size-related class is a prescribed maximum size, which means that the vertical dimension, horizontal dimension and height are up to the respective upper limits. In addition, a standard packing material needs to have a greater foot print size than a prescribed minimum foot print size. In other words, the vertical dimension and horizontal dimension need to be greater than or equal to the respective lower limits. Accordingly, when the horizontal dimension and vertical dimension are equal to less than the respective upper limits and are greater than or equal to the respective lower limits, and the height is less than or equal to its upper limit, the shipping assistance device 1 determines that an item is packed with a standard packing material of the second size-related class.

In this way, in the present embodiment, when a subject item is a packaged item packed with a standard packing material, the shipping assistance device 1 determines the size-related class of the subject item based on the combination of (i) the three-dimensional size data of the subject item in a depth image captured by the depth camera 33 of the upper shooting device 31 (provisional size data) and (ii) the result of the image recognition process on a color image captured by the color camera 32 of the upper shooting device 31. In this configuration, even when there is a significant error in the height information acquired from the depth image, a standard packing material can be identified by the result of image recognition process, which means that, by using the combination of these two pieces of information, the shipping assistance device 1 can determine the size-related class of a subject item with sufficient accuracy and in an efficient manner.

When a subject item is a packaged item packed with a non-standard packing material, the shipping assistance device 1 determines the size-related class of the subject item based on the combination of (i) two-dimensional size data (vertical dimension, and horizontal dimension) of the subject item acquired from a color image captured by the color camera 32 of the upper shooting device 31 and (ii) the height data (correction size data) of the subject item acquired based on how the image of the reference marker 39 is shielded in the color images captured by the color cameras 36 of the side shooting device 35. A non-standard packing material cannot be identified by the result of image recognition process, which means that, when the shipping assistance device 1 determines the height only from an image from the upper shooting device 31, there is a possible significant error in the height data, making it difficult for the shipping assistance device 1 to determine the size-related class of a subject item with sufficient accuracy. However, since the determination of the size-related class of a subject item can be made with sufficient accuracy based on the reference marker 39 in the color images from the side shooting device 35, the shipping assistance device 1 can determine, by using the combination of these two pieces of information, the size-related class of a subject item with sufficient accuracy and in an efficient manner.

In the present embodiment, only items that fall under the first and second size-related classes are acceptable to be put into the shipping assistance device 1. In other embodiments, the shipping assistance device 1 may be configured to accept items that fall under any of three or more certain size-related classes. In this case, the drop slot 51 may be made larger. Alternatively, the shipping assistance device 1 may be provided with respective drop slots 51 for different size-related classes so that items of each size-related class can be put into a corresponding drop slot 51.

In the present embodiment, two types of packing materials; that is, a standard packing material of the first size-related class (A type standard box) and a standard packing material of the second size-related class (B type standard box) are stored in the rack 12 to be available for purchase by users. However, since some non-standard packing materials are acceptable as materials of the second size-related class, non-standard compliant packing materials of the second size-related class may also be stored in the rack 12 to be available for purchase by users.

Figure 9:
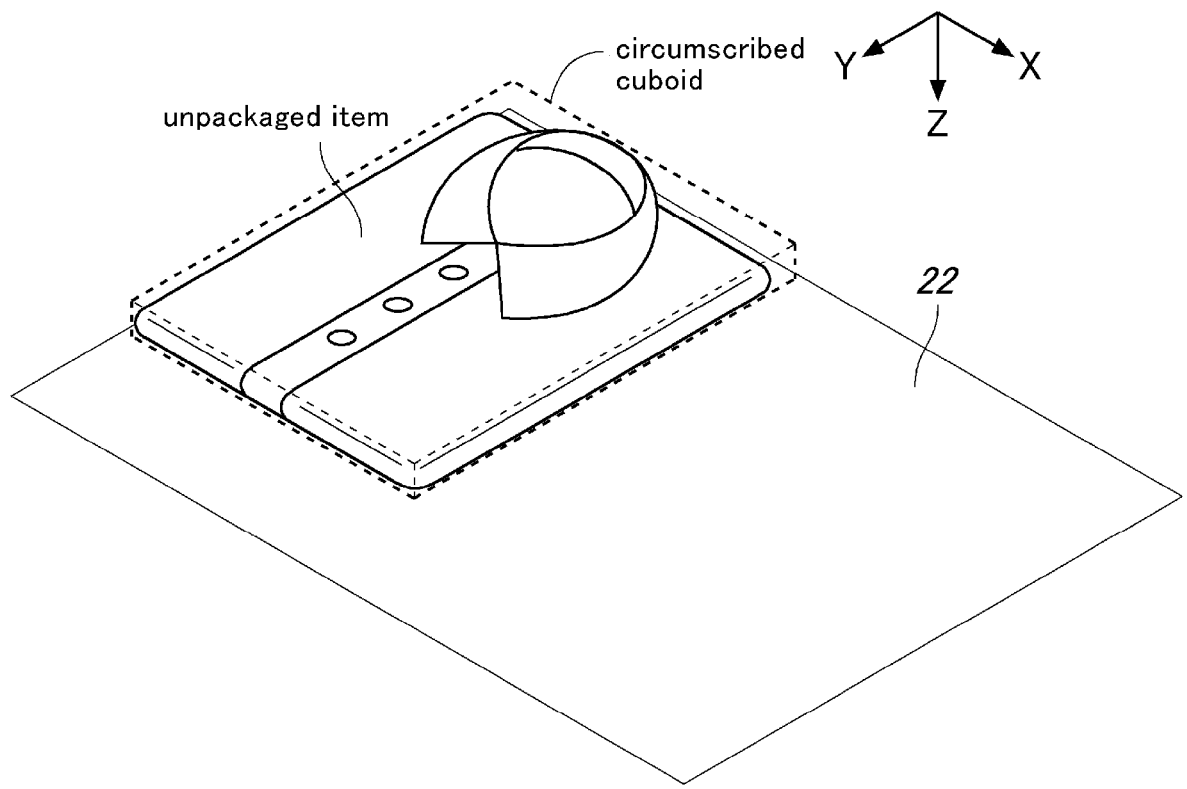
FIG. 9 is an explanatory diagram showing an outline of operations performed by the shipping assistance device 1 when an item to be shipped is an unpackaged item.

Next, operations performed by the shipping assistance device 1 when a subject item is an unpackaged item will be described. FIG. 9 is an explanatory diagram showing an outline of operations for an unpackaged item.

The shipping assistance device 1 determines whether or not an unpacked package falls under any of the size-related classes (e.g., first and second size-related classes) that are acceptable to be put into the device (size classification operation). The depth camera 33 of the upper shooting device 31 shoots an unpackaged item on the table 21 to provide a depth image (three-dimensional position data). Then, based on the depth image (three-dimensional position data) from the upper shooting device 31, the shipping assistance device 1 determines a circumscribed cuboid surrounding a front side image; that is, an image of the front side of an object (the unpackaged item) in the depth image, and acquires the lengths of three sides of the circumscribed cuboid (dimensions in the X direction, the Y direction, and the Z direction). Then, based on the lengths of three sides of the circumscribed cuboid, the shipping assistance device 1 determines whether or not the object falls under any of the size-related classes (first and second size-related classes) that are acceptable to be put into the device.

Specifically, the shipping assistance device 1 extracts an front side image (an image of part of an object that can be seen from the front) from a color image captured by the color camera 32 of the upper shooting device 31, and acquires two-dimensional position data of the front side image (of the object). Next, based on the combination of (i) a depth image (three-dimensional position data) acquired by the depth camera 33 of the upper shooting device 31, and (ii) the two-dimensional position data of the front side image (of the object), the shipping assistance device 1 determines a circumscribed cuboid surrounding the front side image (of the object). Next, the shipping assistance device 1 calculates X direction, Y direction, and Z direction dimensions of the circumscribed cuboid. Then, based on the X direction, Y direction, and Z direction dimensions of the circumscribed cuboid, the shipping assistance device 1 determines whether or not the subject falls under any of the size-related classes (first and second size-related classes) that are acceptable to be put into the device.

The height of the front side image (of the object) from the mounting surface 22 is the Z direction dimension of the circumscribed cuboid. Thus, the shipping assistance device 1 can acquire the Z direction dimension of the circumscribed cuboid by calculating a Z direction front-back difference between the front side image and a background image; that is, the Z direction difference between the current depth image and a depth image (background image) previously captured by the depth camera 33 without any object on the table 21. In addition, since the height from the mounting surface 22 can vary, the maximum value of the height from the mounting surface 22 is determined to be the Z direction dimension of the circumscribed cuboid.

In the present embodiment, the height of an object is determined based on the difference between a current depth image and a background image. However, when the height of an object is less than the lower limit for detection (for example, 1 cm) such as the case of a CD or DVD package, the shipping assistance device 1 cannot properly acquire the difference between a current depth image and a background image to measure the height of the object. In such cases, the shipping assistance device 1 may use two-dimensional size data acquired from a color image(s) and set the lower limit for detection (for example, 1 cm) as the height included in object size data, which would cause no particular problem.

The shipping assistance device 1 performs the packing material recognition operation for a packing material to be purchased by a user. In the present embodiment, packing materials (standard packing materials of the first size-related class and standard packing materials of the second size-related class) stored in the rack are available for purchase. A user can pick up one from the rack 12 and then put it on the table 21. The shipping assistance device 1 is configured to determine whether the packing material on the table 21 is a standard packing material of the first size-related class or a standard packing material of the second size-related class by performing the image recognition process on a color image captured by the color camera 32 of the upper shooting device 31. A pattern (service mark or unique pattern) is printed on the surface of either a standard packing material of the first size-related class or a standard packing material of the second size-related class. In the packing material recognition operation, the shipping assistance device 1 detects a packing material on the table 21 from a color image captured by the color camera 32 of the upper shooting device 31. Then, the shipping assistance device 1 recognizes the shape and size of the packing material and also recognizes the type of the packing material based on an image (service mark or unique pattern) printed on the surface of the packing material.

The rack 12 contains packing materials in a pre-assembled state (where packing materials are unfolded or folded). Each type of a packing material can be identified based on the shape, size, and pattern printed on the surface of the packing material in the pre-assembled state.

In the present embodiment, when an object (a packaged item, an unpackaged item, or a packing material to be purchased) is placed on the table 21, the shipping assistance device 1 performs the object positioning operation. In the present embodiment, as shown in FIG. 4, the left-back corner of the mounting surface 22 is a reference point, and a reference position of an item is defined such that the item is located at the reference position when the left-back corner of the item is aligned with the reference point. A user needs to place an object (a packaged item, an unpackaged item, or a packing material to be purchased) at the reference position.

The shipping assistance device 1 detects the position of an object by performing the image recognition process on a color image captured by the color camera 32 of the upper shooting device 31, and determines whether or not the object is placed at the reference position. When the object is located out of the reference position, the shipping assistance device 1 displays a guidance screen on the front-facing display 41 or voice output to provide guidance for prompting a user to move the object toward the reference position.

Figure 10:
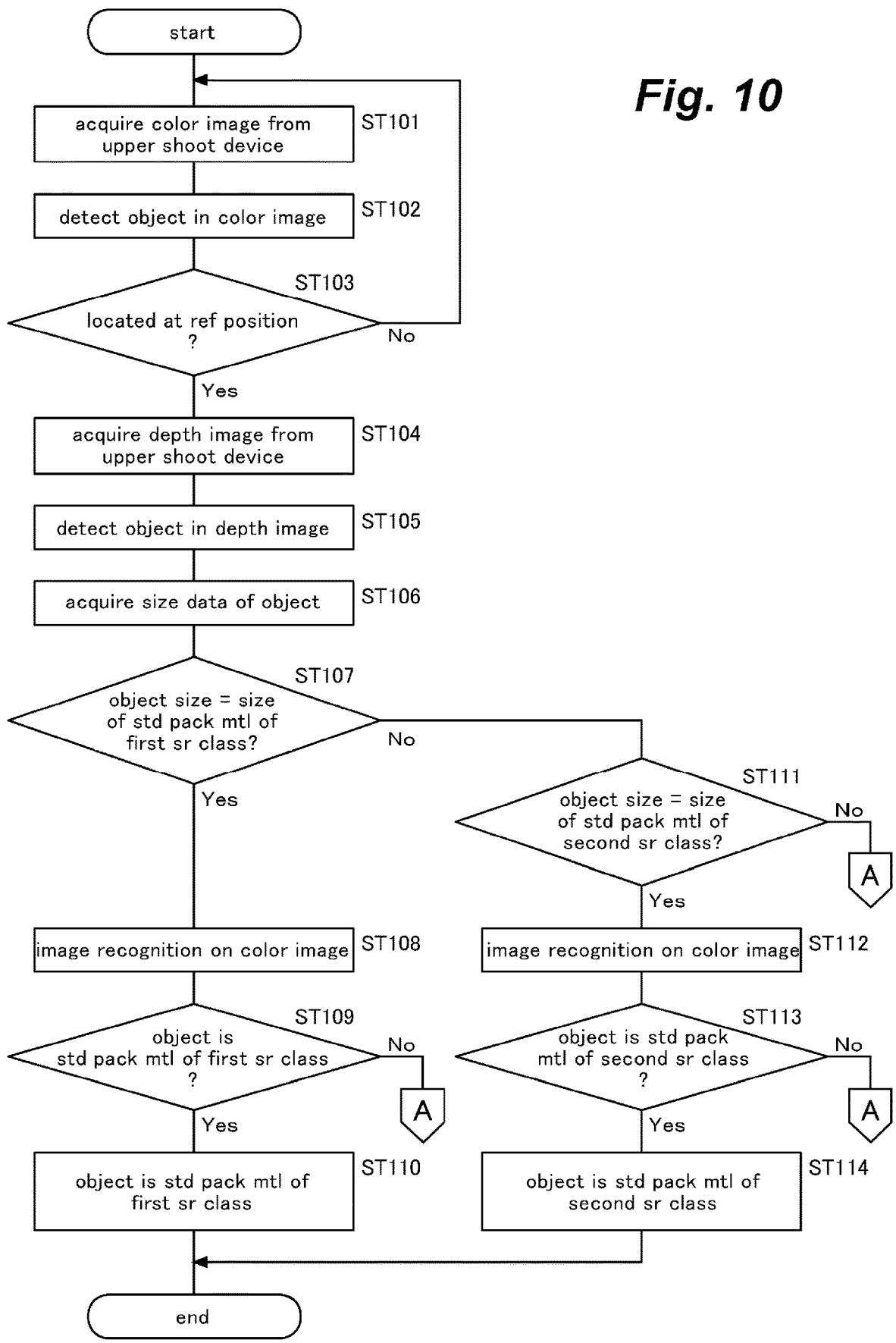
FIGS. 10 and 11 are flow charts showing an operation procedure of operations performed by the shipping assistance device 1 when an item to be shipped is a packaged item.
Figure 11:
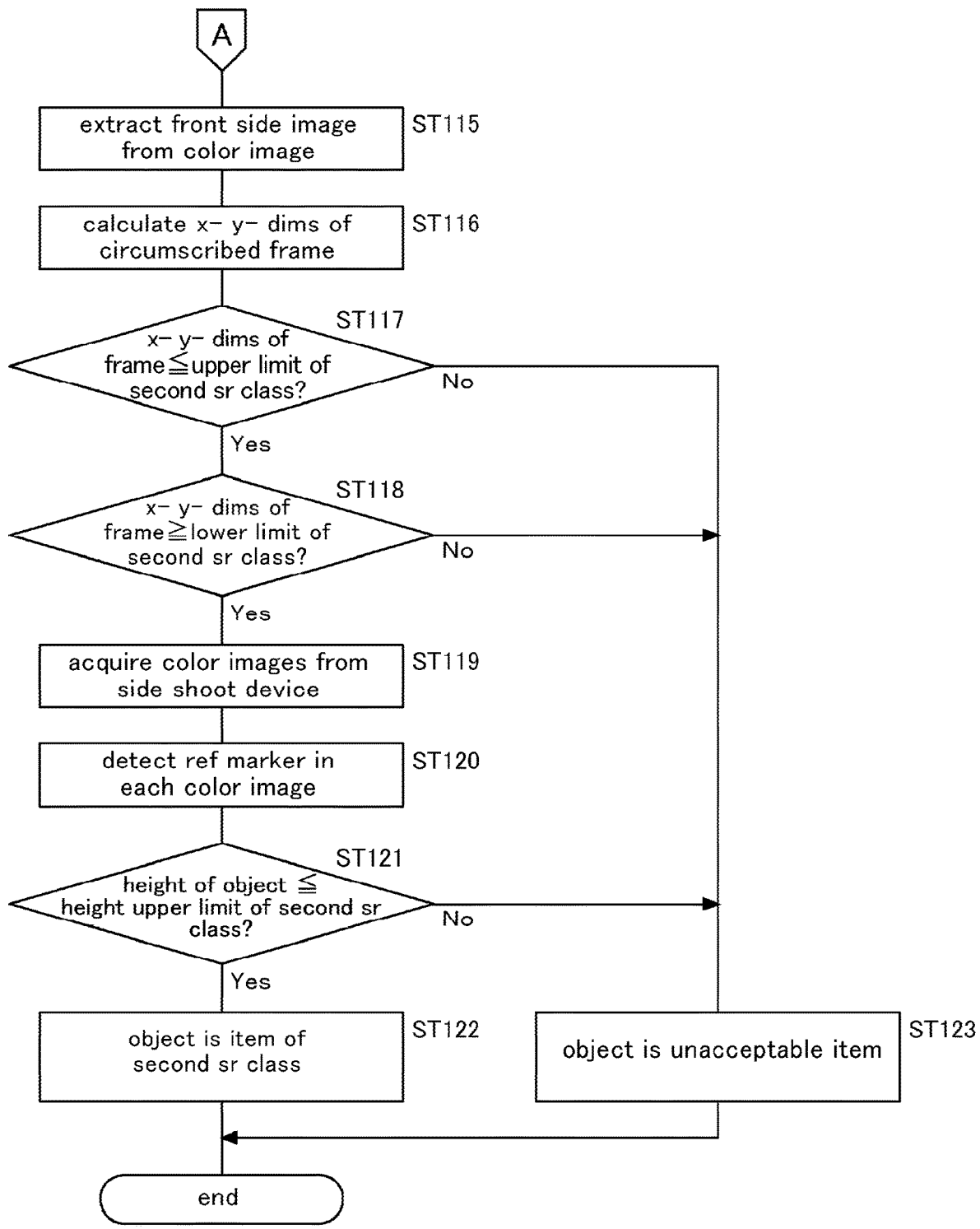

Next, operations performed by the shipping assistance device 1 when a subject item is a packaged item will be described. FIGS. 10 and 11 are flow charts showing an operation procedure of operations for a packaged item.

As shown in FIG. 10, first, the processing controller 63 of the shipping assistance device 1 acquires a color image from the color camera 32 of the upper shooting device 31 (ST101). Next, the processing controller 63 detects an object on the table 21 by performing the image recognition process on a color image (object detection operation) (ST102). Then, the processing controller 63 determines whether or not the object is placed at the reference position (object positioning operation) (ST103).

When the object is placed at the reference position (Yes in ST103), the processing controller 63 acquires a depth image (three-dimensional position data of the object) from the depth camera 33 of the upper shooting device 31 (ST104). Next, the processing controller 63 detects the object from the depth image (ST105). Next, the processing controller 63 acquires size data (vertical dimension, horizontal dimension, height) of the object based on the depth image (size measurement processing) (ST106). Then, the processing controller 63 determines whether or not the size of the object matches the size of a standard packing material of the first size-related class (ST107).

When the size of the object matches the size of a standard packing material of the first size-related class (Yes in ST107), then the processing controller 63 performs the image recognition process on the color image (ST108). Next, the processing controller 63 determines whether or not the object is a standard packing material of the first size-related class based on the image recognition result (size classification operation) (ST109).

When the processing controller 63 determines that the object is a standard packing material of the first size-related class (Yes in ST109), the object is confirmed to be an item packed with the standard packing material of the first size-related class (ST110).

When the size of the object does not match the size of a standard packing material of the first size-related class (No in ST107), then the processing controller 63 determines whether or not the size of the object matches a standard packing material of the second size-related class (ST111).

When the size of the object matches the size of a standard packing material of the second size-related class (Yes in ST111), then the processing controller 63 performs the image recognition process on the color image (ST112). Then, based on the image recognition result, the processing controller 63 determines whether or not the object is a standard packing material of the second size-related class (size classification operation) (ST113).

When the processing controller 63 determines that the object is a standard packing material of the second size-related class (Yes in ST113), the object is confirmed to be an item packed with the standard packing material of the second size-related class (ST114).

When the processing controller 63 determines that the object is not a standard packing material of the first size-related class (No in ST109), or when the size of the object does not match the size of a standard box of the second size-related class (No in ST111), or when the processing controller 63 determines that the object is not a standard box of the second size-related class (No in ST113), the process proceeds to steps in which the processing controller 63 determines whether or not the object is a non-standard compliant packing material of the second size-related class (second-size-class compliant material determination operation).

As shown in FIG. 11, in the second-size-class compliant material determination operation, the processing controller 63 first extracts a front side image (area) of an object from a color image captured by the color camera 32 of the upper shooting device 31 (ST115). Then, the processing controller 63 determines a front-back difference in the color image; that is, the difference between the current depth image and a color image (background image) previously captured by the color camera 32 without any object on the table 21, to thereby extract the front side image area. Next, the processing controller 63 determines a circumscribed frame surrounding the front side image and calculates dimensions in the X direction and the Y direction of the circumscribed frame (size measurement operation) (ST116).

Next, the processing controller 63 determines whether or not the dimension in the X direction of the circumscribed frame is less than or equal to the width upper limit for the second size-related class and the dimension in the Y direction is less than or equal to the depth upper limit for the second size-related class (ST117).

When the X direction dimension of the circumscribed frame is less than or equal to the X direction upper limit for the second size-related class and the Y direction dimension is less than or equal to the Y direction upper limit for the second size-related class (Yes in ST117), the processing controller 63 determines whether or not the X direction dimension of the circumscribed frame is greater than or equal to the width lower limit for the second size-related class, and the Y direction dimension is greater than or equal to the depth lower limit for the second size-related class (ST118).

When the X direction dimension of the circumscribed frame is greater than or equal to the X direction lower limit for the second size-related class and the Y direction dimension is greater than or equal to the Y direction lower limit for the second size-related class (Yes in ST118), then processing The controller 63 acquires a color image from the color camera 36 of the side shooting device 35 (ST119). Next, the processing controller 63 detects the reference marker 39 from the color image (ST120). Then, the processing controller 63 determines whether or not the height of the object is less than or equal to the height upper limit for the second size-related class based on how the reference marker 39 is shielded in the color image (size classification operation) (ST121). In some cases, in the size measurement operation (ST116), the processing controller 63 may acquire size data (vertical dimension, horizontal dimension, height) of the object based on a depth image to determine the height of the object. In this case, the color cameras 36 of the side shooting device 35 are not necessarily required.

When the height of the object is less than or equal to the height upper limit for the second size-related class (Yes in ST121), then the processing controller 63 determines that the object is an item of the second size-related class (a packaged item packed with a non-standard packing material) (ST122).

When the X direction dimension of the circumscribed frame exceeds the X direction upper limit for the second size-related class and/or the Y direction dimension exceeds the Y direction upper limit for the second size-related class (No in ST117), or when the X direction dimension of the circumscribed frame is less than the X direction lower limit for the second size-related class and/or the Y direction dimension is less than the Y direction lower limit for the second size-related class (No in ST118), or when the height of the object exceeds the height upper limit for the second size-related class (No in ST121), then the processing controller 63 determines that the object is unacceptable to be put into the device (ST123).

Figure 12:
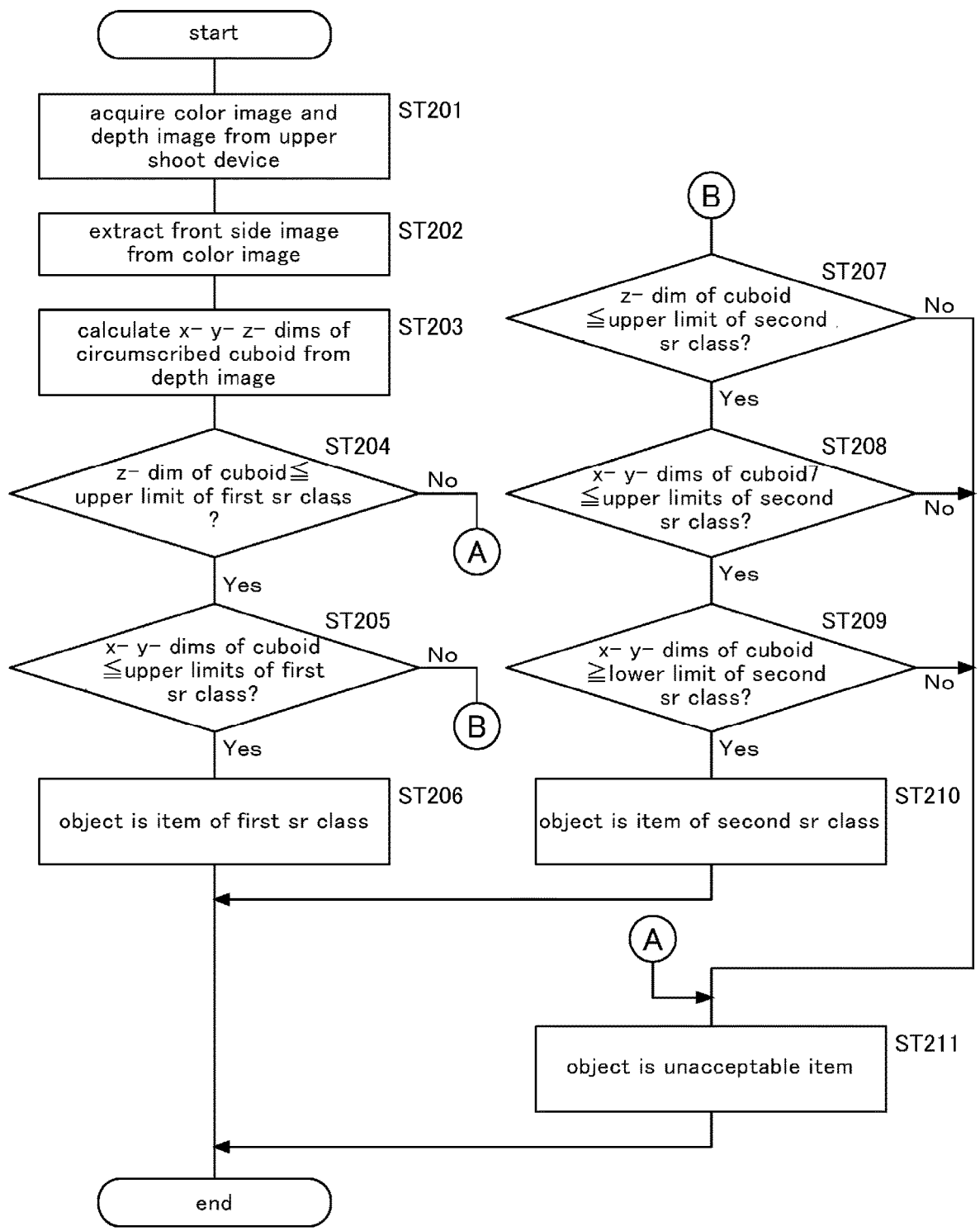
FIG. 12 is a flow chart showing an operation procedure of operations performed by the shipping assistance device 1 when an item to be shipped is an unpackaged item.

Next, operations performed by the shipping assistance device 1 when a subject item is an unpackaged item will be described. FIG. 12 is a flow chart showing an operation procedure of operations for an unpackaged item.

First, the processing controller 63 in the shipping assistance device 1 acquires a color image and a depth image (three-dimensional position data) from the color camera 32 and the depth camera 33 of the upper shooting device 31, respectively (ST201). In other cases, when the processing controller 63 detects that an object is placed on the table 21 based on the Z direction front-back difference (height data) of the depth image, the operation process may proceed to the subsequent steps. In some cases, the processing controller 63 may be configured such that, when the height of an object is less than the lower limit for detection and the object cannot be detected, the processing controller 63 uses two-dimensional size data acquired by extracting the front side image from the color image, and generates the size data including the lower limit for detection as the height of the object.

Next, the processing controller 63 extracts a front side image (of the object) from the color image (ST202). Next, the processing controller 63 determines a circumscribed cuboid surrounding the front side image (of the object) based on the depth image (three-dimensional position data), and calculates X direction, Y direction, and Z direction dimensions of the circumscribed cuboid (size measurement operation) (ST203).

Next, the processing controller 63 determines whether or not the Z direction dimension of the circumscribed cuboid is less than or equal to the height upper limit for the first size-related class (ST204).

When the Z direction dimension of the circumscribed cuboid is less than or equal to the height upper limit for the first size-related class (Yes in ST204), then the processing controller 63 determines that the X direction dimension of the circumscribed cuboid is less than or equal to the width upper limit for the first size-related class and the Y direction dimension of the circumscribed cuboid is less than or equal to the depth upper limit for the first size-related class (ST205).

When the X direction dimension of the circumscribed cuboid is less than or equal to the X direction upper limit for the first size-related class and the Y direction dimension of the circumscribed cuboid is less than or equal to the Y direction upper limit for the first size-related class (Yes in ST205), the processing controller 63 determines that the object is an item of the first size-related class (ST206).

When the X direction dimension of the circumscribed cuboid exceeds the X direction upper limit for the first size-related class or the Y direction dimension of the circumscribed cuboid exceeds the Y direction upper limit for the first size-related class (No in ST205), then the processing controller 63 determines whether or not the height from the mounting surface 22 is less than or equal to the height upper limit for the first second size-related class (ST207).

When the Z direction dimension of the circumscribed cuboid is less than or equal to the height upper limit for the second size-related class (Yes in ST207), then the processing controller 63 determines whether or not the X direction dimension of the circumscribed cuboid is less than or equal to the width upper limit for the second size-related class and the Y direction dimension of the circumscribed cuboid is less than or equal to the depth upper limit for the second size-related class (ST208).

Then, when the X direction dimension of the circumscribed cuboid is less than or equal to the width upper limit for the second size-related class and the Y direction dimension of the circumscribed cuboid is less than or equal to the depth upper limit for the second size-related class (Yes in ST208), the processing controller 63 determines whether or not the X direction dimension of the circumscribed cuboid is greater than or equal to the width lower limit for the second size-related class and the Y direction dimension of the circumscribed cuboid is greater than or equal to the depth lower limit for the second size-related class (ST209).

When the X direction dimension of the circumscribed cuboid is greater than or equal to the width lower limit for the second size-related class and the Y direction dimension of the circumscribed cuboid is greater than or equal to the depth lower limit for the second size-related class (Yes in ST209), the processing controller 63 determines that the object is an item of the second size-related class (ST210).

When the maximum height from the mounting surface 22 exceeds the height upper limit for the first size-related class (No in ST204), or when the maximum height from the mounting surface 22 exceeds the height upper limit for the second size-related class (No in ST207), or when the X direction dimension of the circumscribed cuboid exceeds the X direction upper limit for the second size-related class or the Y direction dimension exceeds the Y direction upper limit for the second size-related class (No in ST208), or when the X direction dimension of the circumscribed cuboid is less than the X direction lower limit for the second size-related class or the Y direction dimension is less than the Y direction lower limit for the second size-related class (No in ST209), the processing controller 63 determines that the object is an item that is unacceptable to be put in the device (ST211).

Next, screens displayed on the displays when the shipping assistance device 1 is in a standby state will be described. FIG. 13 is an explanatory diagram showing screens displayed on the displays when the shipping assistance device 1 is in a standby state.

Figure 13A:
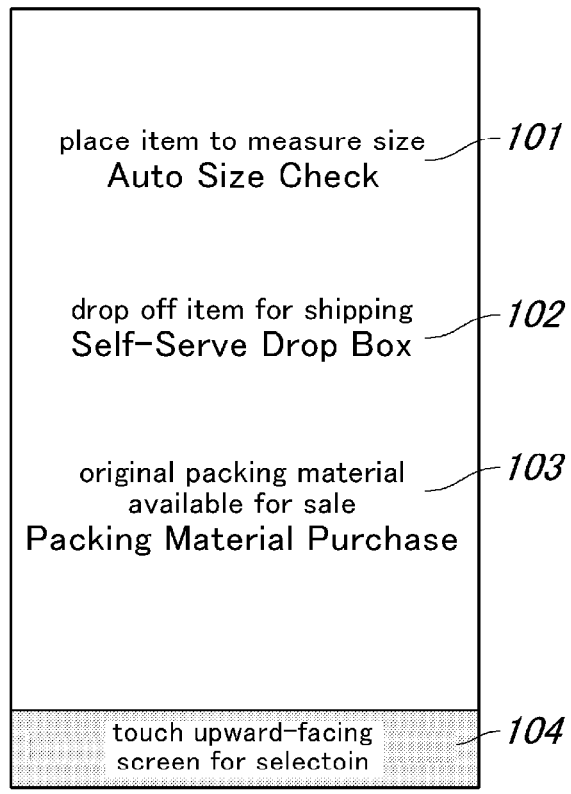
FIGS. 13(A)-(B) are explanatory diagrams showing screens displayed on the displays when the shipping assistance device 1 is in a standby state.
Figure 13B:
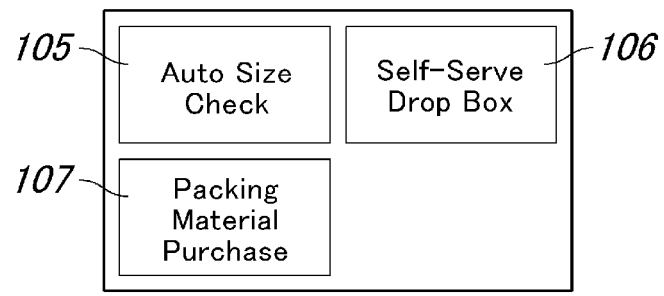

When the shipping assistance device 1 is in the standby state, the front-facing display 41 displays the screen (standby screen) shown in FIG. 13A and the upward-facing display 42 displays the screen (standby screen) shown in FIG. 13B.

The screen as shown in FIG. 13A, which is displayed on the front-facing display 41, includes guidance texts of a menu of shipping assistance servicers; that is, (i) texts 101 of guidance for an automatic measurement mode (first mode), which include "Auto Size Check"; (ii) texts 102 of guidance for a self-drop-off mode (second mode), which include "Self-Serve Drop Box"; and (iii) texts 103 of guidance for a packing material purchase mode (third mode), which include "Packing Material Purchase." The screen also include texts 104 of guidance indicating that a user can select one of the automatic measurement mode, the self-drop-off mode, and the packing material purchase mode by operating the upward-facing display 42.

The screen as shown in FIG. 13B, which is displayed on the upward-facing display 42, includes a selection button 105 with title of "Auto Size Check" for selecting the automatic measurement mode; a selection button 106 with title of "Self-Serve Drop Box" for selecting the self-drop-off mode; and a selection button 107 with title of "Packing Material Purchase" for selecting the packing material purchase mode. A user can select one of the three operation modes by tapping a corresponding one of the selection buttons 105, 106 and 107.

In the case of the automatic measurement mode selected by operating the button with title of "Auto Size Check", when a user brings an unpackaged item, the shipping assistance device 1 presents a packing material suitable for the item to the user so that the user can purchase a packing material through self-checkout.

Operations in the automatic measurement mode include a packing material selection step and a packing material vending step. In the packing material selection step, the processing controller 63 of the shipping assistance device 1 determines the size-related class of the unpackaged item on the table 21, and determines whether or not the item is acceptable to be put into the device (acceptability determining operation). When the item is acceptable to be put into the device, the processing controller 63 selects and presents a packing material for the size-related class of the item to the user (packing material presentation operation). In the packing material vending step, the processing controller 63 recognizes the type of packing material that a user has taken out from the rack 12 and placed on the table 21 based on an image captured by the color camera 32 of the upper shooting device 31 (packing material recognition operation) and performs a payment (settlement) processing operation for the packing material (payment processing operation).

In the case of the self-drop-off mode selected by operating the button with title of "Self-Serve Drop Box", when a user brings an packaged item, the shipping assistance device 1 prints a shipping label for the shipping of the item based on sender-entered information that has been previously entered by the user so that the user can attach the printed shipping label to the packaged item and drop it into the device through the drop slot 51.

In the self-drop-off mode, the processing controller 63 of the shipping assistance device 1 determines the size-related class of the packaged item on the table 21 (size classification operation); makes an inquiry to the server device 2 regarding information on necessary care in handling the item (such as Fragile, Precision Instrument, Keep Refrigerated) included in sender-entered information (sender-entered data inquiry operation); and determines the item is acceptable to be put into the device when the item falls under a size-related class for items that are acceptable and there is no designation of necessary care in handling the item (acceptability determining operation). When the item is determined to be acceptable, the processing controller 63 instructs the printer 44 to print a shipping label based on the sender-entered information that was entered by the user (shipping label printing operation).

In the case of the packing material purchase mode selected by operating the button with title of "Packing Material Purchase", a user is allowed to purchase a packing material through self-checkout. In the packing material purchase mode, the processing controller 63 of the shipping assistance device 1 recognizes the type of a packing material which is placed on the table 21 by the user for purchase based on a color image captured by the color camera 32 of the upper shooting device 31 (packing material recognition operation), and performs a payment (settlement) processing operation for the packing material (payment processing operation).

Next, screens displayed when the shipping assistance device 1 is in the automatic measurement mode. FIGS. 14 to 17 are explanatory diagrams showing screens displayed on the displays when the shipping assistance device 1 is in the automatic measurement mode.

In the shipping assistance device 1, when a user operates the selection button 105 with title of "Auto Size Check" for selecting the automatic measurement mode in the screen shown in FIG. 13B displayed on the upward-facing display 42, the screens displayed on the front-facing display 41 and the upward-facing display 42 transition to the screens shown in FIGS. 14A-1 and 14B-1, respectively.

The screen as shown in FIG. 14A-1 on the front-facing display 41 includes texts 111 for prompting a user to place an item to be measured on the table 21, and a video 112 for indicating how to place an item on the table 21. As an item needs to be placed at the reference position where the item is located at the left-back corner of the table 21, the video 112 shows that an item is placed at the center of the table 21 and then moved toward the left-back corner of the table 21.

The screen on the upward-facing display 42 as shown in FIG. 14B-1 includes texts 115 for prompting a user to place an item to be measured on table 21, and a button 116 for starting size measurement. When a user operates the button 116 for starting size measurement, the shipping assistance device 1 starts the size measurement operation and then performs the acceptability determining operation. The shipping assistance device 1 may be configured such that, when the size measurement operation is started, the screen on the upward-facing display 42 may transition to a screen for notifying a user that the shipping assistance device 1 is measuring the size of the item When the processing controller 63 of the shipping assistance device 1 detects an item on the table 21, measures the size of the item on the table 21, determines that the item is acceptable to be put in the device, and determines that the size-related class for the subject item is unlikely to be changed, the screens displayed on the front-facing display 41 and the upward-facing display 42 transition to the screens shown in FIGS. 14B-1 and 14B-2, respectively.

The screen on the front-facing display 41 shown in FIG. 14A-2 indicates size data (i.e., a size measurement result), which includes texts 121 for indicating three values representing the size of the item, which are the lengths of three sides of the circumscribed cuboid surrounding the item; and texts 122 representing a shipping cost (specifically, a shipping fee plus a price of packing material). The screen also includes texts 123 for notifying a user that the user can re-measure the size of the item after the shape of the item is arranged or the location of the item is changed. Although the size of an item itself is indicated as size data in the present embodiment, the indicated size data may be typical dimensions of the size-related class for the item.

The screen on the upward-facing display 42 shown in FIG. 14B-2 includes texts and FIG. 125 indicating the size of an item (vertical dimension, horizontal dimension, and height); texts 126 representing a shipping cost; and texts 127 indicating most recommendable packing material for the item. The screen also includes a re-measurement button 128 for re-measuring the size of an item, and a purchase button 129 for proceeding to the packing material vending step.

When a user operates the re-measurement button 128, the shipping assistance device 1 re-measures the size of an item. In some cases, the size-related class for the item can be changed when the user changes the way the item is placed on the table, or when the user arranges the shape of the item including e.g., a set of items or closing. When the size-related class for an item is likely to be changed in this way, the user can operate the re-measurement button 128 to re-measure the item on the table. When the user operates the purchase button 129, the screens displayed on the front-facing display 41 and the upward-facing display 42 transition to the screens shown in FIGS. 15A-2 and 15B-2, respectively.

Moreover, when the processing controller 63 determines that the size-related class for the item is likely to be changed, the screen on the upward-facing display 42 transitions to the screen shown in FIG. 14B-3. This screen on the upward-facing display 42 shown in FIG. 14B-3 includes, in place of the texts 127 in the screen shown in FIG. 14B-2, texts 130 for providing advice information as to how to place an unpackaged item properly.

When the user changes the way the item is placed on the table (for example, when the user arranges the shape of the item, or the user moves the item towards the reference point), the size-related class may be changed so that a cheaper packing material can be used for the item. Thus, the advice information is provided to a user to encourage the user to re-measure the size of an item. In the example shown in FIG. 14B-3, the text message "There is still room in height" is displayed as advice information. Other examples of advice information may include the text message "Move the item toward the reference point."

Such advice information enables a user to easily confirm if the item can be shipped with a more appropriate packing material at more appropriate (cheaper) shipping fee. Based on such advice information, the user can arrange the shape of the item, or move it towards the reference point and then operate the re-measurement button 128. In some cases, the size-related class of the item is changed to a more appropriate (cheaper) size-related class and a more appropriate (cheap) packing material is presented to the user. As a result, the user can quickly confirm the most suitable packing material for the user's unpackaged item.

Advice information may be displayed in the screen on the front-facing display 41 shown in FIG. 14A-2. Alternatively, advice information may also be provided in the form of voice/audio output in addition to the screen display.

As described above, in the present embodiment, re-measurement of the size of an item can be repeated. When the item is an unpackaged item, the size-related class may be changed when a user changes the way the item is place on the table, unlike the case that the item is a package item. Therefore, the configuration allows the re-measurement of the size of an item to be repeated until the user confirms that the re-measurement is no longer necessary, thereby minimizing the shipping cost (a shipping fee plus a price of packing material) for the item.

The screen on the upward-facing display 42 (FIG. 14B-1 and other figures) includes an end button 119 used to end the measurement operation. The end button 119 enables the user to end the measurement operation at a certain appropriate time. When the user operates the end button 119, the screen transitions to a confirmation screen used to end the measurement operation (not shown). When the user operates the confirmation screen to approve the end of the measurement operation, the automatic measurement mode terminates and the device returns to in the standby state.

Since the payment (settlement) for the packing material is made as an online payment through the smartphone 3 using a designated payment service, before transitioning to the screen shown in FIG. 15A-2, the upward-facing display 42 may display a screen used to inquire whether or not the user's registration of a designated payment service has been completed, and a screen for prompting a user to ask store staff for guidance for the designated payment service.

When the processing controller 63 determines that the item is unacceptable to be put in the device in the acceptability determining operation, the screens on the front-facing display 41 and the upward-facing display 42 transition to the screens shown in FIGS. 15A-1 and 15B-1, respectively.

The screen on the front-facing display 41 shown in FIG. 15A-1 includes texts 131 for prompting a user to bring an item to a shipping counter in a store for shipping since the item is unacceptable to the device, and an image 132 for providing guidance to the shipping counter.

The screen on the upward-facing display 42 shown in FIG. 15B-1 includes texts (and figure) 135 for indicating the size of an item (length, width, and height), texts 136 for informing that the item is unacceptable to be put in the device, and texts 137 for prompting a user to bring the item to a shipping counter in a store in order to perform the shipping procedure. When the processing controller 63 determines that the item is unacceptable to be put in the device, values of the length, width, and/or height of the item which exceed their acceptable limits may be indicated with highlight.

The screen on the front-facing display 41 shown in FIG. 15A-2 includes a guidance image 141 for indicating packing materials available for purchase at the device, and texts 142 for prompting the user to select and take out a packing material from the rack 12 next to the main body 11. In the present embodiment, a standard packing material of the first size-related class (A type standard box) and a standard packing material of the second size-related class (B type standard box) are available for purchase at the shipping assistance device. Furthermore, the screen may indicate the type of packing material suitable for the item with highlight in order to present the suitable type of material to the user. In addition, the type (or types) of a packing material that is not suitable for the item may be grayed out on the screen.

The screen on the upward-facing display 42 shown in FIG. 15B-2 includes texts 145 and 146 for prompting the user to select a packing material suitable for the item. Different types of packing materials may be separately placed on the different shelves in the rack 12. In this case, each shelf of the rack 12 may be provided with an indicator such as an LED lamp so that, when the display presents a type of a packing material suitable for the item to a user, an indicator(s) at a shelf for the suitable packing materials may be turned on, prompting the user to take out a suitable packing material from that shelf.

When a predetermined time has elapsed after the screens on the front-facing display 41 and the upward-facing display 42 transition to the screens shown in FIGS. 15A-2 and 15B-2, respectively, the screens on the front-facing display 41 and the upward-facing display 42 transition to the screens shown in FIGS. 16A-1 and 16B-1, respectively.

The screen as shown in FIG. 16A-1 on the front-facing display 41 includes texts 151 for prompting the user to place the selected packing material on the table 21, guidance texts 152 for indicating that, when purchasing two or more packing materials, the user needs to place the packing materials one by one on the table 21, a video 153 for indicating how to place a packing material on the table 21, and guidance texts 154 for indicating that the payment application needs to be installed on the smartphone 3. As an item needs to be placed at the reference position where the item is located at the left-back corner of the table 21, the video 153 shows that an item is placed at the center of the table 21 and then moved toward the left-back corner of the table 21.

The screen on the upward-facing display 42 as shown in FIG. 16B-1 includes texts 155 for prompting the user to place the selected packing material on table 21, and texts (and FIG. 156 for indicating a type (name) and a price of the packing material suitable for the item.

When the processing controller 63 of the shipping assistance device 1 detects a packing material on the table 21, and recognizes the type of the packing material on the table 21, the screen on the upward-facing display 42 transitions to the screen shown in FIG. 16B-2.

The screen on the upward-facing display 42 shown in FIG. 16B-2 indicates texts 157 for prompting the user to confirm and make a purchase of the selected packing material, texts (and figures) 156 for indicating the type (name) and the price of the recognized packing material, a re-selection button 158 used to re-select another packing material, and a purchase button 159 for proceeding to the purchase of the packing material.

When the user operates the re-selection button 158, the screen on the upward-facing display 42 transitions to the screen shown in FIG. 16B-3. When the user operates the purchase button 159, the screens on the front-facing display 41 and the upward-facing display 42 transition to the screens shown in FIGS. 17A-1 and 17B-1, respectively. When the user needs to confirm the suitable packing material determined based on the size measurement of an item, and does not want to purchase a packing material, the user needs only to operate the end button 119 on the screen on the upward-facing display 42 shown in FIG. 16B-2.

The screen on the upward-facing display 42 shown in FIG. 16B-3 includes texts 161 for prompting the user to select the packing material, a packing material selection part 162, and a cancel button 163. When the user operates the packing material selection part 162, the screens on the front-facing display 41 and the upward-facing display 42 transition to the screens shown in FIGS. 17A-1 and 17B-1, respectively. When the user operates the cancel button 163, the automatic measurement mode terminates and the device returns to in the standby state.

The screen on the front-facing display 41 shown in FIG. 17A-1 includes texts 171 for prompting the user to display a code payment screen on the smartphone 3, a guidance video 172 for indicating how to display a code payment screen on the smartphone 3, a guidance image 173 for indicating the location of the reader 43 of the shipping assistance device 1, and texts 174 for prompting a user to pass a two-dimensional code for payment displayed on the code payment screen over the reader 43.

The screen on the upward-facing display 42 shown in FIG. 17B-1, texts 175 for prompting a user to pass a two-dimensional code for payment displayed on the code payment screen over the reader 43, and texts (and figures) 156 for indicating a type (name) and a price of the packing material to be purchased.

When the reader 43 reads the two-dimensional code for payment displayed on the smartphone 3, the processing controller 63 of the shipping assistance device 1 acquires the information from the reader 43 and transmits a payment instruction to the server device 2. The server device 2 performs a payment processing operation for a packing material purchased by the user. When the payment processing operation is normally completed, the screens on the front-facing display 41 and the upward-facing display 42 transition to the screens shown in FIGS. 17A-2 and 17B-2, respectively.

The screen on the front-facing display 41 shown in FIG. 17A-2 includes texts 181 "Thank You For Purchase" for the purchase of a packing material, and a guidance video 182 for the subsequent procedure. The guidance video 182 for the subsequent procedure indicates, for example, that packing an item can be done in the store, and that, when the packing of the item is completed, the packaged item can be put (dropped off) in the device in the self-drop-off mode. The guidance video 182 also indicates a video for prompting the user to enter information on the item (such as size-related class) using the shipping application installed on the smartphone 3.

The screen on the upward-facing display 42 shown in FIG. 17B-2 includes texts 183 "Thank You For Purchase" (for the purchase of a packing material), and texts (and figures) 156 for indicating a type (name) and a price of the packing material for which payment has been made.

When an error occurs during the operations in the automatic measurement mode, an error screen (not shown) is displayed on both of the front-facing display 41 and the upward-facing display 42. The error screen includes texts for indicating that an error has occurred and operations cannot be properly performed, texts for prompting the user to bring an item to a shipping counter in a store for shipping, an image for providing guidance to the shipping counter (e.g. a guide map for the store), and texts for prompting the user to call store staff.

Next, screen displayed when the shipping assistance device 1 is in the self-drop-off mode. FIGS. 18 to 21 are explanatory diagrams showing screens displayed on the displays when the shipping assistance device 1 is in the self-drop-off mode.

In the shipping assistance device 1, when a user operates the selection button 106 with title of "Self Drop Off" for selecting the self-drop-off mode in the screen shown in FIG. 13B displayed on the upward-facing display 42, the screens displayed on the front-facing display 41 and the upward-facing display 42 transition to the screens shown in FIGS. 18A-1 and 18B-1, respectively.

The screen as shown in FIG. 18A-1 on the front-facing display 41 includes texts 201 for prompting the user to place a packaged item on the table 21 and start the shipping application on the smartphone 3, and a video 202 for indicating how to place an item on the table 21. As an item needs to be placed at the reference position where the item is located at the left-back corner of the table 21, the video 202 shows that the item is placed at the center of the table 21 and then moved toward the left-back corner of the table 21.

The screen as shown in FIG. 18B-1 on the upward-facing display 42 includes texts 205 for prompting the user to place a packaged item on the table and start the shipping application on the smartphone 3, and a shipping process start button 206 for starting a shipping procedure.

When the processing controller 63 of the shipping assistance device 1 detects an item on the table 21, the screen on the upward-facing display 42 may transition to a screen for indicating that the size of the item is being measured.

When the user operates the shipping process start button 206, the screens on the front-facing display 41 and the upward-facing display 42 transition to the screens shown in FIGS. 18A-2 and 18B-2, respectively.

The screen on the front-facing display 41 shown in FIG. 18A-2 includes texts 211 for prompting the user to display a two-dimensional code for shipping on the smartphone 3 using the shipping application and then pass the two-dimensional code for shipping over the reader 43, and a guidance image 212 for indicating the location of the reader 43 of the shipping assistance device 1. The guidance image indicates the location of the reader 43 by a frame image surrounding the reader 43.

The screen on the upward-facing display 42 shown in FIG. 18B-2, texts 213 for prompting the user to pass a two-dimensional code for payment displayed on the code payment screen over the reader 43, and an image 214 indicating that the reader 43 is reading a code.

When the processing controller 63 acquires the information from the reader 43, the processing controller 63 accesses and makes an inquiry to the server device 2 about information on designation of necessary care in handling the item included in the sender-entered information, thereby confirming whether or not there is any designation of necessary care in handling the item (such as Fragile, Precision Instrument, Keep Refrigerated), which makes the item unsuitable to be put into the device.

When the device is not connected to the server device 2 due to a network failure or other reasons, the screen on at least one display may transition to a screen for notifying a user of no connection to the server device.

When the measured item falls under a size-related class which is acceptable to the device and there is no designation of necessary care in handling the item, which designation makes the item unsuitable to be put into the device; that is, the sender-entered information includes no designation of necessary care in handling the item, the shipping assistance device 1 determines that the item is acceptable to be put into the device, and the screens on the front-facing display 41 and the upward-facing display 42 transition to the screens shown in FIGS. 19A-1 and 19B-1, respectively.

The screen on the front-facing display 41 shown in FIG. 19A-1 includes texts 221 for notifying the user that the size measurement operation and the acceptability determining operation have been completed and that the item is acceptable to be put in the device, and an image 222 for requesting a user who has not designate any necessary care in handling the item, to do a final check as to whether or not a designation of Fragile is unnecessary for the item. Instead of the image 222, the screen may include a warning message that requests a user to confirm whether or not the package of an item includes any cushioning material so that the package can withstand an impact when the item is dropped in the device.

The screen on the upward-facing display 42 shown in FIG. 19B-1 includes texts 225 for notifying the user that the size measurement operation and the acceptability determining operation have been completed and that the item is acceptable to be put in the device, a print button 226 for instructing the printer to print a shipping label.

When the measured item does not fall under a size-related class which is acceptable to the device or when there is a designation of necessary care in handling the item (such as Fragile, Precision Instrument, Keep Refrigerated) (i.e., the sender-entered information includes a designation of necessary care in handling the item), which makes the item unsuitable to be put into the device, and thus the shipping assistance device 1 determines that the item is unacceptable to be put into the device, the screen on the front-facing display 41 transitions to the screen shown in FIG. 19A-2. When the measured item does not fall under any of designated size-related classes and the shipping assistance device 1 determines that the item is unacceptable to be put into the device, the screen on the upward-facing display 42 transitions to the screen shown in FIG. 19B-2. When there is a designation of necessary care in handling the item which makes the item unsuitable to be put into the device (i.e., the sender-entered information includes a designation of necessary care in handling the item) and the shipping assistance device 1 determines that the item is unacceptable to be put into the device, the screen on the upward-facing display 42 transitions to the screen shown in FIG. 19B-3.

When the processing controller 63 determines that the item is unacceptable to the device, the user needs to leave the item with store staff at a shipping counter in the store. The store staff hands off the item of the user to a delivery service operator. As a result, even when an item is one with a designation of necessary care in handling the item, the item can be safely handed over to the delivery service operator without damaging it.

The screen on the front-facing display 41 shown in FIG. 19A-2 includes texts 231 for prompting a user to bring an item to a shipping counter in a store and do a shipping procedure, and an image 232 for providing guidance to the shipping counter.

The screen on the upward-facing display 42 shown in FIG. 19B-2 includes texts 235 for notifying that an item is of the size which cannot be acceptable to the device, and texts 236 for prompting a user to bring the item to the shipping counter in the store and do the shipping procedure.

The screen on the upward-facing display 42 shown in FIG. 19B-3 includes texts 237 for notifying that the sender-entered information for an item includes a designation of necessary care in handling the item which makes the item unsuitable to the device, and texts 236 for prompting a user to bring the item to the shipping counter in the store and do the shipping procedure.

When the upward-facing display 42 displays the screen shown in FIG. 19B-1, and the user operates the print button 226 for instructing the printer to print a shipping label, the screens on the front-facing display 41 and the upward-facing display 42 transition to the screens shown in FIGS. 20A-1 and 20B-1, respectively.

The screen on the front-facing display 41 shown in FIG. 20A-1 includes texts 241 notifying that the printing of a shipping label starts, and a guidance image 242 for indicating the location of the printer 44 of the present device. The guidance image indicates the location of the printer 44 by a frame image surrounding the printer 44.

The screen on the upward-facing display 42 shown in FIG. 20B-1 includes texts 245 notifying that the printing of a shipping label starts, and an image 246 indicating that a shipping label is being printed.

When the printing of a shipping label is completed, the screens on the front-facing display 41 and the upward-facing display 42 transition to the screens shown in FIGS. 20A-2 and 20B-2, respectively.

The screen on the front-facing display 41 shown in FIG. 20A-2 includes texts 251 for notifying that the printing of a shipping label has been completed, texts 252 for prompting a user to attached the printed shipping label to the packaged item, and an image 253 indicating how to attach a shipping label to a packaged item.

The screen on the upward-facing display 42 shown in FIG. 20B-2 includes texts 255 for notifying that the printing of a shipping label has been completed, texts 256 for prompting a user to attached the printed shipping label to the packaged item, and an OK button used to confirm that a shipping label needs to be attached to a package.

When a user is going to attach a shipping label to the item on site, the user needs to operate the OK button 258. Then, the screens on the front-facing display 41 and the upward-facing display 42 transition to the screens shown in FIGS. 21A-1 and 21B-1, respectively. When the user is not going to attach a shipping label to the item on site, the user needs to operate the end button 119 to end the processing operations.

The screen on the front-facing display 41 shown in FIG. 21A-1 includes texts 261 for prompting a user to drop the item in the device, and a guidance image 262 for indicating the location of the drop slot 51 of the device. The guidance image indicates the location of the drop slot 21 by a frame image surrounding the drop slot 51.

The screen on the upward-facing display 42 shown in FIG. 21B-1 includes texts 265 for prompting a user to drop the item in the device, and an OK button used to confirm that the item can be dropped in the device.

When the user is going to drop the item in the device, the user needs to operate the OK button 268. Then, the screens on the front-facing display 41 and the upward-facing display 42 transition to the screens shown in FIGS. 21A-2 and 21B-2, respectively. When the user is not going to drop the item in the device, the user needs to operate the end button 119 to end the processing operations.

The screen on the front-facing display 41 shown in FIG. 21A-2 includes texts 271 for indicating that the shipping procedure is completed when the item is placed in the device, texts 272 for prompting the user to enter a notification of the completion of the shipping procedure (shipping notification) on the shipping application installed on the smartphone 3, and an image 273 indicating the shipping of the item.

The screen on the upward-facing display 42 shown in FIG. 21B-2 includes texts 275 for indicating that the completion of the shipping procedure, texts 276 "Thank You For Your Business", and texts 277 for prompting the user to enter a notification of the completion of the shipping procedure (shipping notification) on the shipping application installed on the smartphone 3. In this case, the shipping assistance device 1 may be configured such that, when the screen on the upward-facing display 42 is changed to one shown in FIG. 21B-2, the device 1 automatically transmits to the server device 2 an instruction to change the state of a user's item from a waiting-for-shipping state to a completion-of-shipping state.

When an error occurs during the operations in the self-drop-off mode, an error screen (not shown) is displayed on both of the front-facing display 41 and the upward-facing display 42. The error screen includes texts for indicating that an error has occurred and operations cannot be properly performed, texts for prompting the user to bring an item to the shipping counter in the store for shipping, an image for providing guidance to the shipping counter (e.g. a guide map for the store), and texts for prompting a user to call store staff.

Figure 22:
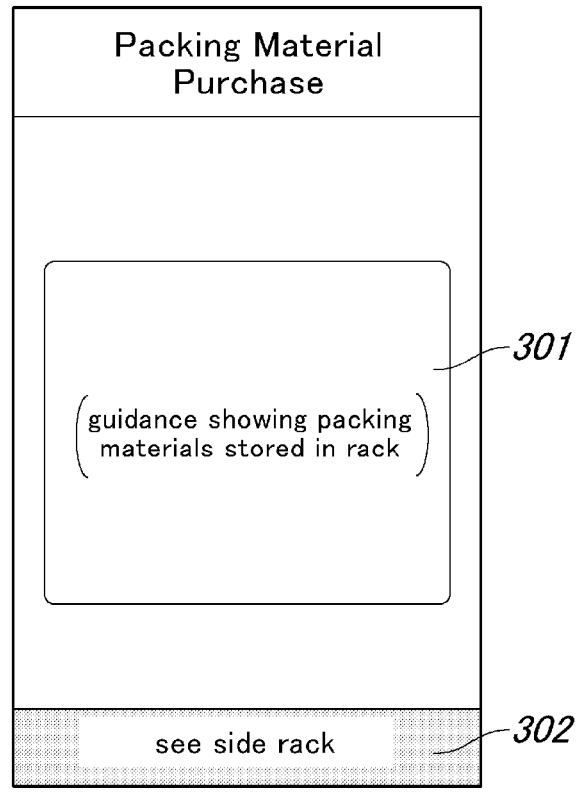
FIGS. 22A-B are explanatory diagrams showing screens displayed on the displays when the shipping assistance device 1 is in a packing material purchase mode.
Figure 22:
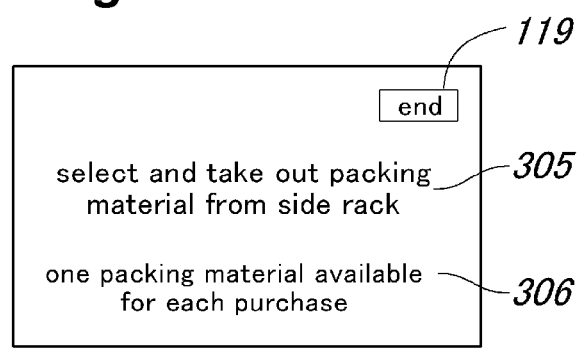

Next, screens displayed when the shipping assistance device 1 is in the packing material purchase mode. FIGS. 22 to 24 are explanatory diagrams showing screens displayed on the displays when the shipping assistance device 1 is in the packing material purchase mode.

In the shipping assistance device 1, when a user operates the selection button 107 with title of "Packing Material Purchase" in the screen shown in FIG. 13B displayed on the upward-facing display 42 in order to select the packing material purchase mode, the screens displayed on the front-facing display 41 and the upward-facing display 42 transition to the screens shown in FIGS. 22A and 22B, respectively.

In some cases, when the user operates the selection button 107 with title of "Packing Material Purchase" in the screen shown in FIG. 13B displayed on the upward-facing display 42, the screen displayed on the upward-facing display 42 may first transition to a screen used to inquire whether or not the user's registration of a designated payment service has been completed (not shown), and then only when the user's registration of a designated payment service has been completed, the screens transitions to screens shown FIGS. 22A and 22B, respectively. In this case, when the user's registration of a designated payment service has not been completed, the screen may transition to a guidance screen for prompting the user to purchase a packing material at the shipping counter in the store (not shown).

The screen on the front-facing display 41 shown in FIG. 22A includes a guidance image 301 showing packing materials stored in the rack 12, and texts 302 indicating that the rack 12 is provided next to the main body 11.

The screen on the upward-facing display 42 shown in FIG. 22B includes texts 305 for prompting the user to select and take out a packing material from the rack 12, and texts 306 indicating that the user can purchase packing materials one by one.

When a predetermined time has elapsed after the screens on the front-facing display 41 and the upward-facing display 42 transition to the screens shown in FIGS. 22A and 22B, respectively, the screens on the front-facing display 41 and the upward-facing display 42 transition to the screens shown in FIGS. 23A-1 and 23B-1, respectively.

Subsequently, the shipping assistance device 1 performs the same operation as the packing material vending step in the automatic measurement mode. Specifically, the screen on the front-facing display 41 transitions such that the screens as shown in FIGS. 23A-1, 24A-1, and 24A-2 appear on the display in this order, where the screens shown FIGS. 23A-1, 24A-1, and 24A-2 are same as screens shown in FIGS. 16A-1, 17A-1, and 17A-2 in the automatic measurement mode, respectively. The screen on the upward-facing display 42 transitions such that the screens as shown in FIGS. 23B-1, 23B-2, 23B-3 24B-1, and 24B-2 appear on the display in this order, where the screens shown FIGS. 23B-1, 23B-2, 23B-3, 24B-1, and 24B-2 are same as screens shown in FIGS. 16B-1, 16B-2, 16B-3, 17B-1, and 17B-2 in the automatic measurement mode, respectively.

(First Variant of First Embodiment)

Figure 25:
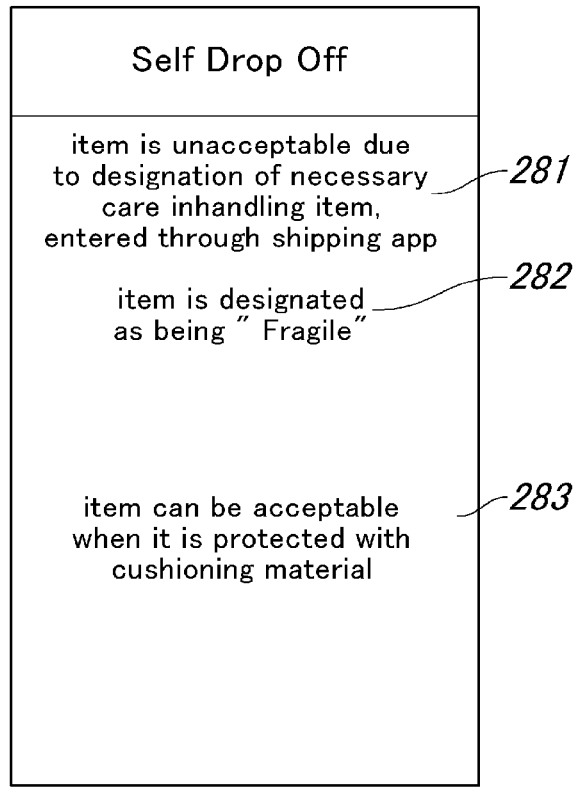
FIGS. 25(A)-(B) are explanatory diagrams showing screens displayed on the displays when a shipping assistance device 1 according to a first variant of the first embodiment is in the self-drop-off mode.
Figure 25:
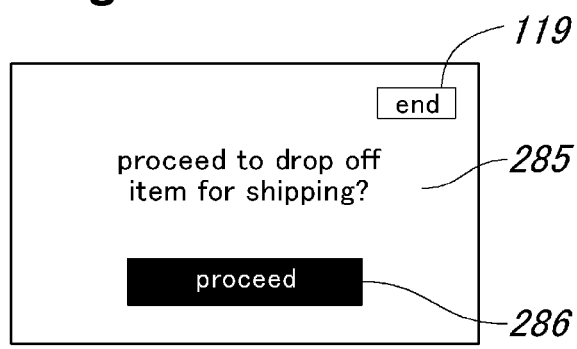

Next, a first variant of the first embodiment of the present invention will be described. Except for what will be discussed here, the first variant is the same as the above-described first embodiment. FIG. 25 is an explanatory diagram showing screens displayed on the displays when a shipping assistance device 1 according to the first variant of the first embodiment is in the self-drop-off mode.

In the first embodiment, even in the case where the size-related class of a measured item is acceptable, when there is a designation of necessary care in handling the item (i.e., the sender-entered information acquired from the server device 2 includes such a designation of necessary care in handling the item), which makes the item unsuitable to be put into the device, the shipping assistance device 1 determines that the item is not acceptable to be put in the device, displays the screen shown in FIG. 19B-3 on the upward-facing display 42, interrupts the shipping procedure at the device, and prompts a user to do the shipping procedure at the shipping counter in the store.

In the first variant, when there is a designation of necessary care in handling the item, which makes the item unsuitable to be put into the device, the shipping assistance device 1 displays a guidance screen for indicating how to continue the shipping procedure at the device on the upward-facing display 42. In this case, the shipping assistance device 1 makes an inquiry as to whether or not a user intends to proceed with the shipping procedure at the device, and when the user intends to continue to do the shipping procedure at the device, the shipping assistance device continues the operations for the shipping procedure and proceeds to the step of printing a shipping label.

Specifically, when there is a designation of necessary care in handling the item (i.e., the sender-entered information acquired from the server device 2 includes such a designation of necessary care in handling the item), which makes the item unsuitable to be put into the device, the screens on the front-facing display 41 and the upward-facing display 42 transition to the screens shown in FIG. 25A and FIG. 25B, respectively. The shipping assistance device 1 generates these screens based on the information on the designation of necessary care in handling the item included in the sender-entered information.

The screen on the front-facing display 41 shown in FIG. 25A includes texts 281 for notifying that there is a designation of necessary care in handling the item which makes the item unsuitable to be put into the device, texts 282 for indicating a necessary care in handling the item designated by a user, and texts 283 for indicating how the item can be made exceptionally acceptable to be put in the device. The example shown in FIG. 25A indicates that, even in the case where a user designates an item as being Fragile, when the item is sufficiently protected with a cushioning material, the item can be acceptable to be put into the device.

The screen of the upward-facing display 42 shown in FIG. 25B includes texts 285 for inquiring as to whether to proceed to drop off an item for shipping, and a proceed button 286 for proceeding to a drop-off of the item for shipping. When a user operates the proceed button 286, the screens displayed on the two displays transition to the screens shown in FIGS. 19A-1 and 19B-1, respectively, and the process proceeds to the step of printing a shipping label.

When a user designates the item as being a "Keep Refrigerated" one, the shipping assistance device 1 preferably interrupts the shipping procedure at the device without any inquiry about the user's intention; that is, without exception, and indicates that the item is unacceptable to be put into the device for shipping.

(Second Variant of First Embodiment)

Figure 26:
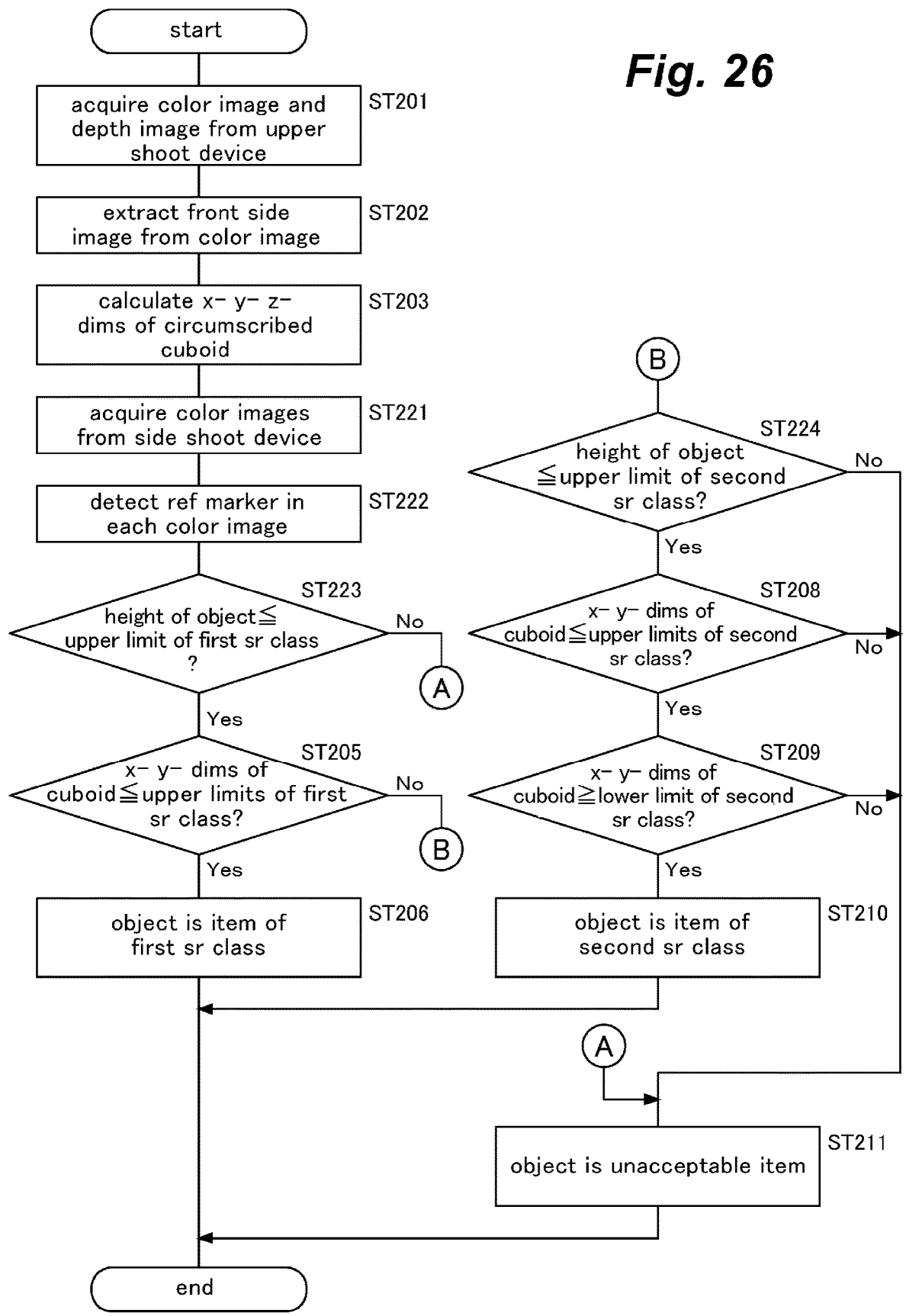
FIG. 26 is a flow chart showing an operation procedure of operations for an unpackaged item according to a second variant of the first embodiment.

Next, a second variant of the first embodiment of the present invention will be described. Except for what will be discussed here, the second variant is the same as the above-described first embodiment. FIG. 26 is a flow chart showing an operation procedure of operations for an unpackaged item according to the second variant of the first embodiment.

In the first embodiment, as shown in FIG. 11, when a packaged item is packed with a non-standard packing material, the shipping assistance device 1 acquires provisional size data of the item based on an image from the upper shooting device 31, and corrects the provisional size data with correction size data acquired based on images from the side shooting device 35 to thereby acquire the final size data. Moreover, as shown in FIG. 12, when the item is an unpackaged item, the shipping assistance device 1 acquires provisional size data of the item based on an image from the upper shooting device 31, and determines that the provisional size data is final size data as it is, without any corrections with correction size data acquired based on images from the side shooting device 35.

In the second variant, when the item is an unpackaged item, the shipping assistance device 1 acquires provisional size data of the item based on an image from the upper shooting device 31, and corrects the provisional size data with correction size data acquired based on an image from the side shooting device 35 to thereby acquire final size data in the same manner as the case of a packaged item shown in FIG. 11. In other words, the shipping assistance device 1 determines the size-related class of an item from the height of the item measured based on how the image of the reference marker 39 is shielded in each color image provided from the side shooting device 35, instead of using provisional height data of the item measured from a depth image provided from the upper shooting device 31.

More specifically, as shown in FIG. 26, after performing the same operations of ST201 to ST203 as in the first embodiment (see FIG. 12), the processing controller 63 acquires color images from the color cameras 36 of the side shooting device 35 (ST221), and detects an image of the reference marker 39 in each color image (ST222). Then, the processing controller 63 determines whether or not the height of the object (item to be shipped) is equal to or less than the height upper limit for the first size-related class based on how the reference marker 39 is shielded in each color image (size classification operation) (ST223).

When the processing controller 63 determines that the height of the object is equal to or less than the height upper limit for the first size-related class (Yes in ST223), the process proceeds to ST205. When determining that the height of the object is greater than the height upper limit for the first size-related class (No in ST223), the processing controller 63 determines the object to be unacceptable to be put in the device (ST211). When the processing controller 63 determines a circumscribed cuboid surrounding the front side image (of the object) and the X and Y dimensions of the circumscribed cuboid are less than or equal to the X and Y direction upper limits for the first size-related class (Yes in ST205), the processing controller 63 determines the object is an item of the first size-related class (ST206).

When the X and Y dimensions of the circumscribed cuboid of the object are greater than the X and Y direction upper limits for the first size-related class (No in ST205), the processing controller 63 determines whether or not the height of the object is equal to or less than the height upper limit for the second size-related class based on how the reference marker 39 is shielded in each color image (size classification operation) (ST224).

When the processing controller 63 determines that the height of the object is equal to or less than the height upper limit for the second size-related class (Yes in ST224), the process proceeds to ST208. The subsequent steps followed by ST208 are the same as those in the first embodiment. When the processing controller 63 determines that the height of the object is greater than the height upper limit for the second size-related class (No in ST224), the process proceeds to ST211. The operation of ST211 is the same as the first embodiment.

In the second variant, as the first and second size-related classes are determined based on respective height upper limits which are different from each other, the different respective reference markers 39 are used for the two size-related classes, enabling the processing controller 63 to more accurately determine the size-related class of an item.

(Third Variant of First Embodiment)

Figure 27:
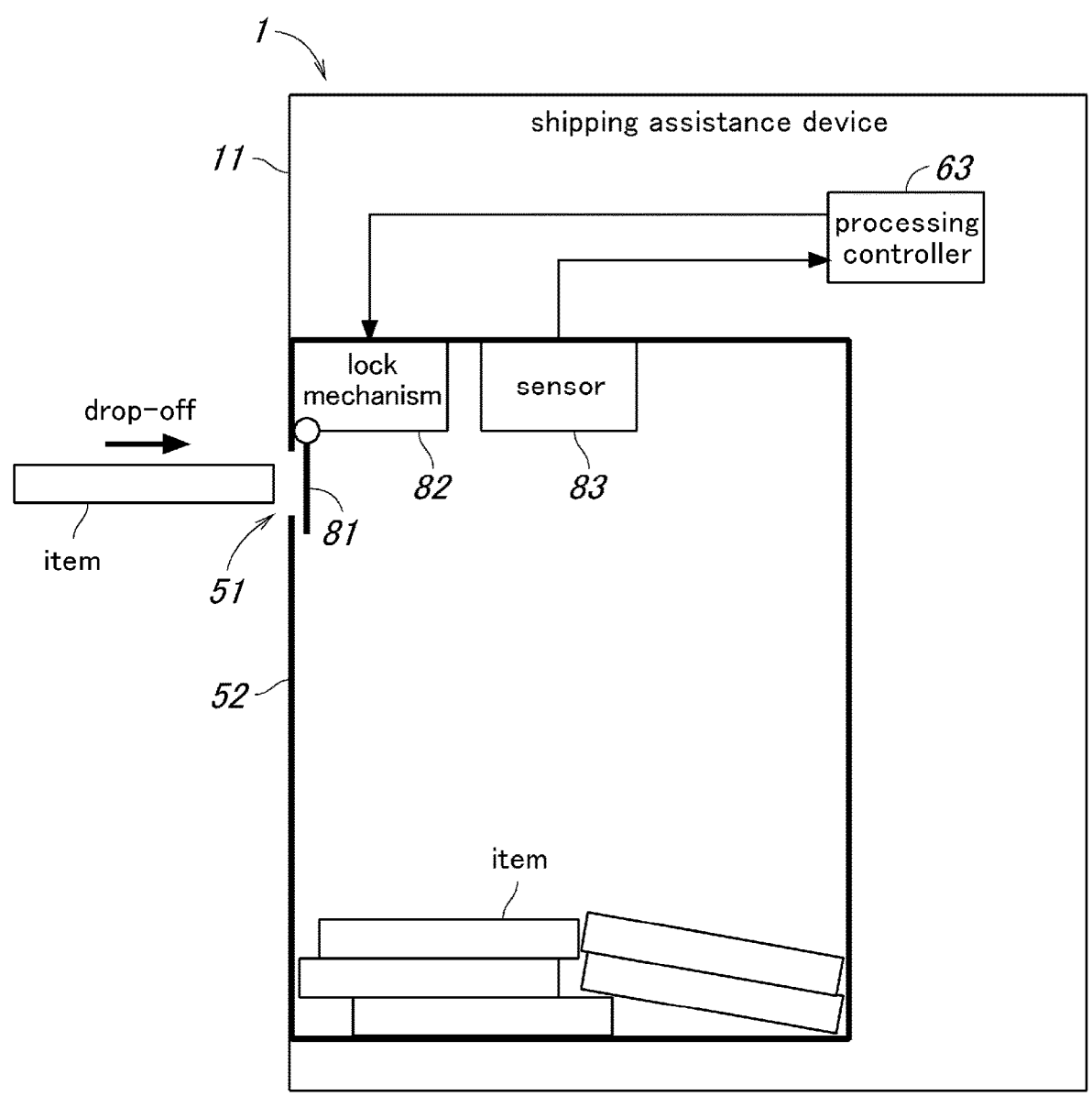
FIG. 27 is an explanatory diagram schematically showing a shipping assistance device 1 of a third variant of the first embodiment.
Figure 28:
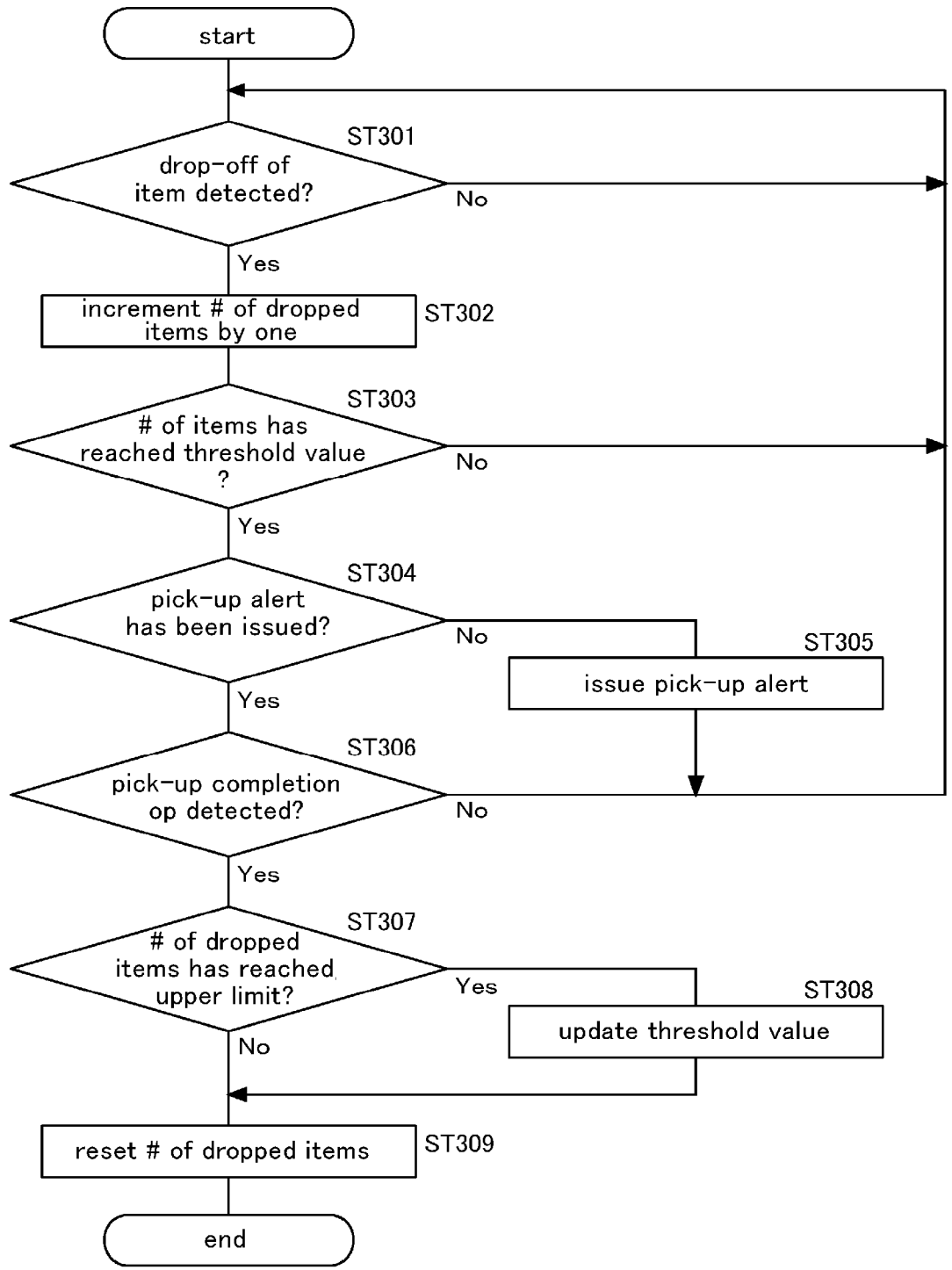
FIG. 28 is a flow chart showing an operation procedure of operations performed by the processing controller 63 of the shipping assistance device 1 according to the third variant of the first embodiment.

Next, a third variant of the first embodiment of the present invention will be described. Except for what will be discussed here, the third variant is the same as the above-described first embodiment. FIG. 27 is an explanatory diagram schematically showing a shipping assistance device 1 of the third variant of the first embodiment. FIG. 28 is a flow chart showing an operation procedure of operations performed by the processing controller 63 of the shipping assistance device 1 according to the third variant of the first embodiment.

As shown in FIG. 27, the main body 11 of the shipping assistance device 1 includes a storage chamber 52 for storing items. The storage chamber 52 is provided with a drop slot 51 adapted to the size(s) of items that are acceptable to be put in the device. Furthermore, the storage chamber 52 is provided with a lid 81 for covering the drop slot 51, and a lock mechanism 82 for locking the lid 81 from rotation, thereby preventing items from being freely put in the device. The lock mechanism 82 may include, for example, a lock member (not shown) for locking the lid 81 from rotation and a driving device (not shown) for driving the lock member with an actuator such as a solenoid.

The storage chamber 52 is provided with a sensor 83 for detecting a drop-off of an item; that is, detecting an item passing through the drop slot 51. Any of various known detectors may be adopted for detecting a drop-off of an item and an example of such a detector is disclosed in Patent Document 4 (JPH10-91678A). Examples of the sensor 83 include, in addition to a passing sensor as described above, an open/close sensor configured to detect rotation of the lid 81 for covering the drop slot 51. In other cases, a reader may be provided near the drop slot 51 so that the reader can read two-dimensional code printed on a shipping label to thereby detect a drop-off of the item and identify the item at the same time.

The processing controller 63 controls the operation of the lock mechanism 82 so as to prevent unmeasured items or any object other than items to be shipped (such as trash) from being put in the drop slot 51. In the present embodiment, the processing controller 63 temporarily unlocks the lock mechanism in response to the determination that an item is acceptable. In some cases, the processing controller 63 temporarily unlocks the lock mechanism 82 upon completion of printing a shipping label by the printer 44. In the present embodiment, the processing controller 63 returns the lock mechanism 82 to the lock state when the sensor 83 detects a drop-off of an item.

The processing controller 63 determines how many items have been put in the storage chamber 52 among the items determined to be acceptable. In the present embodiment, the processing controller 63 counts the number of items put in the storage chamber 52 based on the detection results of the sensor 83. Specifically, the processing controller 63 counts up the number of items put in the device each time the sensor 83 detects a drop-off of an item. The processing controller 63 also counts the number of items that are determined to be acceptable by using any of various known technologies (such as one disclosed in JP2001-076262A—Patent Document 5).

In the present embodiment, the processing controller 63 compares the number of items that have been put in the device with a threshold value in regard to the quantity of items that can be stored in the storage chamber 52 (the threshold value may be an upper limit value or a value smaller than the upper limit value by a predetermined number), and then issues a pick-up alert for requesting the pick-up of items based on the result of the comparison. Specifically, when a counted number of items exceeds the threshold value, the processing controller 63 issues a pick-up alert. For example, the shipping assistance device 1 may transmit a pack-up alert notification to the terminal carried by a pick-up worker via the server device 2 and to the server device (not shown) of the delivery service operator. Preferably, the threshold value is determined such that the storage chamber 52 can further accept two to five items after issuance of a pack-up alert, so as to ensure that the shipping assistance device 1 can be used until the items are picked up.

In the present embodiment, the processing controller 63 resets the counted number of items when the pick-up of items from the storage chamber 52 is completed. In some cases, when a pick-up worker of the delivery service operator unlocks the lock 55 (see FIG. 2) of the storage chamber 52, finishes the pick-up of items, and performs a pick-up completion operation on the device, the processing controller 63 may reset the counted number of items in response to the pick-up completion operation. In other cases, the processing controller 63 may detect the completion of the pick-up of items based on the opening or closing of the door 53 of the storage chamber 52 and the unlocking or locking of the lock 55, and then reset the counted number of items. The processing controller 63 can reset the counted number of items after the completion of the pick-up of items by using any of various known technologies (such as one disclosed in JPH06-30738B).

In the present embodiment, when the number of dropped items at the time of the pick-up of items has reached the upper limit of the quantity of items for the storage chamber 52, the processing controller 63 updates the threshold value for a necessity-of-alert determination operation; that is, an operation for determining whether to issue a pack-up alert. In this case, the threshold value is changed to a value that is smaller than the current threshold value by a predetermined number.

Specifically, as shown in FIG. 28, when the sensor 83 detects a drop-off of an item (Yes in ST301), the processing controller 63 increments the number of dropped items (the counted number of dropped items) by one (ST302). Next, the processing controller 63 determines whether or not the counted number of dropped items has reached a predetermined threshold value (necessity-of-alert determination operation) (ST303). When the number of dropped items has reached the threshold value (Yes in ST303), the processing controller 63 determines whether or not a pack-up alert has been issued (ST304). When a pack-up alert has not been issued (No in ST304), the processing controller 63 performs an operation for issuing a pack-up alert (pack-up alert issuance operation) (ST305).

When the pickup alert has been issued (Yes in ST304), the processing controller 63 determines whether or not a pick-up completion operation performed by a pick-up worker of the delivery service operator has been detected (Yes in ST306). When the pick-up completion operation has been detected (Yes in ST306), the processing controller 63 then determines whether or not the counted number of dropped items has reached a predetermined upper limit (S307). When the counted number of dropped items has reaches the upper limit (Yes in ST307), the processing controller 63 changes the threshold value for the necessity-of-alert determination operation to a smaller value than the current value by a predetermined number (threshold value update operation) (ST308).

Next, the processing controller 63 resets the number of dropped items (the counted number of dropped items) (ST309).

The threshold value for the necessity-of-alert determination operation is set to a value smaller than the upper limit of the number of items that can be stored in the storage chamber 52 (the number of items that have been dropped when the storage chamber 52 is full). Specifically, the threshold value for the necessity-of-alert determination operation is set to a value smaller than the upper limit by a predetermined number of items that can be further stored (e.g., two to five). As a result, the shipping assistance device 1 can further accept the predetermined number of items after the issuance of a pack-up alert and before the pick-up of items. The number of items that can be further dropped in the device can be determined based on the required time between the issuance of a pack-up alert and the pick-up of items, the pace at which items are dropped (an expected number of items to be dropped per unit of time), and/or other factors.

In the third variant, since the pick-up alert is issued when the storage chamber 52 can further accept additional items, the pick-up of items is carried out before the storage chamber 52 becomes full, which decreases the problem that the storage chamber 52 becomes filled to capacity and unable to accept further items. Furthermore, as the threshold value for the necessity-of-alert determination operation is controlled according to the actual quantity of the items that have been dropped in the device, it become possible to effectively avoid the occurrence of a situation in which the storage chamber 52 becomes filled to capacity and unable to accept further items.

In the present embodiment, as shown in FIGS. 2 and 27, the main body 11 is provided with one drop slot 51 having the size adapted for the (maximum) size of items of any of size-related classes that are acceptable to be put in the device. However, in some cases, the shipping assistance device 1 may be configured such that the main body 11 is provided with two or more drop slots 51 for different size-related classes so that items of each size-related class can be put into a corresponding drop slot 51, and that when the shipping assistance device 1 determines that an item is acceptable to be put in the device or when the printer 44 prints a shipping label, the processing controller 63 temporarily unlocks a corresponding one of the drop slots 51 for the size-related class of an item. In this configuration, the processing controller 63 performs lock-unlock controls of the lid of a corresponding one of the drop slots 51 for the size-related class of an item, which can effectively avoid the occurrence of certain problems such as a fraud in which the item that has been measured is changed to another item when it is put in the device.

Second Embodiment

Figure 29:
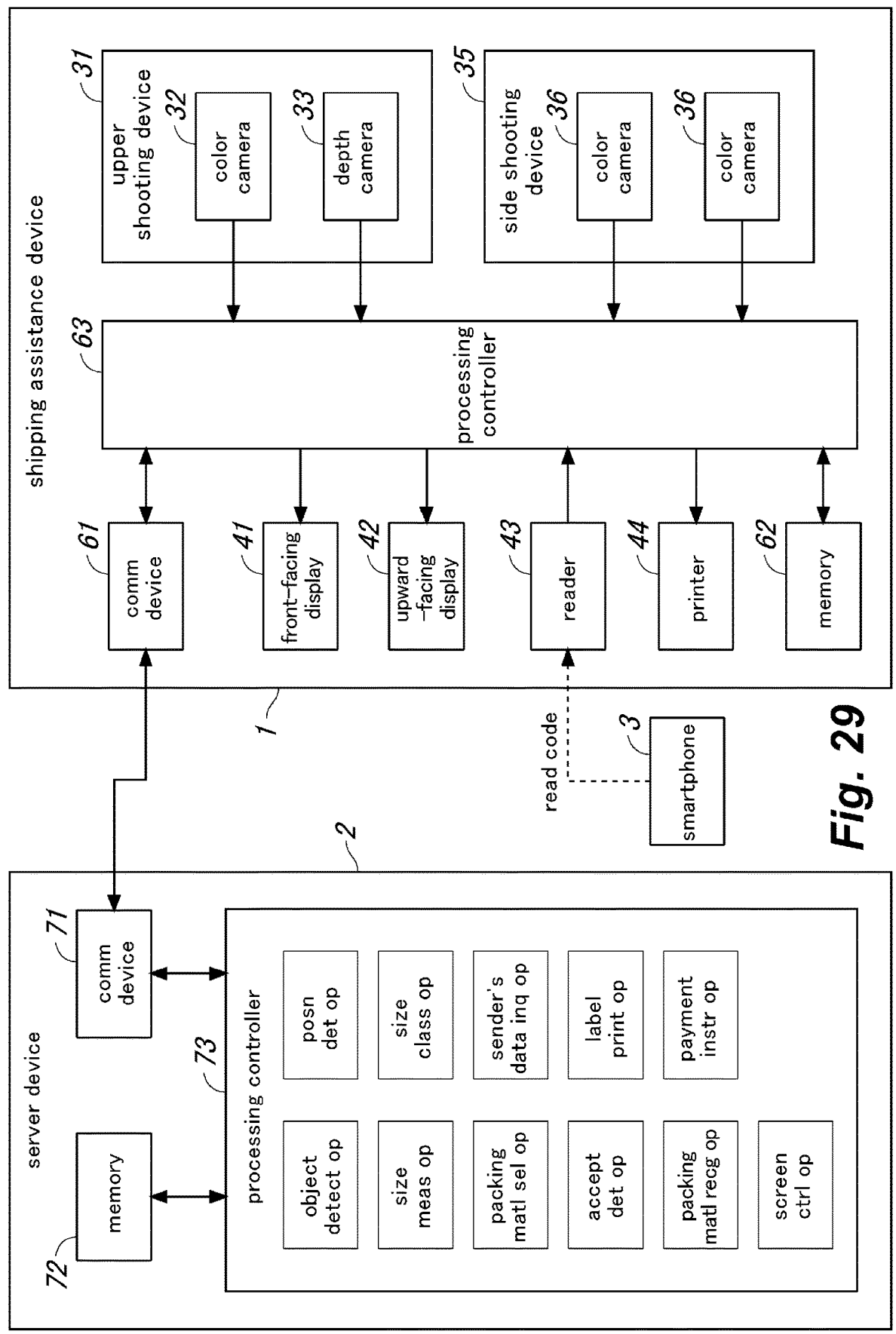
FIG. 29 is a block diagram showing schematic configurations of a shipping assistance device 1 and a server device 2 according to a second embodiment of the present invention.

Next, a second embodiment of the present invention will be described. Except for what will be discussed here, the second embodiment is the same as the above-described embodiments. FIG. 29 is a block diagram showing schematic configurations of a shipping assistance device 1 and a server device 2 according to the second embodiment of the present invention.

In the first embodiment (see FIG. 7), the processing controller 63 of the shipping assistance device 1 is configured to perform various processing operations related to shipping assistance; that is, an object detection operation, an object positioning operation, a size measurement operation, a size classification operation, a packing material selection operation, a sender-entered data inquiry operation, an acceptability determining operation, a shipping label printing operation, a packing material recognition operation, a payment instruction operation, a screen control operation, and other operations. In the second embodiment, a processing controller 73 of the server device 2 performs processing operations related to shipping assistance. In addition, the processing controller 73 of the server device 2 also performs operations for management of sender-entered information previously entered by a user, and payment-related operations. The processing controller 73 executes programs stored in a memory 72 to perform necessary operations.

A shipping assistance device 1 of the second embodiment transmits images from the upper shooting device 31 and the side shooting device 35 to the server device 2, the images including a color image acquired by the color camera 32 of the upper shooting device 31, a depth image acquired by the depth camera 33 of the upper shooting device 31, and color images acquired by the color cameras 36 of the side shooting device 35. In the shipping assistance device 1, the communication device 61 receives information transmitted from the communication device 71 of the server device 2, controls the front-facing display 41 and the upward-facing display 42 to display necessary screens based on the information transmitted from the server device 2, controls the reader 43 to read a two-dimensional code, and also controls the printer 44 to print a shipping label.

In the above embodiments, in regard to user-related operations for providing a shipping assistance service to a user, the shipping assistance system is configured such that a user can use the shipping application installed on the smartphone 3 to enter information on shipping of an item, read a two-dimensional code for shipping displayed by the shipping application on the smartphone 3, and read a two-dimensional used for payment displayed by the payment application installed on the smartphone 3. In other embodiments, the shipping assistance system may be configured to identify a user through face authentication and perform payment-related operations. In this case, a user needs to register the user's face image (feature amount) in the server device 2 prior to using the shipping assistance system, and the shipping assistance device 1 is configured to acquire a face image of a user, perform face authentication by comparing the acquired face image of the user with face images of registrants to determine if the user is a registrant, and then perform payment-related operations.

While specific embodiments of the present invention are described herein for illustrative purposes, the present invention is not limited to the specific embodiments. It will be understood that various changes, substitutions, additions, and omissions may be made to elements of the embodiments without departing from the scope of the invention. In addition, elements and features of the different embodiments may be combined with each other as appropriate to yield an embodiment which is within the scope of the present invention.

INDUSTRIAL APPLICABILITY

A shipping assistance device and a shipping assistance system according to the present invention achieve an effect of allowing a delivery service operator to quickly confirm that the size of an item has been properly measured and there is no need to re-measure the size, and proceed to operations for transportation immediately after the pick-up of items, and are useful as a shipping assistance device and a shipping assistance system for assisting a user to do a shipping procedure when the user hands off an item to a delivery service operator.

Glossary 1 shipping assistance device
2 server device
3 smartphone
11 main body
12 rack
21 table (table portion)
22 mounting surface
23 side wall surface
31 upper shooting device (detection device)
32 color camera
33 depth camera
35 side shooting device (detection device)
36 color camera
39 reference marker
41 front-facing display (display device)
42 upward-facing display (display device, user interface)
43 reader
44 printer (printing device)
51 drop slot
52 storage chamber
53 door
54 handle
55 lock
61 communication device
62 memory
63 processing controller
71 communication device
72 memory
73 processing controller

The invention claimed is:

1. A shipping assistance device for assisting a user to do a shipping procedure when the user hands off an item to a delivery service operator, the shipping assistance device comprising:
   a table portion on which a user can place an item;
   at least one detection device for detecting the item on the table portion;
   a storage chamber for storing the item put therein by the user;
   a display device for presenting information to the user; and
   a processing controller for performing controls related to shipping assistance,
   wherein the processing controller is configured to:
      measure a size of the item on the table portion based on a detection result provided from the at least one detection device;
      determine a size-related class to which the item belongs based on a size measurement result;
      determine whether or not the size-related class for the item is changeable through a size re-measurement of the item based on the size measurement result;
      determine whether or not the item is acceptable to the shipping assistance device, which includes whether or not the item is acceptable to be put in the storage chamber based on the size measurement result;
      display information on a determination result on the display device;
      when the item is determined to be acceptable to the shipping assistance device, give an acceptance signature to the item; and
      when the item is unpackaged and determined to be acceptable to the shipping assistance device and the determined size-related class for the item is changeable through the size re-measurement, display advice information on the display device, the advice information encouraging the size re-measurement of the item, wherein the size re-measurement of the item enables a change of the size-related class to a cheaper shipping material enabling a cheaper shipping fee.

2. The shipping assistance device according to claim 1, further comprising a housing, wherein the table portion, the at least one detection device, the storage chamber, and the display device are provided integrally with the housing.

3. The shipping assistance device according to claim 1, wherein the at least one detection device comprises a first detection device for detecting the item on the table portion from above, and a second detection device for detecting the item on the table portion from a side.

4. The shipping assistance device according to claim 1, wherein the processing controller is configured such that, when the item on the table portion is unpackaged and determined to be acceptable to the shipping assistance device, the processing controller displays information on at least one of the size of the item and a shipping cost for the item on the display device.

5. The shipping assistance device according to claim 1, wherein the processing controller is configured such that, when the item on the table portion is unpackaged and determined to be acceptable to the shipping assistance device, the processing controller displays information on a packing material suitable for the item on the display device.

6. The shipping assistance device according to claim 1, wherein the processing controller is configured such that, when the item on the table portion is packaged and determined to be acceptable to the shipping assistance device, the processing controller displays a notification that the item is acceptable to the shipping assistance device on the display device.

7. The shipping assistance device according to claim 1, further comprising a printing device for printing a shipping label or document,
wherein the processing controller is configured such that, when the item on the table portion is packaged and the determination result indicates that the item is acceptable to the shipping assistance device, the processing controller instructs the printing device to print the shipping label or document for the item, the shipping label or document including an indication of the acceptance signature given to the item.

8. A shipping assistance system for assisting a user to do a shipping procedure when the user hands off a package to a delivery service operator, the shipping assistance system comprising:
a shipping assistance device; and
a server device connected to the shipping assistance device via a network,
wherein the shipping assistance device includes: a table portion on which a user can place an item; at least one detection device for detecting the item on the table portion; a storage chamber for storing the item put therein by the user; and a display device for presenting information to the user,
wherein the shipping assistance device is configured to transmit a detection result provided from the at least one detection device to the server device, the detection result indicating the detection of the item on the table portion,
wherein the server device is configured to:
measure a size of the item on the table portion based on the detection result received from the shipping assistance device;
determine a size-related class to which the item belongs based on a size measurement result;
determine whether or not the determined size-related class for the item is changeable through a size re-measurement of the item based on the size measurement result;
determine whether or not the item is acceptable to the shipping assistance device, which includes whether or not the item is acceptable to be put in the storage chamber based on the size measurement result;
when the item is determined to be acceptable to the shipping assistance device, give an acceptance signature to the item,
wherein the shipping assistance device is configured to display information on a determination result received from the server device on the display device, and
wherein, when the item is unpackaged and determined to be acceptable to the shipping assistance device and the determined size-related class for the item is changeable through the size re-measurement, the shipping assistance device displays advice information on the display device, the advice information encouraging the size re-measurement of the item, wherein the size re-measurement of the item enables a change of the size-related class to a cheaper shipping material enabling a cheaper shipping fee.

9. The shipping assistance device according to claim 1, wherein the advice information includes guidance on how to change a manner in which the item is placed on the table portion.

* * * * *